United States Patent
Ashrafi

(10) Patent No.: US 10,263,670 B2
(45) Date of Patent: Apr. 16, 2019

(54) SYSTEM AND METHOD FOR REDUCING PILOT SIGNAL CONTAMINATION USING ORTHOGONAL PILOT SIGNALS

(71) Applicant: NXGEN PARTNERS IP, LLC, Dallas, TX (US)

(72) Inventor: Solyman Ashrafi, Plano, TX (US)

(73) Assignee: NxGen Parners IP, LLC, Dallas, TX (US)

( * ) Notice: Subject to any disclaimer, the term of this patent is extended or adjusted under 35 U.S.C. 154(b) by 0 days.

(21) Appl. No.: 15/962,254

(22) Filed: Apr. 25, 2018

(65) Prior Publication Data

US 2018/0248592 A1    Aug. 30, 2018

Related U.S. Application Data

(63) Continuation-in-part of application No. 15/216,474, filed on Jul. 21, 2016, now Pat. No. 9,998,187.

(60) Provisional application No. 62/490,138, filed on Apr. 26, 2017.

(51) Int. Cl.
    *H04B 7/0413*    (2017.01)
    *H04L 5/00*    (2006.01)

(52) U.S. Cl.
    CPC ......... *H04B 7/0413* (2013.01); *H04L 5/0007* (2013.01); *H04L 5/0048* (2013.01)

(58) Field of Classification Search
    CPC ........ H04B 17/309; H04B 2201/70701; H04B 2201/709709; H04B 7/0413; H04B 7/0617; H04L 27/2611; H04L 5/0023; H04L 5/143
    See application file for complete search history.

(56) References Cited

U.S. PATENT DOCUMENTS

| | | |
|---|---|---|
| 8,503,546 B1 | 8/2013 | Ashrafi |
| 9,077,577 B1 | 7/2015 | Ashrafi et al. |
| 9,252,986 B2 | 2/2016 | Ashrafi et al. |
| 9,294,259 B2 * | 3/2016 | Jalloul .................... H04L 5/143 |
| 9,331,875 B2 | 5/2016 | Ashrafi et al. |
| 9,503,258 B2 | 11/2016 | Ashrafi et al. |
| 9,712,238 B2 | 7/2017 | Ashrafi et al. |
| 9,859,981 B2 | 1/2018 | Ashrafi et al. |
| 2011/0176581 A1 * | 7/2011 | Thomas ............... H04B 1/7075 375/146 |
| 2018/0062773 A1 * | 3/2018 | Kusunoki ............ H04B 17/309 |

OTHER PUBLICATIONS

UMTS World, "CDMA Overview." http://www.umtsworld.com/technology/cdmabasics.htm accessed on Jul. 21, 2018. Verified public availability on Dec. 17, 2013 using web.archive.org. (Year: 2013).*

(Continued)

*Primary Examiner* — David S Huang

(57) ABSTRACT

A system for transmitting pilot signals has first signal processing circuitry for generating a pilot signal at a transmitting unit. An MLO modulation circuit modulates the pilot signal using quantum level overlay modulation to apply at least one orthogonal function to the pilot signal. A transceiver transmits the modulated pilot signal from the transmitting unit over a pilot channel. The at least one orthogonal function applied to the pilot signal substantially reduces pilot channel contamination on the pilot channel from other pilot channels.

27 Claims, 23 Drawing Sheets

(56) References Cited

OTHER PUBLICATIONS

K. Ii, X. Song, M. O. Ahmad, and M. Swamy, "An improved multicell MMSE channel estimation in a massive MIMO system," Int. J. Antennas Propag., vol. 2014, 2014, pp. 1-4.
N. Shariati, E. Bjornson, M. Bengtsson, and M. Debbah, "Low-complexity polynomial channel estimation in large-scale MIMO with Arbitrary Statistics," IEEE Journal of Selected Topics in Signal Processing, vol. 8, No. 5, pp. 815-813, Oct. 2014.
A Hu, T. Lv, H. Gao, Y. Lu, and E. Liu, "Pilot design for large-scale multi-cell multiuser MIMO systems," in Proc. IEEE Tnt. Conf. Commun. (ICC), Jun. 2013, pp. 5381-5385.
D. Neumann, M. Joham, and W. Utschick, "Channel estimation in massive MIMO systems," 2015 [Preprint], arXiv:1503.08691.
H Zhang, X. Zheng, W. Xu, and X. You, "On massive MIMO Performance with semi-orthogonal pilot-assisted channel estimation," EURASIP J. Wireless Commun. Netw., vol. 2014, No. 1, pp. 1-14, 2014.
R. Chavez-Santiago et al., "5G: The convergence of wireless communi-cations," Wireless Pers. Commun., vol. 83, No. 3, pp. 1617-1642, 2015 [Online]. available: http://dx.doi.org/10.1007/s11277-015-2467-2.
H. Q. Ngo, E. Larsson, and T. Marzetta, "Energy and spectral efficiency of very large multiuser MIMO systems," IEEE Trans. Commun., vol. 61, No. 4, pp. 1436-1449,Apr. 2013.
F. Fernandes, A Ashikhmin, and T. Marzetta, "Inter-cell interference in noncooperative TDD large scale antenna systems," IEEE J. Sel. Areas Comm., vol. 31,No. 2,pp. 192-201, Feb. 2013.
H. Yin, D. Gesbert, M. Filippou, and Y. Liu, "A coordinated approach to channel estimation in large-scale multiple-antenna systems," IEEE J. Set. Areas Commun., vol. 31, No. 2, pp. 264-273, Feb. 2013.
J. Zhang, B. Zhang, S. Chen, X. Mu, M. El-Haijar, and L. Hanzo, "Pilot contamination elimination for large-scale multiple-anteona aided OFDM systems," IEEE J. Sel. Topics Signal Process., vol. 8, No. 5, pp. 759-772, Oct. 2014.
J. Jose, A. Ashikhmin, T. Mmzetta, and S. Vishwanath, "Pilot contamination and precoding in multi-cell TDD systems," IEEE Trans. Wireless Commun., vol. 10, No. 8, pp. 2640-2651, Aug. 2011.
A. Ashikhmin and T. Mazella, "Pilot contamination precoding in multi-cell large scale antenna systems," in Proc. IEEE Int. Symp. Inf. Theory (ISIT), 2012, pp. 1137-1141.
H. Wang, Z. Pan, and J. Ni, and C.-L. I, "A spatial domain based method against pilot contamination for multi-cell massive MIMO systems;" in Proc. 8th Int ICST Conf. Commun. Netw. China (CHINACOM), Aug. 2013,pp. 218-222.
H. Q. Ngo and E. G. Larsson, "EVD-based channel estimation in multicell multiuser MIMO systems with very large antenna arrays," in Proc. IEEE Int. Conf. Acoust. Speech Signal Process. (ICASSP), 2012, pp. 3249-3252.
R R. Muller, M. Vehkaperii, and L Cottatellucci, "Blind pilot decontamination," in Proc. 17th Int. ITG Workshop Smart Antennas (WSA), 2013, pp. 1-6.
M. Latif Sarker and M. H. Lee, "A fast channel estimation and the reduction of pilot contamination problem for massive MIMO based on a diagonal jacket matrix," in Proc. 4th Int. Workshop Fiber-Opt. Access Netw. (FOAN), Sep. 2013, pp. 26-30.
D. Neumann, M. Joham, and W. Utschick, "Suppression of pilot-contamination in massive MIMO systems," in Proc. IEEE 15th Int. Workshop Signal Process. Adv. Wireless Commun. (SPAWC), Jun. 2014, pp. 11-15.
F. Rusek et al., "Scaling up MIMO: Opportunities and challenges with very large arrays," IEEE Signal Process. Mag., vol. 30, No. I, pp. 40-60, Jan. 2013.
Q. Li, H Niu, A Papathanassiou, and G. Wu, "5G networlk capacity: Key elements and technologies," IEEE Yeh. Technol. Mag., vol. 9, No. 1, pp. 71-7&, Mar. 2014.

* cited by examiner

SYSTEM AND METHOD FOR REDUCING PILOT SIGNAL CONTAMINATION USING ORTHOGONAL PILOT SIGNALS

CROSS-REFERENCE TO RELATED APPLICATIONS

This application claims priority to U.S. Provisional Application No. 62/490,138, filed on Apr. 26, 2017 and entitled PRODUCT PATENT REDUCING PILOT CONTAMINATION USING NEW ORTHOGONAL PILOT SIGNALS THAT REDUCE TIME-BANDWIDTH RESOURCES, which is incorporated herein by reference in its entirety. This application is also a Continuation-in-Part of U.S. patent application Ser. No. 15/216,474, filed on Jul. 21, 2016 and entitled SYSTEM AND METHOD FOR COMBINING MIMO AND MODE DIVISION MULTIPLEXING, which is incorporated herein by reference in its entirety.

TECHNICAL FIELD

The present system relates to pilot signal transmissions, and more particularly, to the use of orthogonal pilot signals for pilot signal transmissions to reduce pilot signal contamination.

BACKGROUND

The use of voice and data networks has greatly increased as the number of personal computing and communication devices, such as laptop computers, mobile telephones, Smartphones, tablets, et cetera, has grown. The astronomically increasing number of personal mobile communication devices has concurrently increased the amount of data being transmitted over the networks providing infrastructure for these mobile communication devices. As these mobile communication devices become more ubiquitous in business and personal lifestyles, the abilities of these networks to support all of the new users and user devices has been strained. Thus, a major concern of network infrastructure providers is the ability to increase their bandwidth in order to support the greater load of voice and data communications and particularly video that are occurring. Traditional manners for increasing the bandwidth in such systems have involved increasing the number of channels so that a greater number of communications may be transmitted, or increasing the speed at which information is transmitted over existing channels in order to provide greater throughput levels over the existing channel resources.

Transmitting devices transmit a pilot signal over a pilot channel to a receiving device in order to determine channel state information for a communications channel between the transmitter and the receiver. When multiple pilot channel signals are being transmitted from a number of transmitting devices to a receiving device, interference between the pilot channels may cause pilot channel contamination. Thus, some manner for mitigating the effects of pilot channel contamination would greatly benefit the communications process.

SUMMARY

The present invention, as disclosed and described herein, in one aspect thereof provides a system for transmitting pilot signals has first signal processing circuitry for generating a pilot signal at a transmitting unit. An MLO modulation circuit modulates the pilot signal using quantum level overlay modulation to apply at least one orthogonal function to the pilot signal. A transceiver transmits the modulated pilot signal from the transmitting unit over a pilot channel. The at least one orthogonal function applied to the pilot signal substantially reduces pilot channel contamination on the pilot channel from other pilot channels.

BRIEF DESCRIPTION OF THE DRAWINGS

For a more complete understanding, reference is now made to the following description taken in conjunction with the accompanying Drawings in which.

DETAILED DESCRIPTION

Figure 1:
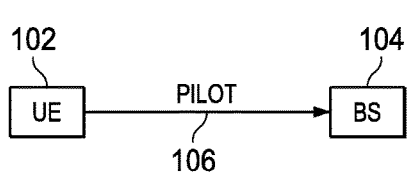
FIG. 1 illustrates pilot signal transmissions between a user equipment (UE) and a base station (BS)

Referring now to the drawings, wherein like reference numbers are used herein to designate like elements throughout, the various views and embodiments of a system and method for reducing pilot signal contamination using orthogonal pilot signals are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Massive MIMO has been recognized as a promising technology to meet the demand for higher data capacity for mobile networks in 2020 and beyond. A Massive MIMO system includes multiple antennas transmitting between transmitting and receiving stations. In order to control communications over the multiple channels, channel state information (CSI) must be obtain concerning the communications channels. Referring now to FIG. 1, there is illustrated the manner in which a UE (user equipment) 102 transmits a pilot channel to a baste station 104 in order to obtain channel state information. The UE 102 transmits a pilot signal 106 to the BS 104 so that the signal can be analyzed to obtain the CSI for an associated channel. Each base station 104 within a Massive MIMO system needs an accurate estimation of the CSI on communications channels with user equipment (UE), either through feedback or channel reciprocity schemes in order to achieve the benefits of massive MIMO.

Figure 2:
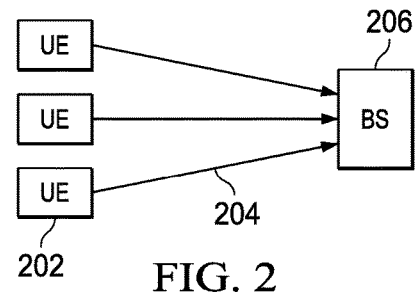
FIG. 2 illustrates conditions for pilot channel contamination.

Time division duplex (TDD) is one mode currently used to acquire timely CSI in massive MIMO systems. The use of non-orthogonal pilot schemes, proposed for channel estimation in multi-cell TDD networks, is considered as a major source of pilot contamination due to the limitations of coherence time. Referring now to FIG. 2, there is provided an illustration of the conditions leading to pilot contamination. Pilot contamination occurs when multiple UEs 202 are transmitting multiple pilot signals 204 to a base station 206. A similar situation can occur in a massive MIMO system where multiple pilot signals 204 are being transmitted from multiple antennas to a receiving location. The multiple pilot signals 204 interfere with each other causing pilot signal contamination that prevents accurate CSI measurements. Other sources of pilot contamination include hardware impairment and non-reciprocal transceivers. Therefore any attempt to use better orthogonal pilot signals is critical for estimating the channel correctly and providing spectral efficiency gains via MIMO.

The increasing demand for higher data rates in wireless mobile communication systems, and the emergence of services like internet of things (IoT), machine-to-machine communication (M2M), e-health, e-learning and e-banking have introduced the need for new technologies that are capable of providing higher capacity compared to the existing cellular network technologies. It is projected that mobile traffic will increase in the next decade in the order of thousands compared to current demand; hence, the need for next generation networks that can deliver the expected capacity compared to existing network deployment. According to Cisco networking index, global mobile data traffic grew 69 percent in 2014, making it 30 times the size of the entire global internet in 2000. The index also shows that wireless data explosion is real and increasing at an exponential rate, which is driven largely by the increased use of smart phones and tablets, and video streaming.

Key technology components that have been identified that require significant advancement are radio links, multi-node/multi-antenna technologies, multi-layer and multi-RAT networks, and spectrum usage. In multi-node/multi-antenna technologies, massive MIMO is being considered in order to deliver very high data rates and spectral efficiency, as well as enhanced link reliability, coverage and energy efficiency. As shown generally in FIG. 3, massive MIMO, is a communication system where a base station (BS) 302 with a few hundred antennas in an array 304 simultaneously serve many tens of user terminals (UTs) 306, each having a single antenna 308, in the same time-frequency resource.

A massive MIMO system as will be more fully described herein below uses antenna arrays for transmission between transceiving locations. The basic advantages offered by the features of massive MIMO can be summarized as follows:

Multiplexing gain: Aggressive spatial multiplexing used in massive MIMO makes it theoretically possible to increase the capacity by 10× or more.

Energy efficiency: The large antenna arrays can potentially reduce uplink (UL) and downlink (DL) transmit powers through coherent combining and an increased antenna aperture. It offers increased energy efficiency in which UL transmit power of each UT can be reduced inversely proportional to the number of antennas at the BS with no reduction in performance.

Spectral efficiency: The large number of service antennas in massive MIMO systems and multiplexing to many users provides the benefit of spectral efficiency.

Increased robustness and reliability: The large number of antennas allows for more diversity gains that the propagation channel can provide. This in turn leads to better performance in terms of data rate or link reliability. When the number of antennas increases without bound, uncorrelated noise, fast fading, and intra-cell interference vanish.

Simple linear processing: Because BS station antenna is much larger than the UT antenna (M$\gg$K), simplest linear pre-coders and detectors are optimal.

Cost reduction in RF power components: Due to the reduction in energy consumption, the large array of antennas allows for use of low cost RF amplifiers in the milli-watt range.

There are real world challenges such as channel estimation and pilot design, antenna calibration, link adaptation and propagation effects in massive MIMO system. To achieve the benefits of massive MIMO in practice, each BS 302 needs accurate estimation of the channel state information (CSI), either through feedback or channel reciprocity schemes. There are different flavors of massive MIMO including frequency-division duplex (FDD) and time-division duplex (TDD). TDD is considered a better mode to acquire timely CSI over FDD because TDD requires estimation, which can be done in one direction and used in both directions; while FDD requires estimation and feed-back for both forward and reverse directions, respectively.

In TDD, the use of channel reciprocity and training signals (pilot) in the UL are key features for its application. Using reciprocity, it is assumed that the forward channel is equal to the transpose of the reverse channel for mathematical analysis and simulations. Therefore, the required channel information is obtained from transmitted pilots on the reverse link from UTs 306. However, in practice, an antenna calibration scheme must be implemented at the transmitter side and/or the receiver sides owing to the different characteristics of transmit or receive RF chains.

Pilot Contamination in Massive MIMO

Some have suggested the minimum number of UL pilot symbols may equal to the number of UTs while others have shown that optimal number of training symbols can be larger than the number of antennas if training and data power are required to be equal. In most studies on pilot contamination, it is assumed that the same size of pilot signals is used in all cells. Contrary to this assumption, the studies have shown that arbitrary pilot allocation is possible in multi-cell systems. Better spectral efficiency in wireless networks requires appropriate frequency or time or pilot reuse factors in order to maximize system throughput. The reuse of frequency has been shown to provide more efficient use of the limited available spectrum, but it also introduces co-channel interference in a massive MIMO system. Therefore, both orthogonality as well as efficient use of time-frequency resources is needed. These are provided by QLO signals where they minimize time-bandwidth products and yet all signals are mutually orthogonal to one another.

The pilot signals which are used to estimate the channels can be contaminated as a result of reuse of non-orthogonal pilot signals in a multi-cell system. This phenomenon causes the inter-cell interference that is proportional to the number of BS antennas, which in turn reduces the achievable rates in the network and affect the spectrum efficiency. Therfore, QLO pilot signals can resolve these degradations. There are several techniques on eliminating inter-cell interference in multi-cell systems in which it is assumed that the BSs 302 are aware of CSI. For instance, coordinated beamforming have been proposed in multi-cell multi-antenna wireless systems in eliminating inter-cell interference with the assumption that the CSI of each UT 306 is available at the BS 302. However, QLO signals as pilots are very usefull in conjuction with these techniques. In practical implementation, estimation of channel state information is required. In the asymptotic regime, where the BS 302 has an unlimited number of antennas and there is no cooperation in the cellular network, not all interference vanishes because of reuse of orthogonal training sequences across adjacent cells leading to inter-cell interference. Therefore, QLO signals as pilots are necessary to reduce such interference.

There are several techniques on reduction of inter-cell interference with a focus on mitigation of pilot contamination in channel estimation. Although most techniques have focused on the reuse of non-orthogonal training sequence as the only source of pilot contamination, there are other sources of pilot contamination. Other sources of pilot contamination could be hardware impairments due to in-band and out-of-bound distortions that interfere with training signals and non-reciprocal transceivers due to internal clock structures of RF chain. Therefore, QLO signals as pilots are critical.

Channel State Information (CSI)

Figure 3:
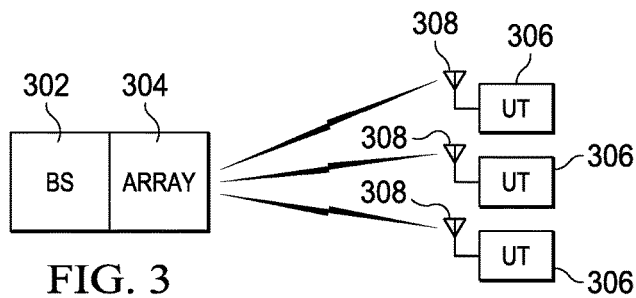
FIG. 3 illustrates a massive MIMO communications system.

Referring now back to FIG. 3, acquisition of timely and accurate CSI at the BS 302 is very important in a wireless communication system and is the central activity of massive MIMO. Good CSI helps to maximize network throughput by focusing of transmit power on the DL and collection of receive power on the UL via a selective process. Therefore, the need for an effective and efficient method for channel estimation (CE) is critical. Channel state estimation error affects MIMO system performance and the effect of imperfect channel knowledge has major implications to the massive MIMO network. The estimation of the CSI can be driven by training sequences (pilot), semi-blind or blind, based techniques. Training overheads for CSI and CSI feedback contributes to increased cost of CSI estimation and decreases multiple access channel efficiency. Here, we purpose different training methods with a focus on training sequence and semi-blind schemes which are based on the use of special type of pilots called QLO pilots that are both applicable to the CE operations in multi-cell massive MIMO systems under the TDD and FDD schemes.

Training Methods

Training-based (TB) channel estimation is one manner for determining CSI in MIMO systems. In training-based estimation, pilot sequences known to the receiver are transmitted over the channel. These known pilot sequences are used by the receiver to build estimates of the random MIMO channel. Two different training schemes are being developed, the conventional time-multiplexed pilot scheme (CP) and superimposed pilot scheme (SIP). In CP, the pilot symbols are transmitted exclusively in dedicated time slots allocated for training. In SIP, the pilot symbols are superimposed to the data and data are transmitted in all time slots. QLO pilot signals can be applied to both techniques.

The performance analysis based on the maximum data rate for the CP and SIP scheme using different scenarios can be done to see which is better for spectral efficiency in different fading environments. Some have considered different training schemes for both the flat-fading and frequency-selective MIMO cases which include design of estimator with both low complexity, good channel tracking ability and optimal placement of pilots. The criteria used to analyze the performance of training-based channel estimates can be classified into two areas:

1) information theoretic (mutual information and channel capacity bounds, cut-off rate)
2) signal processing (channel mean-square error (MSE), symbol MSE, bit error rate (BER))

In large MIMO systems, a key question of interest in channel estimates is how much time should be spent in training, for a given number of transmit and receive antennas, length of coherence time (T) and average received SNR. The trade-off between the quality of channel estimate and information throughput plays an important role in selection of optimal training-based schemes. Hence, channel accesses employed for pilot transmission and for data transmission needs to be optimized for total throughput and fairness of the system.

In massive MIMO, the large number of antennas necessitates the use of channel estimates that have low computational complexity and high accuracy. Where the two constraints work against each other, a good trade-off is required for high data rates and low channel estimation errors. QLO modulation can provide solutions for both. The minimum mean square error (MMSE) and minimum variance unbiased (MVU) channel estimates have high computational complexity for massive MIMO systems compared to the low complexity schemes TDD System In TDD systems, BSs 302 and UTs 306 share the same frequency band for transmission; hence, it is considered an efficient way to obtain CSI for fast changing channels. A distinguishing feature of TDD systems is reciprocity, where it is assumed that the forward channel is equal to the transpose of the reverse channel. This eliminates the need for feedback and allows for acquisition of CSI through reciprocity of wireless medium with UL training signals. The use of a TDD scheme makes a massive MIMO system scalable in the number of service antennas to a desired extent, although the constraint of coherence interval needs to be considered.

The communication is divided into two phases: the UL phase and DL phase. In the UL phase, UTs 306 transmit pilot signals to the BS 302, the BS uses these pilot signals for channel estimate processes and to form a pre-coding matrices. The produced matrices are used to transmit pre-coded data to the UTs 306 located in each BS 302 cell in the DL phase. In a multi-cell scenario, non-orthogonal pilots across neighboring cells are utilized, as orthogonal pilots would need length of at least K×L symbols (K=total number of UTs in a cell and L=total number of cell in the system) owing to frequency reuse factor of 1. The use of a K×L symbols training sequence is not feasible in practice for multi-cell as a result of short channel coherence times due to mobility of UTs. This causes a phenomenon known as pilot contamination and it is as a major impairment in the performance of massive MIMO systems. This phenomenon introduces a finite SIR (signal to interference ratio) to the network, which in turn, causes saturation effect i.e. the system throughput does not grow with the number of BS antennas.

FDD System

The FDD system is described to illustrate the cost of obtaining CSI through feedback in terms of system resources and bandwidth. In FDD systems, the pre-coding in the DL and detection in the UL use different frequency bands. Therefore, the use of feedback is required in getting the CSI. In the process of obtaining the CSI in the DL, the BS 302 first transmits pilot symbols to all UTs 306, and the UTs feedback the estimated CSI (partial or complete) to the BS for the DL channels. The feedback resources used in FDD multi-user diversity system scales with the number of antennas and will therefore grow large in a massive MIMO system with hundreds of antennas which leads to a loss of time-frequency resources. As a result, the overhead in FDD becomes large compared to TDD systems where the overhead scales only with the number of users. For feedback cost and spectral efficiency, the data bandwidth decreases with the number of UTs 306. This is a major challenge in the deployment of massive MIMO system using FDD mode and is also attracting a lot of interest because an FDD system is popular among network providers in the USA.

Mitigating Pilot Contamination

The proposed methods for mitigating pilot channel contamination can be classified into two categories, namely, a pilot-based estimation approach and a subspace-based estimation approach. In the pilot-based approach, channels of UTs 306 are estimated using orthogonal pilots within the cell and non-orthogonal pilots across the cells. In the subspace-based estimation approach, the channels of UTs 306 are estimated with or without limited pilots.

Mitigating Pilot Contamination-Pilot Estimation Approach

A time-shifted protocol for pilot transmission can reduce pilot contamination in multi-user TDD systems. The transmission of pilot signals in each cell is done by shifting the pilot locations in frames so that users in different cells transmit at non-overlapping times. Pilot contamination can be eliminated using the shift method as long as pilots do not overlap in time. The use of power allocation algorithms in combination with the time-shifted protocol can provide significant gains. Although the method looks promising, a major challenge in practice is the control mechanism needed to dynamically synchronize the pilots across several cells so that they do not overlap. It is important to note that due to the emergence of multi-tier heterogeneous cellular networks and dynamic placement of small cells, there will always be overlap in time and frequency somewhere in the network.

Another process is a covariance aided channel estimation method that exploits the covariance information of both desired and interfering user channels. In the ideal case where the desired and the interference covariance span distinct subspaces, the pilot contamination effect tends to vanish in the large antenna array case. As a result, users with mutually non-overlapping angle of arrival (AoA) hardly contaminate each other. Therefore, one can perform a coordinated pilot assignment based on assigning carefully selected groups of users to identical pilot sequences.

A similar approach can be used in a cognitive massive MIMO system. Although this method shows a significant reduction in inter-cell interference and a corresponding increase in UL and DL SINRs, in practice it is difficult to implement because it requires second order statistics of all the UL channels.

A spatial domain method like AoA or direction of arrival (DoA) can also be used where the channel coefficient of the strongest UL path is chosen as the DL beamformer. Based on similar assumptions made that the AoAs of UTs are non-overlapping, an angular tunable predetermined scheme or offline generated codebook can be used to match UL paths and then used as a DL beam vector with the goal of avoiding leaked signals to UTs in adjacent cells. However, in this method the coherence interval needs to be considered while searching for the optimal steering vector to be used for DL beamforming.

Therefore, one can use a pilot contamination elimination scheme which relies on two processing stages namely DL training and scheduled UL training. In the DL stage, UT supported by each BS estimates their specific DL frequency-domain channel transfer functions from the DL pilots of the BS. In the scheduled UL training stage, from each cell at a time, the UTs use the estimated DL frequency-domain channel transfer functions to pre-distort their UL pilot symbols in which the uncontaminated DL channel transfer functions are 'encapsulated' in the UL pilot symbols for exploitation at the BS. Thereafter, the BS extracts all the DL-FDCHTFs of its UTs from the received UL signals by eliminating UL pilot signals of UTs from all other cells, hence, eliminating pilot contamination.

A major drawback of this scheme is the cost of overhead used in training, which in reality can increase infinitely. As a result, a pre-coding matrix at each BS is designed to minimize the sum of the mean-square error of signals received at the UTs in the same cell and the mean-square interference occurred at the UTs in other cells. This technique offers significant performance gains and reduces the inter-cell and intra-cell interference compared to conventional single-cell pre-coding method. However, the method assumes all the UTs are the same without differentiating them based on channels.

There is also a possibility of a pilot contamination pre-coding (PCP) method, which involves limited collaboration between BSs. In the PCP method, the first BS shares the slow-fading coefficient estimate with the other BS or to a network hub, which computes the PCP pre-coding matrices. The computed pre-coded matrices are forwarded to each corresponding BS for computation of the transmitted signal vectors through its M antennas. This process is performed in the UL and DL. The effectiveness of this method lies in the accuracy of the shared information from each BS and the computation of PCP by the network hub. One can also extend PCP method by an outer multi-cellular pre-coding called large-scale fading pre-coding (LSFP) and large scale fading decoding (LSFD) with a finite number of BS antennas. These methods are designed to maximize the minimum rate with individual BS power constraints which delivers significant improvement on the 5% outage rate compared to existing methods.

Mitigating Pilot Contamination-Subspace Based Estimation Approach

Subspace-based channel estimation techniques are a promising approach for increased spectral efficiency because it requires no or a very limited number of pilot symbols for operation. In this approach, signal properties, such as finite alphabet structure, fixed symbol rate, constant modulus, independence, and higher order statistical properties, can be used for channel estimation. This approach can be extended to channel estimation in multi-cell TDD systems with the focus of eliminating pilot contamination. CSI is obtained by applying a subspace estimation technique using eigenvalue decomposition (EVD) on the covariance matrix of the received samples, but up to a scalar ambiguity.

To overcome this ambiguity, short training orthogonal pilots are introduced in all the cells. The EVD-based method is prone to error due to the assumption that channel vectors between the users and the BS become pair-wisely orthogonal when the number of BS antennas M tends towards infinity. However, in practice M is large but finite. To reduce these errors, the EVD algorithm is combined with the iterative least-square with projection algorithms. The EVD method is not affected by pilot contamination and performs better than conventional pilot-based techniques but its accuracy depends on large number of BS antennas and increased sampling data within the coherence time.

There are other blind methods for channel estimation in a cellular systems with power control and power controlled hand-off. The main idea is to find the singular value decomposition of the received signal matrix and to determine which system parameters in the subspace of the signal of interest can be identified blindly using approximate analysis from random matrix theory. In most cases it is sufficient to know the subspace which the channel vectors of interest span, in order to acquire accurate channel estimates for the projected channel. However, the limitation of this approach in practice is that the assumption that all desired channels are stronger than all interfering channels does not always hold. To overcome this limitation, a maximum a-posteriori (MAP) criterion for subspace channel estimation can be used. The MAP method can be more robust and offers better performance than the blind method but with increased complexity.

A diagonal jacket-based estimation method with iterative least-square projection can be used for fast channel estimation and reduction of pilot contamination problems. The BS correlates the received pilot transmissions which are corrupted by pilot transmissions from other cells to produce its channel estimates. As the geometric attenuation from neighboring cells increases, the system performance of a conventional pilot based system degrades due to pilot contamination whereas the diagonal jacket matrix is not affected.

Mitigating Pilot Contamination—a New Orthogonal Set

Figure 4:
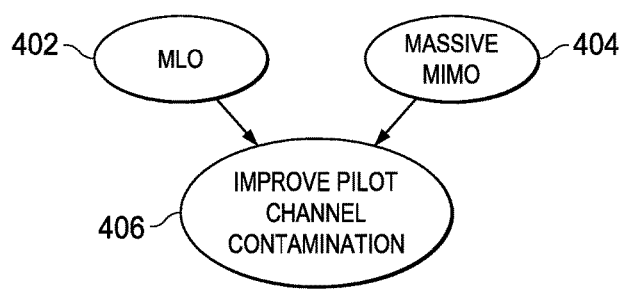
FIG. 4 illustrates the use of multilevel overlay modulation with a massive MIMO system to reduce pilot channel communication.

Referring now to FIG. 4, there is illustrated an approach of mitigating pilot contamination using a new orthogonal basis set by combining multilevel overlay 402 with a massive MIMO system 404, as described in U.S. patent Ser. No. 15/216,474, entitled SYSTEM AND METHOD FOR COMBINING MIMO AND MODE-DIVISION MULTIPLEXING, filed on Jul. 21, 2016, which is incorporated herein by reference, to provide improved pilot channel contamination 406. In this method, the transmission of pilot signals in each cell is done by a set of pilots that minimize the time-frequency product or resources. These signals do not have any correlations with one another neither in time domain or frequency domain. Pilot contamination can be eliminated using these pilot signals as all versions of the signals are mutually orthogonal to any other from within the cell or outside of the cell.

Figure 5:
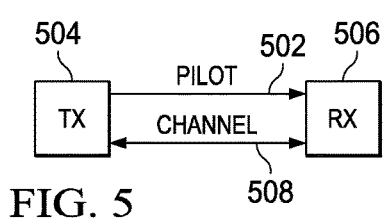
FIG. 5 illustrates the transmission of a pilot channel and communications between a transmitter and a receiver.

As illustrated in FIG. 5, a pilot signal 502 is transmitted between a transmitter 504 (normally as user terminal) to a receiver 506 (normally as base station. The pilot signal includes an impulse signal that is received, detected and processed at the receiver 506. Using the information received from the pilot impulse signal, the channel 508 between the transmitter 504 and receiver 506 may be processed to determine channel state information at the receiver/base station 506 and remove noise, fading and other channel impairment issues from the channel 508. When multiple pilots 502 are transmitted to a receiver 506 rather than a single receiver, pilot signals 502 will interfere with each other causing pilot channel contamination.

Figure 6:
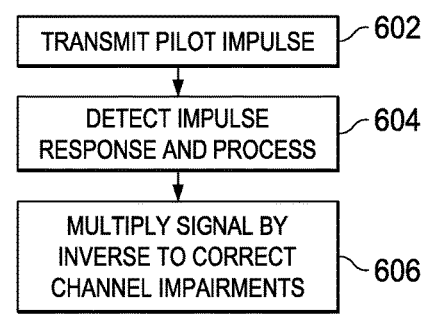
FIG. 6 is a flow diagram illustrating the use of pilot channels to obtain channel state information.

This process is generally described with respect to the flowchart of FIG. 6. The pilot impulse signal is transmitted at 602 over the transmission channel. The impulse response is detected at step 604 and processed to determine the channel state information and impulse response over the transmission channel. Effects of channel impairments such as noise and fading may be countered by multiplying signals transmitted over the transmission channel by the inverse of the impulse response at step 606 in order to correct for the various channel impairments that may be up on the transmission channel. In this way the channel impairments are counteracted and improved signal quality and reception may be provided over the transmission channel.

Cross talk and multipath interference can be corrected using RF Multiple-Input-Multiple-Output (MIMO). Most of the channel impairments can be detected using a control or pilot channel and be corrected using algorithmic techniques (closed loop control system). Interference between the pilot channel signals can be overcome by modulating the pilot signals according to the multiple level overlay/quantum level overlay (MLO/QLO) techniques described herein below. The modulation using the MLO/QLO techniques minimize the time-bandwidth product and prevent interference between the different pilot signals.

Within the notational two-dimensional space, minimization of the time bandwidth product, i.e., the area occupied by a signal in that space, enables denser packing, and thus, the use of more signals, with higher resulting information-carrying capacity and less cross channel interference, between allocated channel. Given the frequency channel delta ($\Delta f$), a given signal transmitted through it in minimum time $\Delta t$ will have an envelope described by certain time-bandwidth minimizing signals. The time-bandwidth products for these signals take the form;

$$\Delta t \Delta f = \tfrac{1}{2}(2n+1)$$

where n is an integer ranging from 0 to infinity, denoting the order of the signal.

These signals form an orthogonal set of infinite elements, where each has a finite amount of energy. They are finite in both the time domain and the frequency domain, and can be detected from a mix of other signals and noise through correlation, for example, by match filtering. Unlike other wavelets, these orthogonal signals have similar time and frequency forms. These types of orthogonal signals that reduce the time bandwidth product and thereby increase the spectral efficiency of the channel. They also prevent interference between pilot channels.

Hermite-Gaussian polynomials are one example of a classical orthogonal polynomial sequence, which are the Eigenstates of a quantum harmonic oscillator. Signals based on Hermite-Gaussian polynomials possess the minimal time-bandwidth product property described below, and may be used for embodiments of MLO systems. However, it should be understood that other signals may also be used, for example orthogonal polynomials such as Jacobi polynomials, Gegenbauer polynomials, Legendre polynomials, Chebyshev polynomials, Laguerre-Gaussian polynomials, Hermite-Gaussian polynomials and Ince-Gaussian polynomials. Q-functions are another class of functions that can be employed as a basis for MLO signals.

In addition to the time bandwidth minimization described above, the plurality of data streams can be processed to provide minimization of the Space-Momentum products in spatial modulation. In this case:

$$\Delta x \Delta p = \tfrac{1}{2}$$

Figure 7:
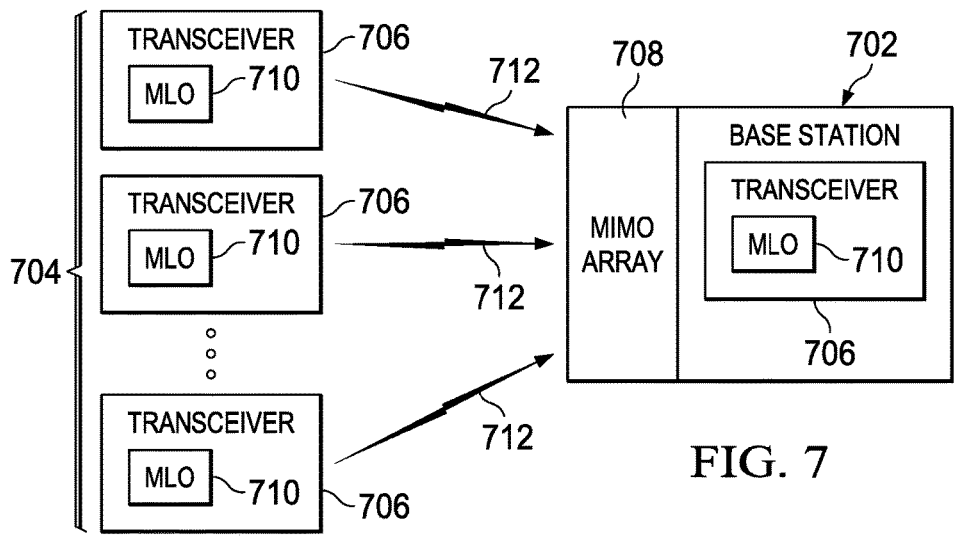
FIG. 7 illustrates a system using MLO/QLO for transmissions between user devices and a base station using a MIMO system.

Referring now to FIG. 7, there is illustrated an example of a system utilizing MIMO transmissions between a base station 702 and a plurality of user devices 704. Each of the base station 702 and the user devices 704 include a transceiver 706 enabling transmission of RF or optical wireless communications between the base station 702 and the plurality of user devices 704. The base station 702 further has associated there with a MIMO array 708 including a plurality of transmitting and receiving antennas. Each of the transceivers 706 include the necessary circuitry and control components for generating multilevel overlay modulation within both signal transmissions and more particularly for use with pilot channel transmissions from the user devices 704 to/from the base station 702. These MLO components 710 provide for the application of multilevel overlay modulation to the pilot channel transmissions and other channel transmissions as described herein. By applying the MLO modulation, each of the pilot channel transmissions 712 between the user devices 704 and the base station 702 will not cause pilot channel interference between the various pilot channel transmissions 712 and enable a greater number of pilot channel transmissions using the MIMO array 708 for reception/transmission without increase in the pilot channel contamination between the various pilot channels 712.

Figure 8:
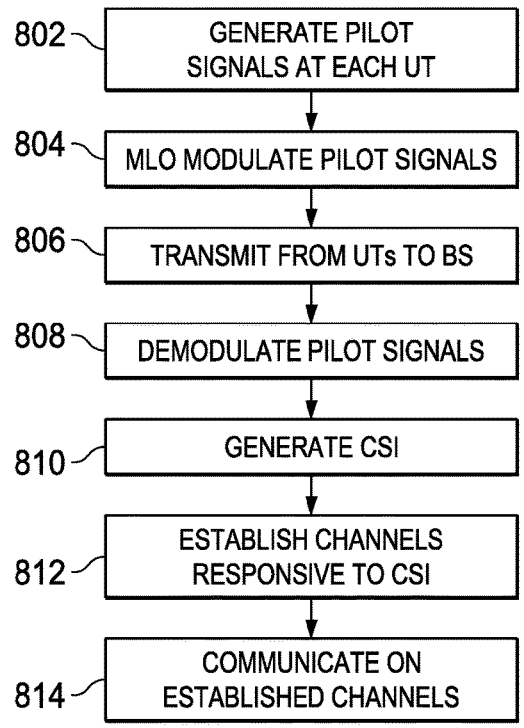
FIG. 8 is a flow diagram illustrating the process of providing pilot channel communications using the system of FIG. 7.

Referring now to FIG. 8, there is illustrated a flow diagram generally describing the process for generating pilot channel 712 communications from user devices 704 to a base station 702 implementing a MIMO array 708. Initially, at step 802, the user devices 704 generate pilot signals for transmission to the base station 702. The generated pilot signals are modulated at step 804 using MLO/QLO modulation techniques prior to their transmission to the base station. Each of the MLO/QLO modulated pilot signals are transmitted from their respective user devices 704 to the base station 702 at step 806. The received pilot signals are demodulated at step 808 to remove the MLO/QLO modulation. The demodulated pilot signals are used at step 810 for generating channel state information for the pilot channels to the base station 702. The base station 702 may then utilize generated channel state information for establishing channels between the base station 702 in the user devices 704. Communications may then be carried out over the establish communication channels at step 814. The transmissions of the pilot signals may also occur from the base station 702 to the user device 704 in a similar fashion.

This system and method for improvement of pilot channel contamination involves the implementation of two major structures. These include a massive MIMO signal transmission system involving a base station 702 including an array of antennas for carrying out transmissions to multiple user devices 704 and a multi-level overlay/quantum level overlay (MLO/QLO) modulation system for modulating pilot channel signals that are transmitted between the user devices and the base station. Each of these are discussed more fully herein below.

Massive MIMO System

As described above, a further manner for limiting contamination of pilot channels is the combination of multiple-input multiple-output (MIMO)-based spatial multiplexing and multiple level overlay (MLO) modulation. Such a combined MIMO+MLO can enhance the performance of pilot channels in free-space Point-to-Point communications systems. This can be done at both RF as well as optical frequencies. Inter-channel crosstalk effects on the pilot channels can be minimized by the inherent orthogonality of the MLO modulation and by the use of MIMO signal processing.

When multiple input/multiple output (MIMO) systems were described in the mid-to-late 1990s by Dr. G. Foschini and Dr. A. Paulraj, the astonishing bandwidth efficiency of such techniques seemed to be in violation of the Shannon limit. But, there is no violation of the Shannon limit because the diversity and signal processing employed with MIMO transforms a point-to-point single channel into multiple parallel or matrix channels, hence in effect multiplying the capacity. MIMO offers higher data rates as well as spectral efficiency. This is more particularly So illustrated in FIG. 9 wherein a single transmitting antenna 902 transmits to a single receiving antenna 904 using a total power signal Ptotal. The MIMO system illustrated in FIG. 10 provides the same total power signal Ptotal to a multi-input transmitter consisting of a plurality of antennas 1002. The receiver includes a plurality of antennas 1004 for receiving the transmitted signal. Many standards have already incorporated MIMO. ITU uses MIMO in the High Speed Downlink Packet Access (HSPDA), part of the UMTS standard. MIMO is also part of the 802.11n standard used by wireless routers as well as 802.16 for Mobile WiMax, LTE, LTE Advanced and future 5G standards.

Figure 9:
FIG. 9 illustrates a single input, single output (SISO) channel.
Figure 10:
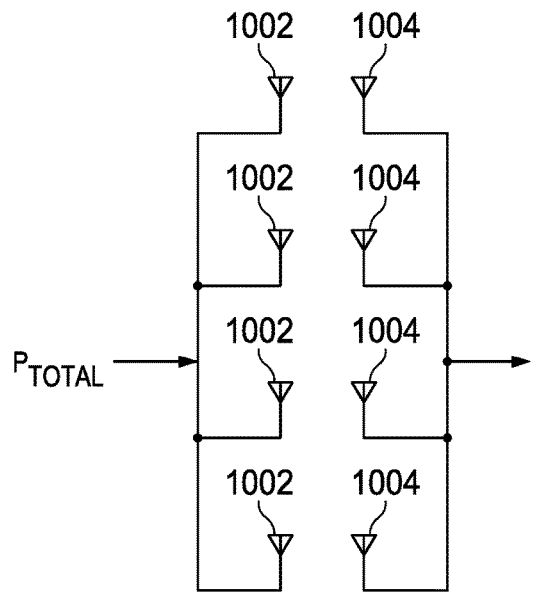
FIG. 10 illustrates a multiple input, multiple output (MIMO) channel.

A traditional communications link, which is called a single-in-single-out (SISO) channel as shown in FIG. 9, has one transmitter 902 and one receiver 904. But instead of a single transmitter and a single receiver several transmitters 1002 and receivers 1004 may be used as shown in FIG. 10. The SISO channel thus becomes a multiple-in-multiple-out, or a MIMO channel; i.e. a channel that has multiple transmitters and multiple receivers.

The capacity of a SISO link is a function simply of the channel SNR as given by the Equation: $C = \log_2(1+SNR)$.

This capacity relationship was of course established by Shannon and is also called the information-theoretic capacity. The SNR in this equation is defined as the total power divided by the noise power. The capacity is increasing as a log function of the SNR, which is a slow increase. Clearly increasing the capacity by any significant factor takes an enormous amount of power in a SISO channel. It is possible to increase the capacity instead by a linear function of power with MIMO.

With MIMO, there is a different paradigm of channel capacity. If six antennas are added on both transmit and receive side, the same capacity can be achieved as using 100 times more power than in the SISO case. The transmitter and receiver are more complex but have no increase in power at all. The same performance is achieved in the MIMO system as is achieved by increasing the power 100 times in a SISO system.

Figure 11:
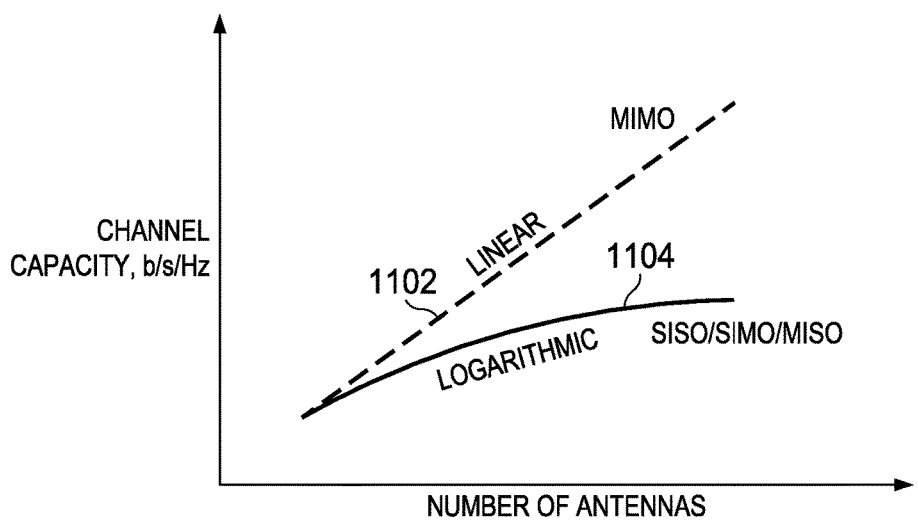
FIG. 11 illustrates the manner in which a MIMO channel increases capacity without increasing power.

In FIG. 11, the comparison of SISO and MIMO systems using the same power. MIMO capacity 1102 increases linearly with the number of antennas, where SISO/SIMO/MISO systems 1104 all increase only logarithmically.

At conceptual level, MIMO enhances the dimensions of communication. However, MIMO is not Multiple Access. It is not like FDMA because all "channels" use the same frequency, and it is not TDMA because all channels operate simultaneously. There is no way to separate the channels in MIMO by code, as is done in CDMA and there are no steerable beams or smart antennas as in SDMA. MIMO exploits an entirely different dimension.

A MIMO system provides not one channel but multiple channels, NR×NT, where NT is the number of antennas on the transmit side and NR, on the receive side. Somewhat like the idea of OFDM, the signal travels over multiple paths and is recombined in a smart way to obtain these gains.

Figure 12:
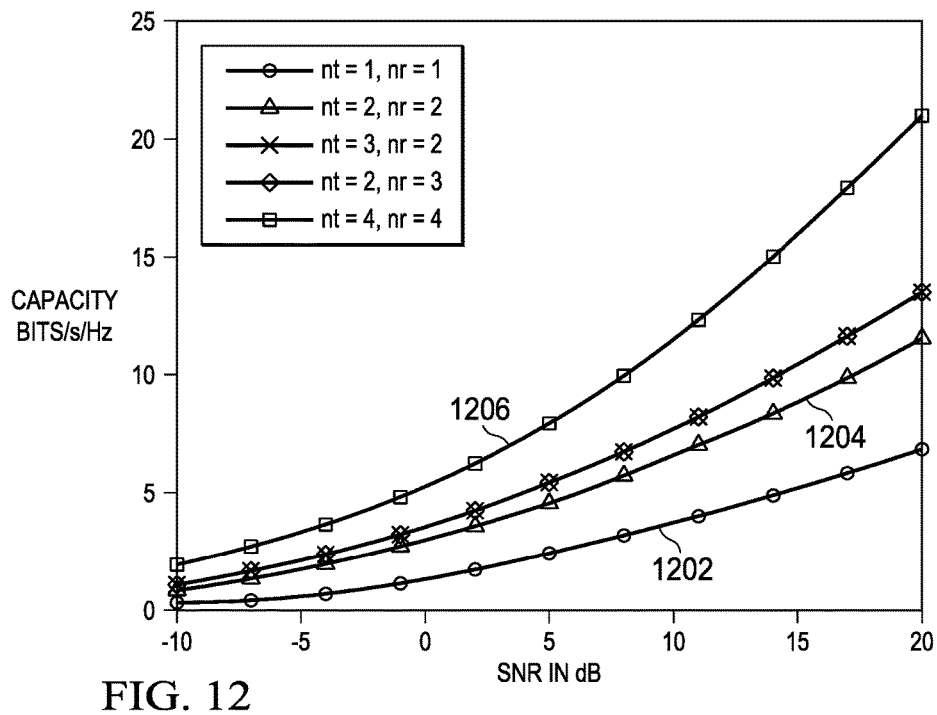
FIG. 12 compares capacity between a MIMO system and a single channel system.

In FIG. 12 there is illustrated a comparison of a SISO channel 1202 with 2 MIMO channels 1204, 1206, (2×2) and (4×4). At SNR of 10 dB, a 2×2 MIMO system 1204 offers 5.5 b/s/Hz and whereas a 4×4 MIMO link offers over 10 b/s/Hz. This is an amazing increase in capacity without any increase in transmit power caused only by increasing the number of transceivers. Not only that, this superb performance comes in when there are channel impairments, those that have fading and Doppler.

Extending the single link (SISO) paradigm, it is clear that to increase capacity, a link can be replicated N times. By using N links, the capacity is increased by a factor of N. But this scheme also uses N times the power. Since links are often power-limited, the idea of N link to get N times capacity is not much of a trick. Can the number of links be increased but not require extra power? How about if two antennas are used but each gets only half the power? This is what is done in MIMO, more transmit antennas but the total power is not increased. The question is how does this result in increased capacity?

Figure 13:
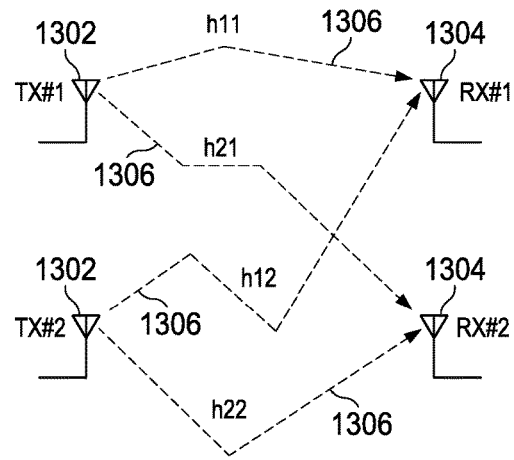
FIG. 13 illustrates multiple links provided by a MIMO system.

The information-theoretic capacity increase under a MIMO system is quite large and easily justifies the increase in complexity as illustrated in FIG. 13. First and second transmitters 1302 transmit to a pair of receivers 1304. Each of the transmitters 1302 has a transmission link 1306 to an antenna of a receiver 1304. Transmitter TX#1 transmits on link h11 and h21. Transmitter TX#2 transmits on links h12 and h22. This provides a matrix of transmission capacities according to the matrix:

$$H = \begin{bmatrix} h_{11} & h_{12} \\ h_{21} & h_{22} \end{bmatrix}$$

And a total transmission capacity of according to the equation:

$$C = \max_{tr(R_{xx})=P_T} \log\det\left\{I_N + \frac{I}{\sigma_n^2} H R_{xx} H^H\right\}$$

In simple language, MIMO is any link that has multiple transmit and receive antennas. The transmit antennas are co-located, at a little less than half a wavelength apart or more. This figure of the antenna separation is determined by mutual correlation function of the antennas using Jakes Model. The receive antennas 1304 are also part of one unit. Just as in SISO links, the communication is assumed to be between one sender and one receiver. MIMO is also used in a multi-user scenario, similar to the way OFDM can be used for one or multiple users. The input/output relationship of a SISO channel is defined as:

$$r = hs + n$$

where r is the received signal, s is the sent signal and h, the impulse response of the channel is n, the noise. The term h, the impulse response of the channel, can be a gain or a loss, it can be phase shift or it can be time delay, or all of these together. The quantity h can be considered an enhancing or distorting agent for the signal SNR.

Figure 14:
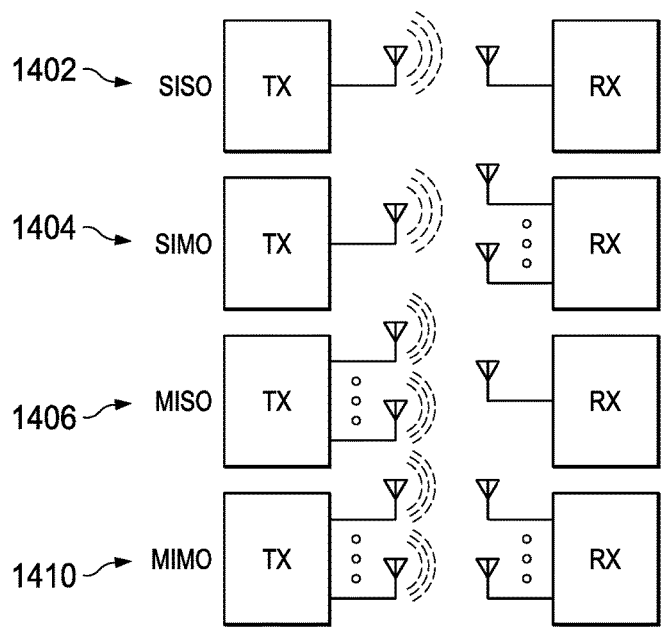
FIG. 14 illustrates various types of channels between a transmitter and a receiver.

Referring now to FIG. 14 there are illustrated various types of multiple input and multiple output transmission systems. System 1402 illustrates a single input single output SISO system. System 1404 illustrates a single input multiple output receiver SIMO system. System 1406 illustrates a multiple input single output MISO system. Finally, a multiple input multiple output MIMO system is illustrated at 1410. The channels of the MIMO system 1410 can be thought of as a matrix channel.

Using the same model a SISO, MIMO channel can now be described as:

$$R = HS + N$$

In this formulation, both transmit and receive signals are vectors. The channel impulse response h, is now a matrix, H. This channel matrix H is called Channel Information. The channel matrix H can be created using a pilot signal over a pilot channel in the manner described herein above. The signals on the pilot channel may be sent in a number of different forms such as HG beams, LG beams or other orthogonal beams of any order.

Dimensionality of Gains in MIMO

The MIMO design of a communications link can be classified in these two ways.

MIMO using diversity techniques

MIMO using spatial-multiplexing techniques

Both of these techniques are used together in MIMO systems. With first form, Diversity technique, same data is transmitted on multiple transmit antennas and hence this increases the diversity of the system.

Diversity means that the same data has traveled through diverse paths to get to the receiver. Diversity increases the reliability of communications. If one path is weak, then a copy of the data received on another path may be just fine.

Figure 15:
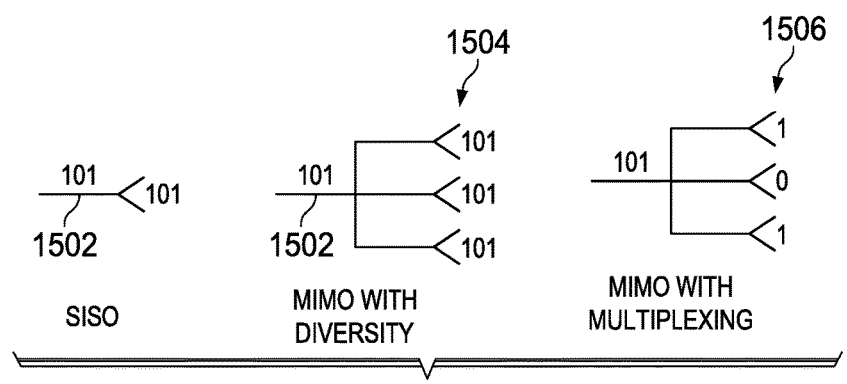
FIG. 15 illustrates an SISO system, MIMO diversity system and the MIMO multiplexing system.

FIG. 15 illustrates a source 1502 with data sequence 101 to be sent over a MIMO system with three transmitters. In the diversity form 1504 of MIMO, same data, 101 is sent over three different transmitters. If each path is subject to different fading, the likelihood is high that one of these paths will lead to successful reception. This is what is meant by diversity or diversity systems. This system has a diversity gain of 3.

The second form uses spatial-multiplexing techniques. In a diversity system 1504, the same data is sent over each path. In a spatial-multiplexing system 1506, the data 1,0,1 is multiplexed on the three channels. Each channel carries different data, similar to the idea of an OFDM signal. Clearly, by multiplexing the data, the data throughput or the capacity of the channel is increased, but the diversity gain is lost. The multiplexing has tripled the data rate, so the multiplexing gain is 3 but diversity gain is now 1. Whereas in a diversity system 1504 the gain comes in form of increased reliability, in a spatial-multiplexing system 1506, the gain comes in the form of an increased data rate.

Characterizing a MIMO Channel

When a channel uses multiple receive antennas, $N_R$, and multiple transmit antennas, $N_T$, the system is called a multiple-input, multiple output (MIMO) system.
When $N_T = N_R = 1$, a SISO system.
When $N_T > 1$ and $N_R = 1$, called a MISO system,
When $N_T = 1$ and $N_R > 1$, called a SIMO system.
When $N_T > 1$ and $N_R > 1$, is a MIMO system.

In a typical SISO channel, the data is transmitted and reception is assumed. As long as the SNR is not changing dramatically, no questions are asked regarding any information about the channel on a bit by bit basis. This is referred to as a stable channel. Channel knowledge of a SISO channel is characterized only by its steady-state SNR.

Figure 16:
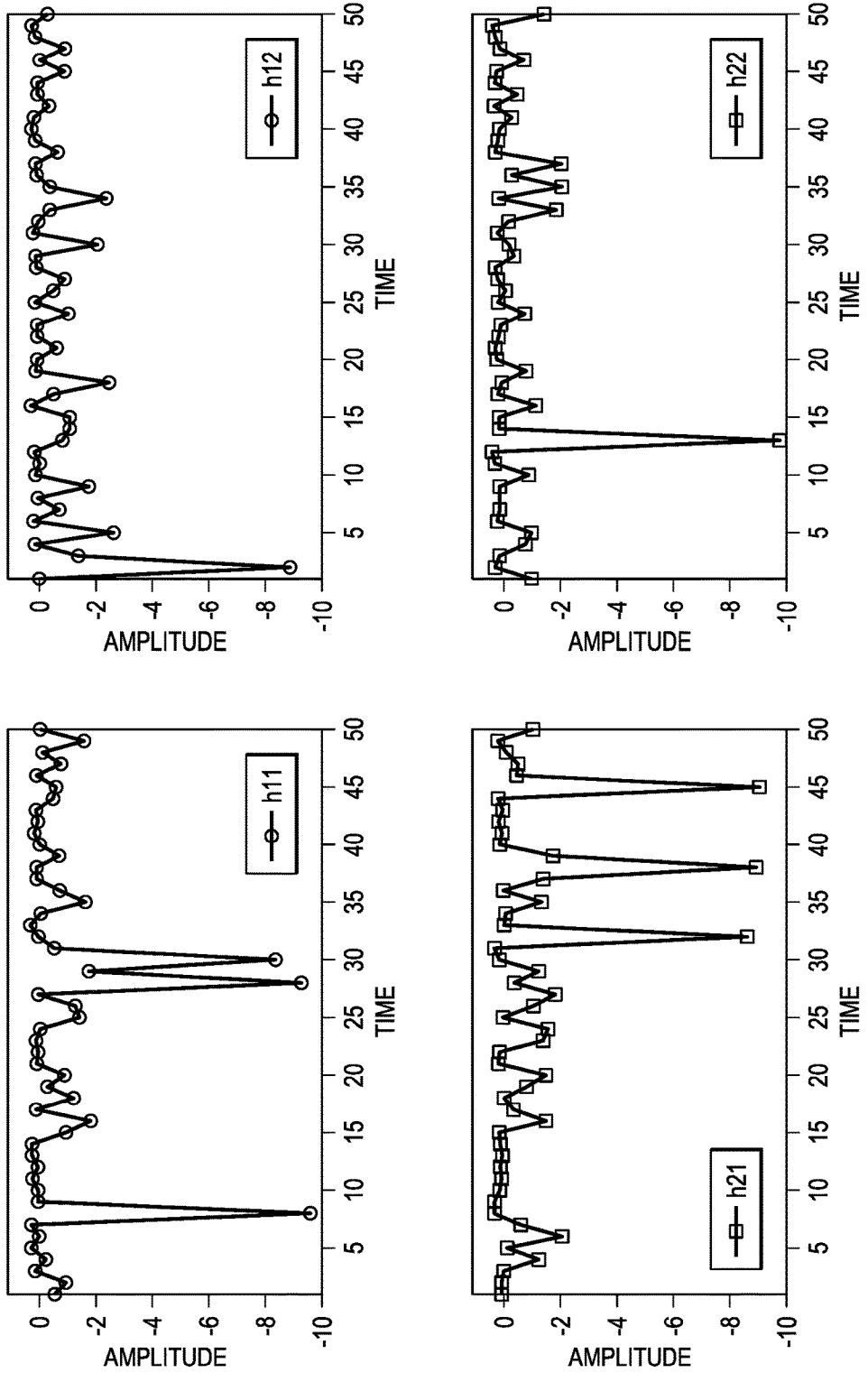
FIG. 16 illustrates the loss coefficients of a 2×2 MIMO channel over time.

What is meant by channel knowledge for a MIMO channel? Assume a link with two transmitters and two receivers on each side. The same symbol is transmitted from each antenna at the same frequency, which is received by two receivers. There are four possible paths as shown in FIG. 13. Each path from a transmitter to a receiver has some loss/gain associated with it and a channel can be characterized by this loss. A path may actually be sum of many multipath components but it is characterized only by the start and the end points. Since all four channels are carrying the same symbol, this provides diversity by making up for a weak channel, if any. In FIG. 16 there is illustrated how each channel may be fading from one moment to the next. At time 32, for example, the fade in channel $h_{21}$ is much higher than the other three channels.

As the number of antennas and hence the number of paths increase in a MIMO system, there is an associated increase in diversity. Therefore with the increasing numbers of transmitters, all fades can probably be compensated for. With increasing diversity, the fading channel starts to look like a Gaussian channel, which is a welcome outcome.

The relationship between the received signal in a MIMO system and the transmitted signal can be represented in a matrix form with the H matrix representing the low-pass channel response $h_{ij}$, which is the channel response from the $j_{th}$ antenna to the $i_{th}$ receiver. The matrix H of size ($N_R$, $N_T$) has $N_R$ rows, representing $N_R$ received signals, each of which is composed of $N_T$ components from $N_T$ transmitters. Each column of the H matrix represents the components arriving from one transmitter to $N_R$ receivers.

The H matrix is called the channel information. Each of the matrix entries is a distortion coefficient acting on the transmitted signal amplitude and phase in time-domain. To develop the channel information, a symbol is sent from the first antenna, and a response is noted by all three receivers. Then the other two antennas do the same thing and a new column is developed by the three new responses.

The H matrix is developed by the receiver. The transmitter typically does not have any idea what the channel looks like and is transmitting blindly. If the receiver then turns around and transmits this matrix back to the transmitter, then the transmitter would be able to see how the signals are faring and might want to make adjustments in the powers allocated to its antennas. Perhaps a smart computer at the transmitter will decide to not transmit on one antenna, if the received signals are so much smaller (in amplitude) than the other two antennas. Maybe the power should be split between antenna 2 and 3 and turn off antenna 1 until the channel improves.

Modeling a MIMO Channel

Starting with a general channel which has both multipath and Doppler (the conditions facing a mobile in case of a cell phone system), the channel matrix H for this channel takes this form.

$$H(\tau, t) = \begin{bmatrix} h_{11}(\tau, t) & h_{11}(\tau, t) & \ldots & h_{1N_T}(\tau, t) \\ h_{21}(\tau, t) & h_{22}(\tau, t) & \ldots & h_{2N_T}(\tau, t) \\ \vdots & \vdots & \ddots & \vdots \\ h_{N_R,1}(\tau, t) & h_{N_R,2}(\tau, t) & \ldots & h_{N_R,N_T}(\tau, t) \end{bmatrix}$$

Each path coefficient is a function of not only time t because the transmitter is moving but also a time delay relative to other paths. The variable $\tau$ indicates relative delays between each component caused by frequency shifts. The time variable t represents the time-varying nature of the channel such as one that has Doppler or other time variations.

If the transmitted signal is $s_j(t)$, and the received signal is $r_i(t)$, the input-output relationship of a general MIMO channel is defined as:

$$r_i(t) = \sum_{j=1}^{N_T} \int_{-\infty}^{\infty} h_{ij}(\tau, t) S_j(t-\tau) dt = \sum_{j=1}^{N_T} h_{ij}(\tau, t) * S_j(\tau) \; i = 1, 2 \ldots N_R$$

The channel equation for the received signal $r_i(t)$ is expressed as a convolution of the channel matrix H and the transmitted signals because of the delay variable $\tau$. This relationship can be defined in matrix form as:

$r(t) = H(\tau,t) * s(t)$

If the channel is assumed to be flat (non-frequency selective), but is time-varying, i.e. has Doppler, the relationship is written without the convolution as:

$r(t) = H(t)s(t)$

In this case, the H matrix changes randomly with time. If the time variations are very slow (non-moving receiver and transmitter) such that during a block of transmission longer than the several symbols, the channel can be assumed to be non-varying, or static. A fixed realization of the H matrix for a fixed Point-to-Point scenario can be written as:

$r(t) = H(t)s(t)$

The individual entries can be either scalar or complex.

For analysis purposes, important assumptions can be made about the H matrix. We can assume that it is fixed for a period of one or more symbols and then changes randomly. This is a fast change and causes the SNR of the received signal to change very rapidly. Or we can assume that it is fixed for a block of time, such as over a full code sequence, which makes decoding easier because the decoder does not have to deal with a variable SNR over a block. Or we can assume that the channel is semi-static such as in a TDMA system, and its behavior is static over a burst or more. Each version of the H matrix seen is a realization. How fast these realizations change depends on the channel type.

$$H = \begin{bmatrix} h_{11} & h_{12} & \ldots & h_{1N_T} \\ h_{21} & h_{22} & \ldots & h_{2N_T} \\ \vdots & \vdots & \ddots & \vdots \\ h_{N_R,1} & h_{N_R,2} & \ldots & h_{N_R,1} \end{bmatrix}$$

For a fixed random realization of the H matrix, the input-output relationship can be written without the convolution as:

$r(t)=H\ s(t)$

In this channel model, the H matrix is assumed to be fixed. An example of this type of situation where the H matrix may remain fixed for a long period would be a Point-to-Point system where we have fixed transmitter and receiver. In most cases, the channel can be considered to be static. This allows us to treat the channel as deterministic over that period and amenable to analysis. In a point-to-point system, the channel is semi-static and it behavior is static over a burst or more. Each version of the H matrix is a realization.

The power received at all receive antennas is equal to the sum of the total transmit power, assuming channel offers no gain or loss. Each entry $h_{ij}$ comprises an amplitude and phase term. Squaring the entry $h_{ij}$ give the power for that path. There are $N_T$ paths to each receiver, so the sum of j terms, provides the total transmit power. Each receiver receives the total transmit power. For this relation, the transmit power of each transmitter is assumed to be 1.

$$\sum_{j=1}^{N_T} (h_{ij})^2 = N_T(1) = N_T$$

The H matrix is a very important construct in understanding MIMO capacity and performance. How a MIMO system performs depends on the condition of the channel matrix H and its properties. The H matrix can be thought of as a set of simultaneous equations. Each equation represents a received signal which is a composite of unique set of channel coefficients applied to the transmitted signal.

$r_1 = h_{11}s + h_{12}s \ldots + h_{1N_2}s$

If the number of transmitters is equal to the number of receivers, there exists a unique solution to these equations. If the number of equations is larger than the number of unknowns (i.e. $N_R > N_T$), the solution can be found using a zero-forcing algorithm. When $N_T = N_R$, (the number of transmitters and receivers are the same), the solution can be found by (ignoring noise) inverting the H matrix as in:

$\hat{s}(t) = H^{-1}r(t)$

The system performs best when the H matrix is full rank, with each row/column meeting conditions of independence. What this means is that best performance is achieved only when each path is fully independent of all others. This can happen only in an environment that offers rich scattering, fading and multipath, which seems like a counter-intuitive statement. Looking at the equation above, the only way to extract the transmitted information is when the H matrix is invertible. And the only way it is invertible is if all its rows and columns are uncorrelated. And the only way this can occur is if the scattering, fading and all other effects cause the channels to be completely uncorrelated.

Diversity Domains and MIMO Systems

In order to provide a fixed quality of service, a large amount of transmit power is required in a Rayleigh or Rican fading environment to assure that no matter what the fade level, adequate power is still available to decode the signal. Diversity techniques that mitigate multipath fading, both slow and fast are called Micro-diversity, whereas those resulting from path loss, from shadowing due to buildings etc. are an order of magnitude slower than multipath, are called Macro-diversity techniques. MIMO design issues are limited only to micro-diversity. Macro-diversity is usually handled by providing overlapping base station coverage and handover algorithms and is a separate independent operational issue.

In time domain, repeating a symbol N times is the simplest example of increasing diversity. Interleaving is another example of time diversity where symbols are artificially separated in time so as to create time-separated and hence independent fading channels for adjacent symbols. Error correction coding also accomplishes time-domain diversity by spreading the symbols in time. Such time domain diversity methods are termed here as temporal diversity.

Frequency diversity can be provided by spreading the data over frequency, such as is done by spread spectrum systems. In OFDM frequency diversity is provided by sending each symbol over a different frequency. In all such frequency diversity systems, the frequency separation must be greater than the coherence bandwidth of the channel in order to assure independence.

The type of diversity exploited in MIMO is called Spatial diversity. The receive side diversity, is the use of more than one receive antenna. SNR gain is realized from the multiple copies received (because the SNR is additive). Various types of linear combining techniques can take the received signals and use special combining techniques such are Maximal Ratio Combining, Threshold Combing etc. The SNR increase is possible via combining results in a power gain. The SNR gain is called the array gain.

Transmit side diversity similarly means having multiple transmit antennas on the transmit side which create multiple paths and potential for angular diversity. Angular diversity can be understood as beam-forming. If the transmitter has information about the channel, as to where the fading is and which paths (hence direction) is best, then it can concentrate its power in a particular direction. This is an additional form of gain possible with MIMO.

Another form of diversity is Polarization diversity such as used in satellite communications, where independent signals are transmitted on each polarization (horizontal vs. vertical). The channels, although at the same frequency, contain independent data on the two polarized hence orthogonal paths. This is also a form of MIMO where the two independent channels create data rate enhancement instead of diversity. So satellite communications is a form of a (2, 2) MIMO link.

Related to MIMO

There are some items that need be explored as they relate to MIMO but are usually not part of it. First are the smart antennas used in set-top boxes. Smart antennas are a way to enhance the receive gain of a SISO channel but are different in concept than MIMO. Smart antennas use phased-arrays to track the signal. They are capable of determining the direction of arrival of the signal and use special algorithms such as MUSIC and MATRIX to calculate weights for its phased arrays. They are performing receive side processing only, using linear or non-linear combining.

Rake receivers are a similar idea, used for multipath channels. They are a SISO channel application designed to enhance the received SNR by processing the received signal along several "fingers" or correlators pointed at particular multipath. This can often enhance the received signal SNR and improve decoding. In MIMO systems Rake receivers are not necessary because MIMO can actually simplify receiver signal processing.

Beamforming is used in MIMO but is not the whole picture of MIMO. It is a method of creating a custom radiation pattern based on channel knowledge that provides antenna gains in a specific direction. Beam forming can be used in MIMO to provide further gains when the transmitter has information about the channel and receiver locations.

Importance of Channel State Information

Dealing with Channel matrix H is at the heart of how MIMO works. In general, the receiver is assumed to be able to get the channel information easily and continuously. It is not equally feasible for the transmitter to obtain a fresh version of the channel state information, because the information has gotten impaired on the way back. However, as long as the transit delay is less than channel coherence time, the information sent back by the receiver to the transmitter retains its freshness and usefulness to the transmitter in managing its power. At the receiver, we refer to channel information as Channel State (or side) Information at the Receiver, CSIR. Similarly when channel information is available at the transmitter, it is called CSIT. CSI, the channel matrix can be assumed to be known instantaneously at the receiver or the transmitter or both. Although in short term the channel can have a non-zero mean, it is assumed to be zero-mean and uncorrelated on all paths. When the paths are correlated, then clearly, less information is available to exploit. But the channel can still be made to work.

Channel information can be extracted by monitoring the received gains of a known sequence over, for example, a pilot channel. In Time Division Duplex (TDD) communications where both transmitter and the receiver are on the same frequency, the channel condition is readily available to the transmitter. In Frequency Division Duplex (FDD) communications, since the forward and reverse links are at different frequencies, this requires a special feedback link from the receiver to the transmitter. In fact receive diversity alone is very effective but it places greater burden on the smaller receivers, requiring larger weight, size and complex signal processing hence increasing cost.

Transmit diversity is easier to implement in a cellular system from a system point of view because the base station towers in a cell system are not limited by power or weight. In addition to adding more transmit antennas on the base station towers, space-time coding is also used by the transmitters. This makes the signal processing required at the receiver simpler.

MIMO Gains

The goal is to transmit and receive data over several independently fading channels such that the composite performance mitigates deep fades on any of the channels. To see how MIMO enhances performance in a fading or multipath channel, the BER for a BPSK signal is examined as a function of the receive SNR.

$$P_e \approx Q(\sqrt{2\|h\|^2 SNR})$$

The quantity ($h^2 \times SNR$) is the instantaneous SNR.

Now assume that there are L possible paths, where $L=N_R \times N_T$, with $N_T$=number of transmitter and $N_R$=number of receive antennas. Since there are several paths, the average BER can be expressed as a function of the average channel gain over all these paths. This quantity is the average gain over all channels, L.

$$\|h\|^2 = Avg[|h_1|^2] = \sum_{l=1}^{L} |h_1|^2$$

The average SNR can be rewritten as a product of two terms.

$$\|h\|^2 SNR = \underline{L \times SNR} \cdot \frac{1}{L}\|h\|^2$$

The first part $\underline{L \times SNR}$ is a linear increase in SNR due to the L paths. This term is called by various names, including power gain, rate gain or array gain. This term can also include beamforming gain. Hence increasing the number of antennas increases the array gain directly by the factor L. The second term is called diversity gain. This is the average gain over L different paths.

It seems intuitive that if one of the paths exhibits deep fading then, when averaged over a number of independent paths, the deep fades can be averaged out. (We use the term channel to mean the composite of all paths.) Hence on the average we would experience a diversity gain as long as the path gains across the channels are not correlated. If the gains are correlated, such as if all paths are mostly line-of-sight, we would obtain only an array gain and very little diversity gain. This is intuitive because a diversity gain can come only if the paths are diverse, or in other words uncorrelated.

MIMO Advantages

Operating in Fading Channels

The most challenging issue in communications signal design is how to mitigate the effects of fading channels on the signal BER. A fading channel is one where channel gain is changing dramatically, even at high SNR, and as such it results in poor BER performance as compared to an AWGN channel. For communications in a fading channel, a way to convert the highly variable fading channel to a stable AWGN-like channel is needed.

Multipath fading is a phenomenon that occurs due to reflectors and scatters in the transmission path. The measure of multipath is Delay Spread, which is the RMS time delay as a function of the power of the multipath. This delay is converted to a Coherence Bandwidth (CB), a metric of multipath. A time delay is equivalent to a frequency shift in the frequency domain. So any distortion that delays a signal, changes its frequency. Thus, delay spread>bandwidth distortion.

Whether a signal is going through a flat or a frequency-selective fading at any particular time is a function of coherence bandwidth of the channel as compared with its bandwidth as shown in Table I below. If the Coherence bandwidth of the channel is larger than the signal bandwidth, then we have a flat or a non-frequency selective channel. What coherence means is that all the frequencies in the signal respond similarly or are subject to the same amplitude distortion. This means that fading does not affect frequencies differentially, which is a good thing. Differential distortion is hard to deal with. So of all types of fading, flat fading is the least problematic.

The next source of distortion is Doppler. Doppler results in different distortions to the frequency band of the signal. The measure of Doppler spread is called Coherence Time (CT) (no relationship to Coherence Bandwidth from the flat-fading case). The comparison of the CT with the symbol time determines the speed of fading. So if the coherence time is very small, compared to the symbol time, that's not good.

The idea of Coherence Time and Coherence Bandwidth is often confused. Flatness refers to frequency response and not to time. So Coherence Bandwidth determines whether a channel is considered flat or not.

Coherence Time, on the other hand has to do with changes over time, which is related to motion. Coherence Time is the duration during which a channel appears to be unchanging. One can think about Coherence Time when Doppler or motion is present. When Coherence Time is longer than symbol time, then a slow fading channel is provided and when symbol time is longer than Coherence time, a fast fading channel is provided. So slowness and fastness mean time based fading.

TABLE I

MIMO channel Types and their Measures

| Channel Spread | Channel Selectivity | Type | Measure |
|---|---|---|---|
| Delay Spread | Frequency | Non-selective | Coherence Bandwidth > Signal Bandwidth |
| | Frequency | Selective | Signal Bandwidth > Coherence Bandwidth |
| Doppler Spread | Time | Slow-fading | Coherence Time > Symbol Time |
| | | Fast-fast fading | Symbol Time > Coherence Time |
| Angle Spread | Beam pattern | — | Coherence Distance |

In addition to these fast channel effects, there are mean path losses as well as rain losses, which are considered order-of-magnitude slower effects and are managed operationally and so will not be part of the advantages of MIMO.

How MIMO Creates Performance Gains in a Fading Channel

Shannon defines capacity of a channel as a function of its SNR. Underlying this is the assumption that the SNR is invariant. For such a system, Shannon capacity is called its ergodic capacity. Since SNR is related to BER, the capacity of a channel is directly related to how fast the BER declines with SNR. The BER needs to decrease quickly with increasing power.

The Rayleigh channel BER when compared to an AWGN channel for the same SNR is considerably bigger and hence the capacity of a Rayleigh channel which is the converse of its BER, is much lower. Using the BER of a BPSK signal as a benchmark, one can examine the shortfall of a Rayleigh channel and see how MIMO can help to mitigate this loss.

For a BPSK signal, the BER in an AWGN channel is given by setting $\|h^2\|=1$.

$$P_e \approx Q(\sqrt{2SNR})$$

The BER of the same channel in a Rayleigh channel is given by $$P_e = \frac{1}{2}\left(1 - \sqrt{\frac{SNR}{1+SNR}}\right) \approx \frac{1}{2SNR}$$

Figure 17:
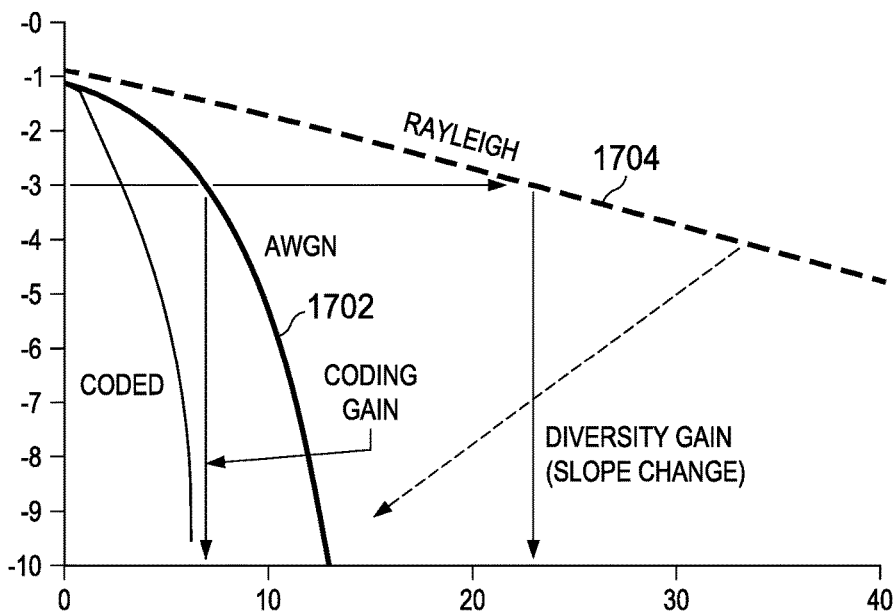
FIG. 17 illustrates the manner in which the bit error rate declines as a function of the exponent of the signal-to-noise ratio.

FIG. 17 shows the BER of an AWGN and a Rayleigh channel as a function of the SNR. The AWGN BER 1702 varies by the inverse of the square of the SNR, $SNR^{-2}$ and declines much faster than the Rayleigh channel 1704 which declines instead by $SNR^{-1}$. Hence an increase in SNR helps the Rayleigh channel 1704 much less than it does an AWGN channel 1702. The Rayleigh channel 1704 improves much more slowly as more power is added.

FIG. 17 also illustrates that for a BER of $10^{-3}$, an additional 17 dB of power is required in a Rayleigh channel 1704. This is a very large differential, nearly 50 times larger than AWGN 1702. One way to bring the Rayleigh curve 1704 closer to the AWGN curve 1702 (which forms a limit of performance) is to add more antennas on the receive or the transmit-side hence making SISO into a MIMO system.

Starting with just one antenna, the number of receive antennas is increased to $N_R$, while keeping one transmitter, making it a SIMO system. By looking at the asymptotic BER at large SNR (large SNR has no formal definition, anything over 15 dB can be considered large), a determination can be made of the gain caused by adding just one more antenna to the N antennas. The ratio of the BER to the BER due to one more antenna may then be determined.

$$\frac{BER(N, SNR)}{BER(N+1, SNR)} = SNR\left(1 + \frac{1}{2N+1}\right)$$

The gain from adding one more antenna is equal to SNR multiplied by a delta increase in SNR. The delta increase diminishes as more and more antennas are added. The largest gain is seen when going from a single antenna to two antennas, (1.5 for going from 1 to 2 vs. 1.1 for going from 4 to 5 antennas). This delta increase is similar in magnitude to the slope of the BER curve at large SNR.

Formally, a parameter called Diversity order d, is defined as the slope of the BER curve as a function of SNR in the region of high SNR.

$$d = -\lim_{SNR \to \infty} \log\frac{BER(SNR)}{SNR}$$

Figure 18:
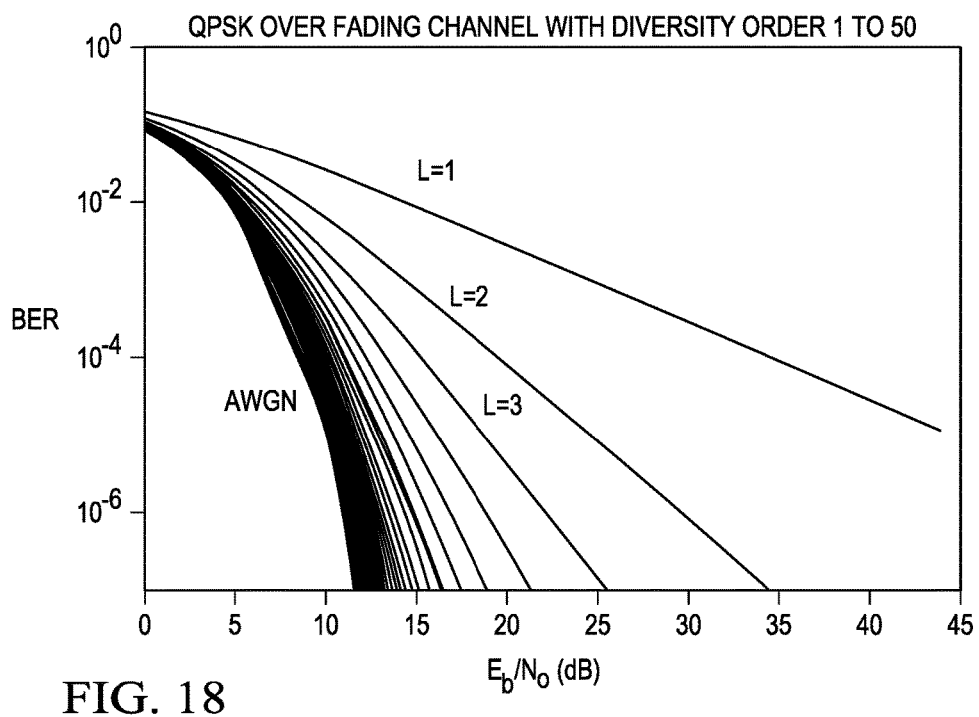
FIG. 18 illustrates diversity gains in a fading channel.

FIG. 18 shows the gains possible with MIMO as more receive antennas are added. As more and more antennas are added, a Rayleigh channel approaches the AWGN channel. Can one keep on increasing the number of antennas indefinitely? No, beyond a certain number, increase in number of paths L does not lead to significant gains. When complexity is taken into account, a small number of antennas is enough for satisfactory performance.

Capacity of MIMO and SISO Channels

All system designs strive for a target capacity of throughput. For SISO channels, the capacity is calculated using the well-known Shannon equation. Shannon defines capacity for an ergodic channel that data rate which can be transmitted with asymptotically small probability of error. The capacity of such a channel is given in terms of bits/sec or by normalizing with bandwidth by bits/sec/Hz. The second formulation allows easier comparison and is the one used more often. It is also bandwidth independent.

$$C = W\log_2\left(1 + \frac{P}{N_o W}\right) \text{b/s}$$

$$\frac{C}{W} = \log_2(1 + SNR) \text{b/s/}H_z$$

At high SNRs, ignoring the addition of 1 to SNR, the capacity is a direct function of SNR.

$$\frac{C}{W} \approx \log_2(SNR) \text{b/s/}H_z$$

This capacity is based on a constant data rate and is not a function of whether channel state information is available to the receiver or the transmitter. This result is applicable only to ergodic channels, ones where the data rate is fixed and SNR is stable.

Capacity of MIMO Channels

Shannon's equation illustrates that a particular SNR can give only a fixed maximum capacity. If SNR goes down, so will the ability of the channel to pass data. In a fading channel, the SNR is constantly changing. As the rate of fade changes, the capacity changes with it.

A fixed H matrix can be used as a benchmark of performance where the basic assumption is that, for that one realization, the channel is fixed and hence has an ergodic channel capacity. In other words, for just that little time period, the channel is behaving like an AWGN channel. By breaking a channel into portions of either time or frequency so that in small segments, even in a frequency-selective channel with Doppler, channel can be treated as having a fixed realization of the H matrix, i.e. allowing us to think of it instantaneously as a AWGN channel. The capacity calculations are preformed over several realizations of H matrix and then compute average capacity over these. In flat fading channels the channel matrix may remain constant and or may change very slowly. However, with user motion, this assumption does not hold.

Decomposing a MIMO Channel into Parallel Independent Channels

Conceptually MIMO may be thought of as the transmission of same data over multiple antennas, hence it is a matrix channel. But there is a mathematical trick that lets us decompose the MIMO channel into several independent parallel channels each of which can be thought of as a SISO channel. To look at a MIMO channel as a set of independent channels, an algorithm called Singular Value Decomposition (SVD) is used. The process requires pre-coding at the transmitter and receiver shaping at the receiver.

Input and Output Auto-Correlation

Assuming that a MIMO channel has N transmitters and M receivers, the transmitted vector across $N_T$ antennas is given by $x_1, x_2, x_3, \ldots x_{NT}$. Individual transmit signals consist of symbols that are zero mean circular-symmetric complex Gaussian variables. (A vector x is said to be circular-symmetric if $e^{j\theta}x$ has same distribution for all $\theta$.) The covariance matrix for the transmitted symbols is written as:

$$R_{xx} = E\{xx^H\}$$

Where symbol H stands for the transpose and component-wise complex conjugate of the matrix (also called Hermitian) and not the channel matrix. This relationship gives us a measure of correlated-ness of the transmitted signal amplitudes.

When the powers of the transmitted symbols are the same, a scaled identity matrix is provided. For a (3×3) MIMO system of total power of $P_T$, equally distributed this matrix is written as:

$$R_{xx} = P_T \begin{bmatrix} 1 & 0 & 0 \\ 0 & 1 & 0 \\ 0 & 0 & 1 \end{bmatrix}$$

If the same system distributes the power differently say in ratio of 1:2:3, then the covariance matrix would be:

$$R_{xx} = P_T \begin{bmatrix} 1 & 0 & 0 \\ 0 & 2 & 0 \\ 0 & 0 & 3 \end{bmatrix}$$

If the total transmitted power is $P_T$ and is equal to trace of the Input covariance matrix, the total power of the transmitted signal can be written as the trace of the covariance matrix.

$$P = tr\{R_{xx}\}$$

The received signal is given by:

$$r = Hx + n$$

The noise matrix (Nx1) components are assumed to be ZMGV (zero-mean Gaussian variable) of equal variance. We can write the covariance matrix of the noise process similar to the transmit symbols as:

$$R_{nn} = E\{nn^H\}$$

And since there is no correlation between its rows, this can be written as:

$$R_{nn} = \sigma^2 1_M$$

Which says that each of the M received noise signals is an independent signal of noise variance, $\sigma^2$.

Each receiver receives a complex signal consisting of the sum of the replicas from N transmit antennas and an independent noise signal. Assuming that the power received at each receiver is not the same, the SNR of the $m_{th}$ receiver may be written as:

$$\gamma_m = \frac{P_m}{\sigma^2}$$

where $P_m$ is some part of the total power. However the average SNR for all receive antennas would still be equal to $P_T/\sigma^2$, where $P_T$ is total power because $$P_T = \sum_{m=1}^{N_T} P_m$$

Now we write the covariance matrix of the receive signal using as:

$$R_{rr} = HR_{xx}H^H + R_{nn}$$

where $R_{xx}$ is the covariance matrix of the transmitted signal. The total receive power is equal to the trace of the matrix $R_{rr}$.

Singular Value Decomposition (SVD)

Figure 19:
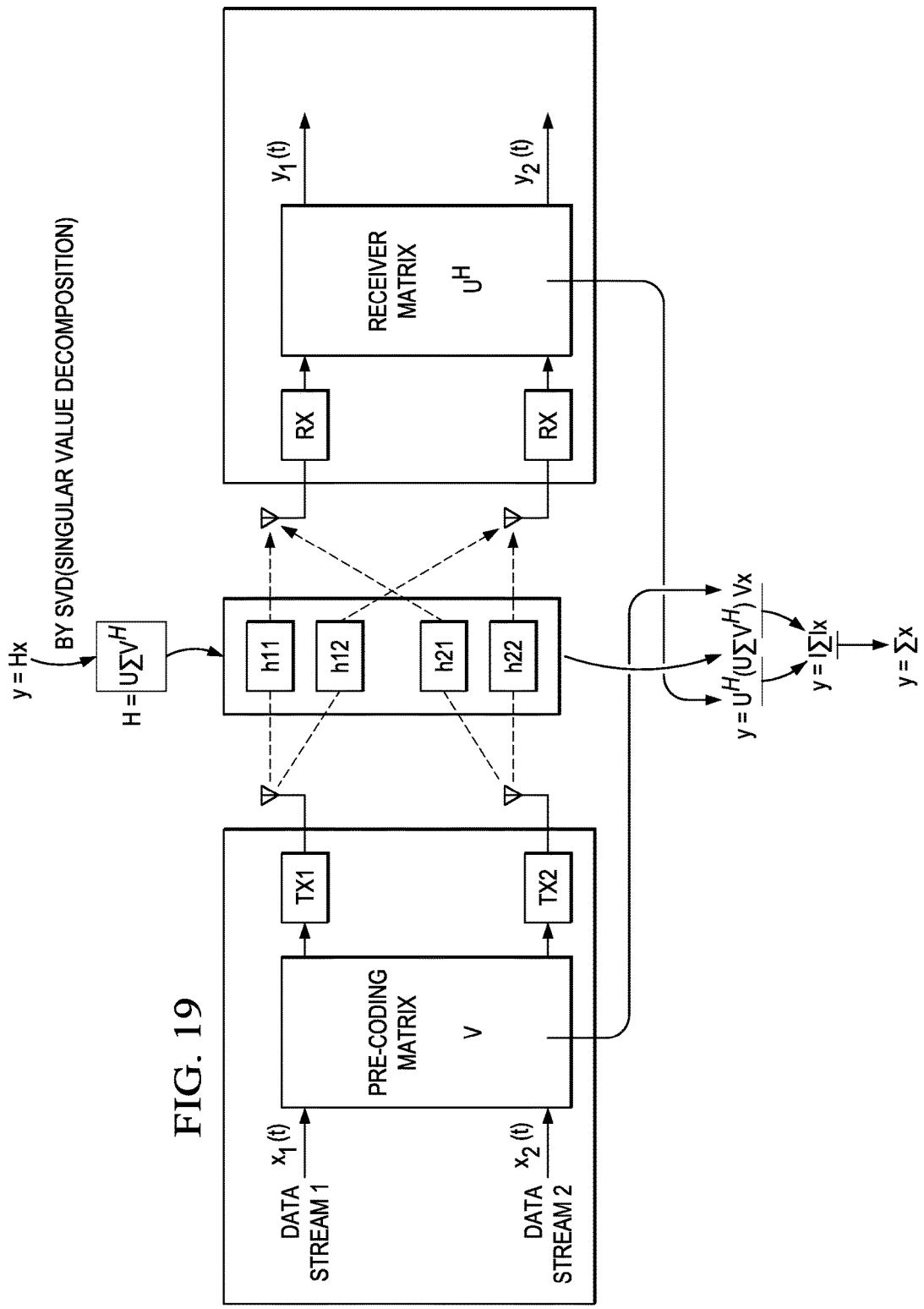
FIG. 19 illustrates a model decomposition of a MIMO channel with full CSI.

Referring now to FIG. 19 there is illustrated a modal decomposition of a MIMO channel with full CSI. SVD is a mathematical application that lets us create an alternate structure of the MIMO signal. In particular, the MIMO signal is examined by looking at the eigenvalues of the H matrix. The H matrix can be written in Singular Value Decomposition (SVD) form as:

$$H = U\Sigma V^H$$

where U and V are unitary matrices ($U^H U = I_{NR}$, and $V^H V = I_{NT}$) and $\Sigma$ is a $N_R \times N_T$ diagonal matrix of singular values ($\sigma_i$) of H matrix. If H is a full Rank matrix then we have a min ($N_R, N_T$) of non-zero singular values, hence the same number of independent channels. The parallel decomposition is essentially a linear mapping function performed by pre-coding the input signal by multiplying it with matrix V.

$$x = V\tilde{x}$$

The received signal y is given by multiplying it with $U^H$, $$\tilde{y} = U^H(Hx + n)$$

Now multiplying it out, and setting value of H, to get:

$$\tilde{y} = U^H(U\Sigma V^H x + n)$$

Now substitute:

$$x = V\tilde{x}$$

To obtain:

$$\begin{aligned}\tilde{y} &= U^H(\underline{U\Sigma V^H}x + n)\\&= U^H(U\Sigma V^\dagger V\tilde{x} + n)\\&= U^H U\Sigma V^\dagger V\tilde{x} + U^H n\\&= \Sigma\tilde{x} + \tilde{n}\end{aligned}$$

Figure 20:
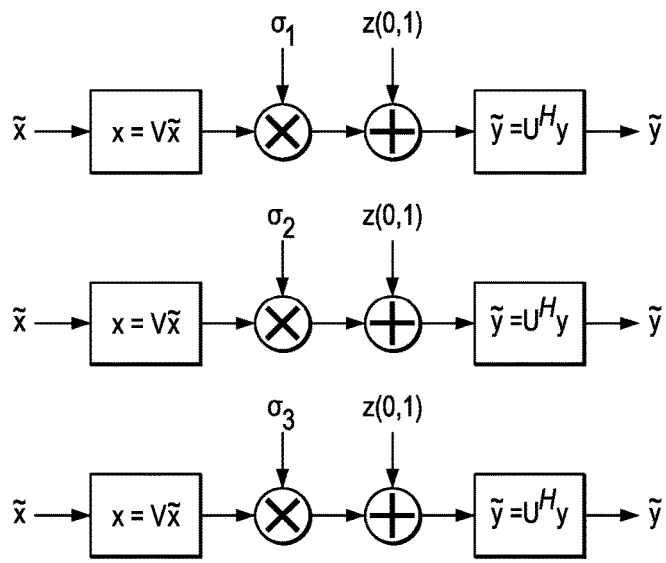
FIG. 20 illustrates SVD decomposition of a matrix channel into parallel equivalent channels.

In the last result, the output signal is in form of a pre-coded input signal times the singular value matrix, $\Sigma$. Note that the multiplication of noise n, by the unitary matrix $U^H$ does not change the noise distribution. Note that the only way SVD can be used is if the transmitter knows what pre-coding to apply, which of course requires knowledge of the channel by the transmitter. As shown in FIG. 20, SVD is used for decomposing a matrix channel is decomposed into parallel equivalent channels.

Since SVD entails greater complexity, not the least of which is feeding back CSI to the transmitter, with the same results, why should we consider the SVD approach? The answer is that the SVD approach allows the transmitter to optimize its distribution of transmitted power, thereby providing a further benefit of transmit array gain.

The channel eigenmodes (or principle components) can be viewed as individual channels characterized by coefficients (eigenvalues). The number of significant eigenvalues specifies the maximum degree of diversity. The larger a particular eigenvalue, the more reliable is that channel. The principle eigenvalue specifies the maximum possible beamforming gain. The most important benefit of the SVD approach is that it allows for enhanced array gain—the transmitter can send more power over the better channels, and less (or no) power over the worst ones. The number of principle components is a measure of the maximum degree of diversity that can be realized in this way.

Channel Capacity of a SIMO, MISO Channel

Before discussing the capacity of a MIMO channel, let's examine the capacity of a channel that has multiple receivers or transmitters but not both. We modify the SNR of a SISO channel by the gain factor obtained from having multiple receivers.

$$C_{SIMO} = \log_2(1 + \|h\|^2 SNR) \text{ bits/s/Hz}$$

The channel consists of only $N_R$ paths and hence the channel gain is constrained by:

$$\|h\|^2 = N_R$$

This gives the ergodic capacity of the SIMO channel as:

$$C_{SIMO} = \log_2(1 + N_R SNR) \text{ bits/s/Hz}$$

So the SNR is increasing by a factor of $N_R$. This is a logarithmic gain. Note that we are assuming that the transmitter has no knowledge of the channel.

Next consider a MISO channel, with multiple transmitters but one receiver. The channel capacity of a MISO channel is given by:

$$C_{MISO} = \log_2\left(1 + \frac{\|h\|^2 SNR}{N_T}\right) \text{ bits/s/Hz}$$

Why divide by $N_T$? Compared to the SIMO case, where each path has SNR based on total power, in this case, total power is divided by the number of transmitters. So the SNR at the one receiver keeps getting smaller as more and more transmitters are added. For a two receiver case, each path has a half of the total power. But since there is only one receiver, this is being divided by the total noise power at the receiver, so the SNR is effectively cut in half.

Again if the transmitter has no knowledge of the channel, the equation devolves in to a SISO channel:

$$C_{MISO} = \log_2(1 + SNR) \text{ bits/s/Hz}$$

The capacity of a MISO channel is less than a SIMO channel when the channel in unknown at the transmitter. However, if the channel is known to the transmitter, then it can concentrate its power into one channel and the capacity of SIMO and MISO channel becomes equal under this condition.

Both SIMO and MISO can achieve diversity but they cannot achieve any multiplexing gains. This is obvious for the case of one transmitter, (SIMO). In a MISO system all transmitters would need to send the same symbol because a single receiver would have no way of separating the different symbols from the multiple transmitters. The capacity still increases only logarithmically with each increase in the number of the transmitters or the receivers. The capacity for the SIMO and MISO are the same. Both channels experience array gain of the same amount but fall short of the MIMO gains.

Figure 21:
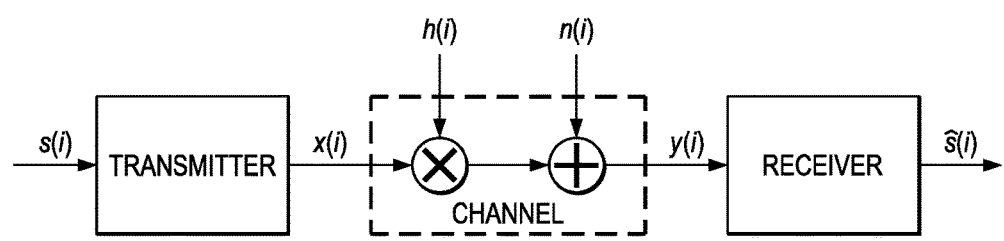
FIG. 21 illustrates a system channel model.

Assuming a discrete MIMO channel model as shown in FIG. 21. The channel gain maybe time-varying but assumed to be fixed for a block of time and random. Assume that total transmit power is P, bandwidth is B and the PSD of noise process is $N_0/2$.

Assume that total power is limited by the relationship:

$$E(x^H x) = \sum_{i=1}^{N_T} E\{|x_i|^2\} = N_T$$

The input covariance matrix may be written as $R_{xx}$ $$R_{xx} = E\{xx^H\}$$

The trace of this matrix is equal to:

$$\rho = \frac{P}{\#paths} = \text{tr}\{R_{xx}\}$$

or the power per path. When the powers are uniformly distributed (equal) then this is equal to a unity matrix. The covariance matrix of the output signal would not be unity as it is a function of the H matrix.

Now the capacity expression for a MIMO matrix channel using a fixed but random realization the H matrix can be developed. Assuming availability of CSIR, the capacity of a deterministic channel is defined by Shannon as:

$$C = \max_{f(x)} I(x; y)$$

I(x;y) is called the mutual information of x and y. It is the capacity of the channel is the maximum information that can be transmitted from x to y by varying the channel PDF. The value f(x) is the probability density function of the transmit signal x. From information theory, the relationship of mutual information between two random variables as a function of their differential entropy may be obtained.

$$I(x;y) = \mathcal{E}_{(y)} - \mathcal{E}_{(y|x)}$$

The second term is constant for a deterministic channel because it is function only of the noise. So mutual information is maximum only when the term H(y), called differential entropy is maximum.

The differential entropy H(y) is maximized when both x and y are zero-mean, Circular-Symmetric Complex Gaussian (ZMCSCG) random variable. Also from information theory, the following relationships are provided:

$$\mathcal{E}_{(y)} = \log_2\{det(\pi e R_{yy})\}$$

$$\mathcal{E}_{(y|x)} = \log_2\{det(\pi e N_o I_{N_R})\}$$

Now we write the signal y as:

$$y = \sqrt{\gamma} H x + z$$

Here γ is instantaneous SNR. The auto-correlation of the output signal y which we need for (27.48) is given by $$R_{yy} = E\{yy^H\} = E\{(\sqrt{\gamma} H x + z)(\sqrt{\gamma} x^H H^H + z^H)\} =$$
$$E\{(\gamma H x x^H H^H + z z^H)\} = \gamma H E\{xx^H\} H^H + E\{zz^H\}$$

$$R_{yy} = \gamma H R_{xx} H^H + N_o I_{N_R}$$

From here we can write the expression for capacity as $$C = \log_2 det\left(I_{N_R} + \frac{SNR}{N_T} HH^H\right)$$

When CSIT is not available, we can assume equal power distribution among the transmitters, in which case $R_{xx}$ is an identity matrix and the equation becomes $$C = \log_2 det\left(I_{N_R} + \frac{SNR}{N_T} HH^H\right)$$

This is the capacity equation for MIMO channels with equal power. The optimization of this expression depends on whether or not the CSI (H matrix) is known to the transmitter.

Now note that as the number of antennas increases, we get $$\lim_{N \to \infty} \frac{1}{M} HH^H = I_N$$

This means that as the number of paths goes to infinity, the power that reaches each of the infinite number of receivers becomes equal and the channel now approaches an AWGN channel.

This gives us an expression about the capacity limit of a $N_T \times N_R$ MIMO system.

$$C = M \log_2 det(I_{N_R} + SNR)$$

where M is the minimum of $N_T$ and $N_R$, the number of the antennas. Thus, the capacity increases linearly with M, the minimum of ($N_T$, $N_R$). If a system has (4, 6) antennas, the maximum diversity that can be obtained is of order 4, the small number of the two system parameters.

Channel Known at Transmitter

The SVD results can be used to determine how to allocate powers across the transmitters to get maximum capacity. By allocating the power non-equally, the capacity can be increased. In general, channels with high SNR (high $\sigma_i$), should get more power than those with lower SNR.

There is a solution to the power allocation problem at the transmitter called the water-filling algorithm. This solution is given by:

$$\frac{P_i}{P} = \begin{cases} \left(\frac{1}{\gamma_o} - \frac{1}{\gamma_i}\right) & \gamma_i > \gamma_o \\ 0 & \gamma_i \leq \gamma_o \end{cases}$$

Where $\gamma_o$ is a threshold constant. Here $\gamma_i$ is the SNR of the $i_{th}$ channel.

When comparing the inverse of the threshold with the inverse of the channel SNR and the inverse difference is less than the threshold, no power is allocated to the $i_{th}$ channel. If the difference is positive then more power may be added to see if it helps the overall performance.

The capacity using the water-filling algorithm is given by:

$$C = \sum_{i: \gamma_i > \gamma_o} B \log_2\left(\frac{\gamma_i}{\gamma_o}\right)$$

The thing about the water-filling algorithm is that it is much easier to comprehend then is it to describe using equations. Think of it as a boat sinking in the water. Where would a person sit on the boat while waiting for rescue, clearly the part that is sticking above the water, right? The analogous part to the boat above the surface are the channels that can overcome fading. Some of the channels reach the receiver with enough SNR for decoding. So the data/power should go to these channels and not to the ones that are under water. So basically, power is allocated to those channels that are strongest or above a pre-set threshold.

Channel Capacity in Outage

The Rayleigh channels go through such extremes of SNR fades that the average SNR cannot be maintained from one time block to the next. Due to this, they are unable to support a constant data rate. A Rayleigh channel can be characterized as a binary state channel; an ergodic channel but with an outage probability. When it has a SNR that is above a minimum threshold, it can be treated as ON and capacity can be calculated using the information-theoretic rate. But when the SNR is below the threshold, the capacity of the channel is zero. The channel is said to be in outage.

Although ergodic capacity can be useful in characterizing a fast-fading channel, it is not very useful for slow-fading, where there can be outages for significant time intervals. When there is an outage, the channel is so poor that there is no scheme able to communicate reliably at a certain fixed data rate.

The outage capacity is the capacity that is guaranteed with a certain level of reliability. The outage capacity is defined as the information rate that is guaranteed for (100−p) % of the channel realizations. A 1% outage probability means that 99% of the time the channel is above a threshold of SNR and can transmit data. For real systems, outage capacity is the most useful measure of throughput capability.

Question: which would have higher capacity, a system with 1% outage or 10% outage? The high probability of outage means that the threshold can be set lower, which also means that system will have higher capacity, of course only while it is working which is 90% of the time.

The capacity equation of a Rayleigh channel with outage probability $\varepsilon$, can be written as:

$$C_{out=(1-P_{out})B \ log \ 2}(1\gamma_{min})$$

The probability of obtaining a minimum threshold value of the SNR, assuming it has a Rayleigh distribution, can be calculated. The capacity of channel under outage probability ε is given by:

$$C_{\varepsilon} = \log_2\left(1 + SNR \cdot \ln\left(\frac{1}{1-\varepsilon}\right)\right)$$

The Shannon's equation has been modified by the outage probability.

Capacity Under a Correlated Channel

MIMO gains come from the independence of the channels. The development of ergodic capacity assumes that channels created by MIMO are independent. But what happens if there is some correlation among the channels which is what happens in reality due to reflectors located near the base station or the towers. Usually in cell phone systems, the transmitters (on account on being located high on towers) are less subject to correlation than are the receivers (the cell phones).

Figure 22:
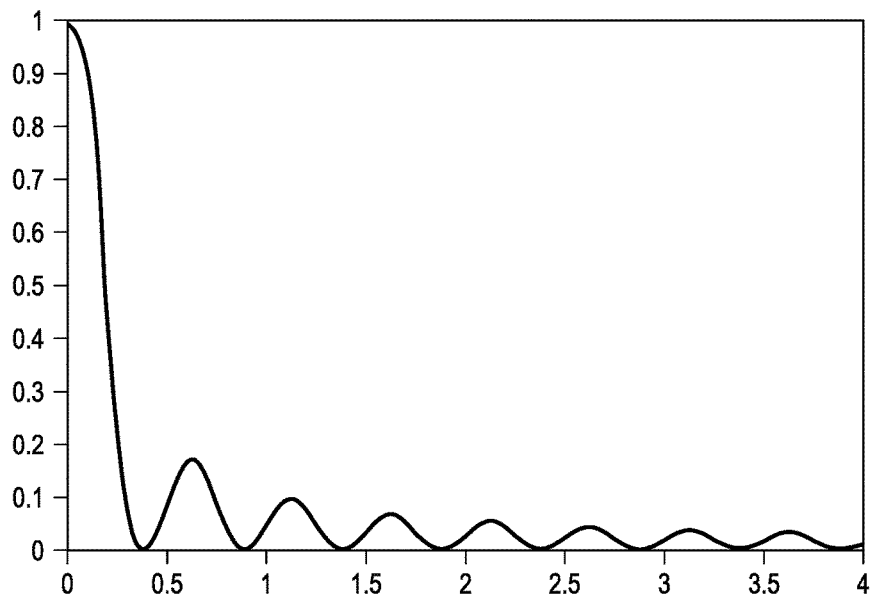
FIG. 22 illustrates the receive antenna distance versus correlation.

The signal correlation, r, between two antennas located a distance d apart, transmitting at the same frequency, is given by zero order Bessel function defined as:

$$r = J_o^2\left(\frac{2\pi d}{\lambda}\right)$$

where $J_0(x)$ is the zero-th order Bessel function. FIG. 22 shows the correlation coefficient r, plotted between receive antennas vs. d/λ using the Jakes model.

An antenna that is approximately half a wavelength away experiences only 10% correlation with the first. To examine the effect that correlation has on system capacity, the channel mat channel matrix H is replaced in the ergodic equation as follows:

$$C = \log_2 \det\left(I_{N_R} + \frac{SNR}{N_T}HH^H\right)$$

Assuming equal transmit powers, with a correlation matrix, assuming that the following normalization holds. This normalization allows the correlation matrix, rather than covariance.

$$\sum_{i,j=1}^{N_T \cdot N_R} |h_{i,j}|^2 = 1$$

Now we write the capacity equation instead as $$C = \log_2 M \det\left(I + \frac{SNR}{M} \cdot R\right)$$

where R is the normalized correlation matrix, such that its components $$r_{ij} = \frac{1}{\sqrt{\sigma_i \sigma_j}} \sum_K h_{ik} h_{jk}^* = \sum_K h_{ik} h_{jk}^*$$

We can write the capacity equation as:

$$C = M \cdot \log_2 det(I+SNR) + \log_2 det(R)$$

The first underlined part of the expression is the capacity of M independent channels and the second is the contribution due to correlation. Since the determinant R is always <=1, then correlation always results in degradation to the ergodic capacity.

An often used channel model for M=2, and 4 called the Kronecker Delta model takes this concept further by separating the correlation into two parts, one near the transmitter and the other near the receiver. The model assumes each part to be independent of the other. Two correlation matrices are defined, one for transmit, $R_T$ and one for receiver $R_R$. The complete channel correlation is assumed to be equal to the Kronecker product of these two smaller matrices.

$$R_{MIMO} = R_R \otimes R_T$$

The correlation among the columns of the H matrix represents the correlation between the transmitter and correlation between rows in receivers. These two one-sided matrices can be written as:

$$R_R = \frac{1}{\beta} E\{HH^H\}$$

$$R_T = \frac{1}{\alpha} E\{H^H H\}^T$$

The constant parameters (the correlation coefficients for each side) satisfy the relationship:

$$\alpha\beta = Tr(R_{MIMO})$$

Now to see how correlation at the two ends affects the capacity, the random channel H matrix is multiplied with the two correlation matrices as follows. The matrices can be produced in a number of fashions. In some cases, test data is available which can be used in the matrix, in others, a generic form based on Bessel coefficients is used. If the correlation coefficient on each side as a parameter is used, each correlation matrix can be written as:

$$R_R = \begin{bmatrix} 1 & \sigma & \sigma^2 \\ \sigma & 1 & \sigma \\ \sigma^2 & \sigma & 1 \end{bmatrix} \text{ and } R_R = \begin{bmatrix} 1 & \beta & \beta^2 \\ \beta & 1 & \beta \\ \beta^2 & \beta & 1 \end{bmatrix}$$

Now write the correlated channel matrix in a Cholesky form as $$H = \sqrt{R_T} H_W \sqrt{R_T}$$

where $H_W$ is the random H matrix, that is now subject to correlation effects.

The correlation at the transmitter is mathematically seen as correlation between the columns of the H matrix and can be written as $R_T$. The correlation at the receiver is seen as the correlation between the rows of the H matrix, $R_R$. Clearly if the columns are similar, each antenna is seeing a similar channel. When the received amplitudes are similar at each receiver, correlation at the receiver is seen. The H matrix under correlation is ill conditioned, and small changes lead to large changes in the received signal, clearly not a helpful situation.

The capacity of a channel with correlation can be written as:

$$C = \log_2 \det\left(1_{NR} + \frac{SNR}{N_T} R_r^{1/2} H^H R_t^{H/2}\right)$$

When $N_T = N_R$ and SNR is high, this expression can be approximated as:

$$C = \log_2 \det\left(1_{NR} + \frac{SNR}{N_T} H_u H_u^H\right) + \log_2 \det(R_r) + \log_2 \det(R_t)$$

Figure 23:
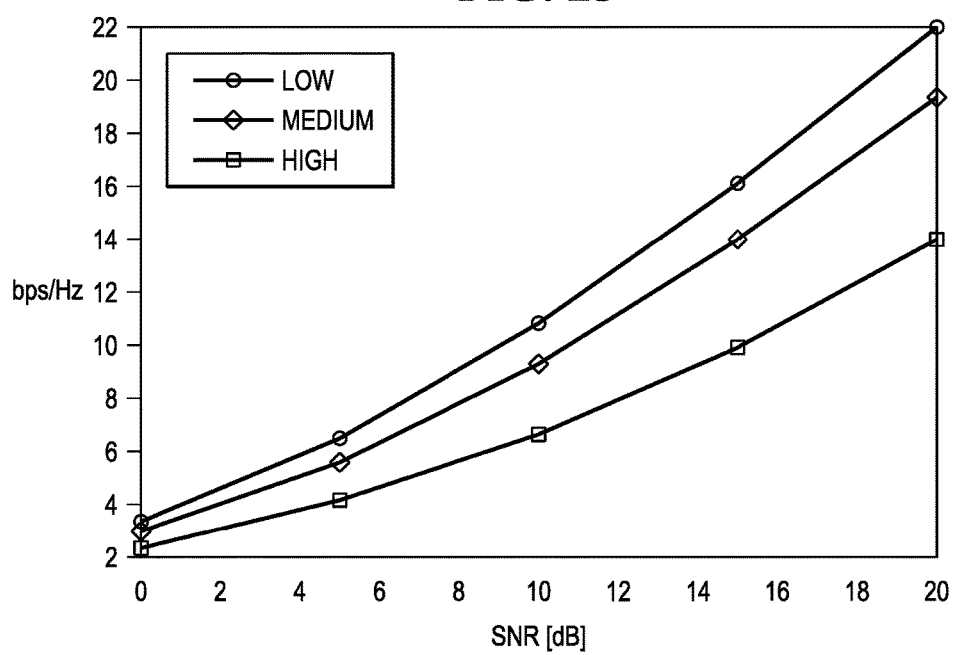
FIG. 23 illustrates the manner in which correlation reduces capacity in frequency selective channels.

The last two terms are always negative since det(R)≤0. That implies that correlation leads to reduction in capacity in frequency selective channels as shown in FIG. 23.

Figure 24:
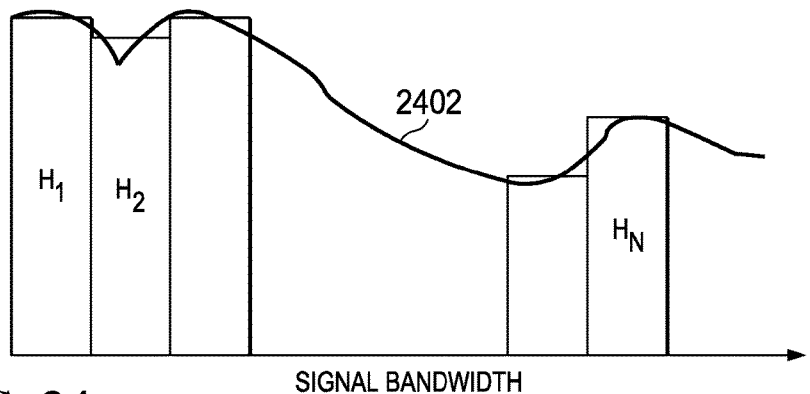
FIG. 24 illustrates the manner in which channel information varies with frequency in a frequency selective channel.

Here it is assumed that the frequency response is flat for the duration of the single realization of the H matrix. In FIG. 24 shows a channel 2402 that is not flat. Its response is changing with frequency. The H matrix now changes within each sub-frequency of the signal. Note that this is not time, but frequency. The H matrix is written as a super matrix of sub-matrices for each frequency.

Assume we can characterize the channel in N frequency sub-bands. The H matrix can now be written as a [(N×$N_R$), (N×$N_T$)] matrix. A [3×3] H matrix is subdivided into N frequency and is written as an [18×18] matrix, with [3×3] matrices on the diagonal.

Spatial Multiplexing and how it Works

Each of the links in a MIMO system is assumed to transmit the same information. This is an implicit assumption of obtaining diversity gain. Multicasting provides diversity gain but no data rate improvement. If independent information could be sent across the antennas, then there is an opportunity to increase the data rate as well as keep some diversity gain. The data rate improvement in a MIMO system is called Spatial Multiplexing Gain (SMG).

The data rate improvement is related to the number of pairs of the RCV/XMT (receive/transmit) antennas, and when these numbers are unequal, it is proportional to smaller of the two numbers, $N_T$, $N_R$. This is easy to see; the system can only transmit as many different symbols as there are transmit antennas. This number is limited by the number of receive antennas, if the number of receive antennas is less than the number of transmit antennas.

Spatial multiplexing means the ability to transmit higher bit rate when compared to a system where we only get diversity gains because of transmissions of the same symbol from each transmitter. Therefore:

$$d = -\lim_{SNR \to \infty} \log \frac{BER(SNR)}{SNR} \text{ Diversity Gain}$$

$$s = \lim_{SNR \to \infty} \frac{\text{Data Rate}(SNR)}{\log(SNR)} \text{ Spatial Multiplexing Gain}$$

Should the diversity gain or multiplexing gain or maybe a little of both be used? The answer is that a little bit of both may be used.

One way to increase the number of independent Eigen channels is to use a set of orthogonal modes. Such a system transmits multiple coaxially-propagating spatial modes each carrying an independent data stream through a single aperture pair. Therefore, the total capacity of the communication system can be increased by a factor equal to the number of transmitted modes. An orthogonal spatial modal basis set that has gained interest recently is orbital angular momentum (OAM). An electromagnetic beam with a helical wavefront carries an OAM corresponding to $l\hbar$ per photon, where $\hbar$ is the reduced Planck constant and l is an unbounded integer. Importantly, OAM modes with different l values are mutually orthogonal, which allows them to be efficiently (de)multiplexed with low inter-modal crosstalk, thereby avoiding the use of multiple-input multiple-output (MIMO) processing.

Another approach for simultaneously transmitting multiple independent data streams is to use MIMO-based spatial multiplexing, for which multiple aperture elements are employed at transmitter/receiver. As a well-established technique in wireless systems, this approach could provide capacity gains relative to single aperture systems and increase link robustness for point-to-point (P2P) communications. In such a system, each data-carrying beam is received by multiple spatially separated receivers and MIMO signal processing is critical for reducing the crosstalk among channels and thus allows data recovery.

However, MIMO signal processing becomes more onerous for MIMO-based spatial multiplexing as the number of aperture elements increases. In addition, for OAM multiplexed systems, the detection of high-order OAM modes presents a challenge for the receiver because OAM beams with larger l values diverge more during propagation. Therefore, the achievable number of data channels for each type of multiplexing technique might be limited, and achieving a larger number of channels by using any one approach would be significantly more difficult. Similar to the multiplexing in few-mode and multi-core fibers, these two forms of spatial multiplexing might be compatible with each other. The combination of them by fully exploiting the advantages of each technique, such that they complement each other, might enable a dense spatial multiplexed FSO system.

Antenna Placements in MIMO

Figure 25:
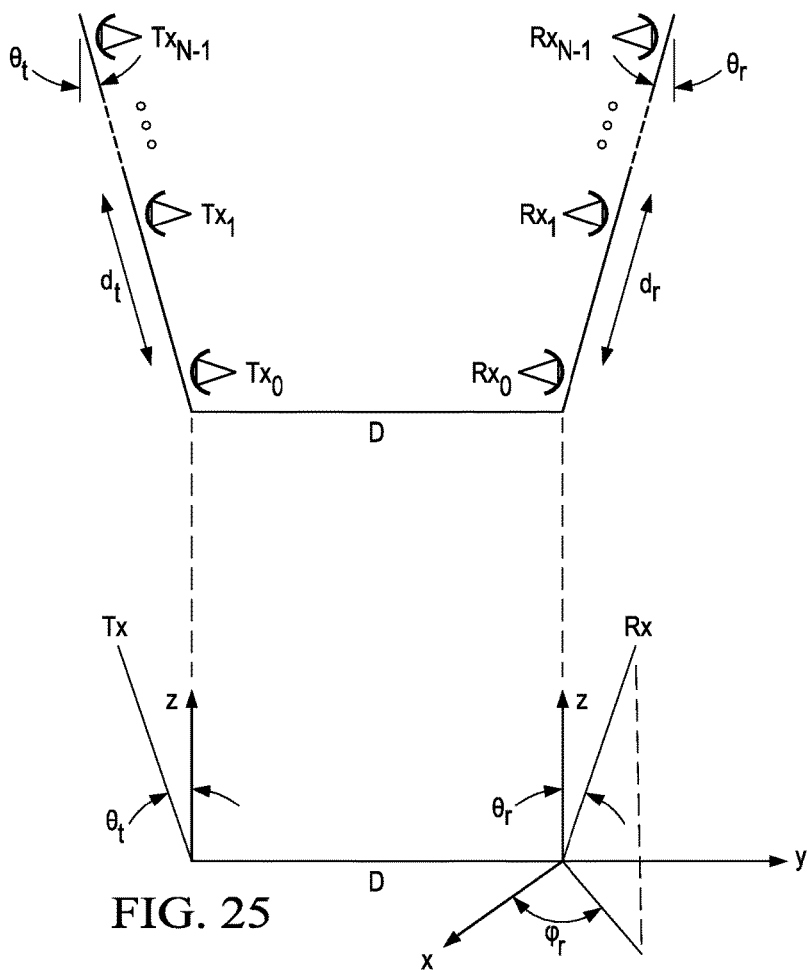
FIG. 25 illustrates antenna placement in a MIMO system.
Figure 26:
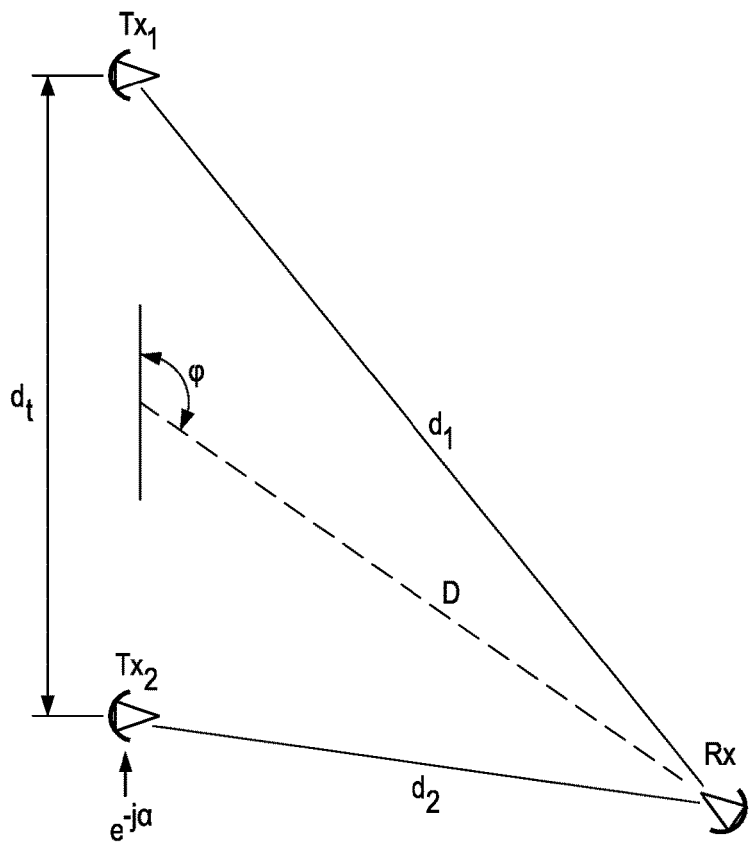
FIG. 26 illustrates multiple communication links at a MIMO receiver.

FIGS. 25 and 26 illustrate the placement of antennas in a MIMO system. FIG. 25 illustrates antennas $Tx_0$ through $Tx_{n-1}$ and receivers $Rx_0$ through $Rx_{n-1}$. FIG. 26 illustrates the transmission paths between transmitters $Tx_0$ and $Tx_1$ and receiver $Rx$.

The vectors describing the antenna placements are given by:

$$a_n^t = nd_t \sin(\theta_t) n_x + nd_t \cos(\theta_t) n_z$$

$$a_m^r = [D + md_r \sin(\theta_r)\cos(\phi_r)]n_x + md_r \cos(\theta_r)n_z + md_r \sin(\theta_r)\sin(\phi_r)n_y$$

The Euclidean distance between the antennas is:

$$d_{nm} = |a_m^r - a_n^t|$$

$$= [(D + md_r\sin(\theta_r)\cos(\phi_r) - nd_t\sin(\theta_t))^2 + (md_r\sin(\theta_r)\sin(\phi_r))^2 + (md_r\cos(\theta_r) - nd_t\cos(\theta_t))^2]^{1/2}$$

Since distance D is much larger than the antenna spacing, then:

$$d_{nm} \approx D + md_r\sin\theta_r\cos\phi_r - nd_t\sin\theta_t + \frac{1}{2D}[(md_r\cos\theta_r - nd_t\cos\theta_t)^2 + (md_r\sin\theta_r\sin\phi_r)^2] =$$

$$D + md_r\sin\theta_r\cos\phi_r - nd_t\sin\theta_t + \frac{1}{2D}[m^2d_r^2\cos^2\theta_r + n^2d_t^2\cos^2\theta_t - 2mnd_td_r\cos\theta_t\cos\theta_r + m^2d_r^2\sin^2\theta_r\sin^2\phi_r]$$

Now criteria for the optimal antenna separation can be found. This is acheived by maximizing the capacity as a function of antenna separation. That is to maximize the product of the eigenvalues.

$$W = \begin{cases} HH^H, & N \leq M \\ H^H H, & N > M \end{cases}$$

This is obtained if H has orthogonal rows for $N \leq M$ or orthogonal columns for $N > M$. Defining the rows of $H_{LOS}$ as $h_n$ the orthogonality between them can be expressed as:

$$\langle h_n, h_i \rangle_{n \neq i} = \sum_{m=0}^{M-1} \exp(jk(d_{nm} - d_{im}))$$

$$= \sum_{m=0}^{M-1} \exp\left(j2\pi \frac{d_t d_r \cos(\theta_r)\cos(\theta_t)}{\lambda D}(i-n)m\right) \cdot \exp\left(jk\left[(i-n)d_t\sin(\theta_t) + \frac{1}{2D}(i-n)^2 d_t^2 \cos^2(\theta_t)\right]\right)$$

$$= 0$$

$$\Rightarrow \frac{\sin(kd_t d_r \cos(\theta_r)\cos(\theta_t)(i-n)M/2D)}{\sin(kd_t d_r \cos(\theta_r)\cos(\theta_t)(i-n)/2D)} = 0 \Rightarrow d_t d_r = \frac{\lambda D}{M \cos(\theta_t)\cos(\theta_r)} K$$

where K is a positive odd number usually chosen to be 1 since that gives the smallest optimal antenna separation. Doing a similar derivation for the case N>M would give the same expression only with M instead of N. Defining V=min (M,N), the general expression for antenna separation is:

$$d_t d_r = \frac{\lambda D}{V \cos(\theta_t)\cos(\theta_r)} K$$

That is the separation increases by distance D and decreases as frequency increases.

Defining a new parameter η as:

$$\eta = \sqrt{\frac{d_t d_r}{(d_t d_r)_{opt}}}$$

To quantify the deviation from optimality. Choosing $d_t = d_r = d$
Then this reduces to $\eta = d/d_{opt}$
Then the condition number for 2×2 MIMO will be $$\kappa = \sqrt{\frac{2 + [2 + 2\cos(\pi\eta^2)]^{1/2}}{2 - [2 + 2\cos(\pi\eta^2)]^{1/2}}}$$

Calculating the distance $d_1$ and $d_2$ we have:

$$d_1^2 = d_t^2/4 + D^2 - d_t D \cos(\phi)$$

$$d_2^2 = d_t^2/4 + D^2 - d_t D \cos(\phi)$$

The gain relative to single RX antenna can be expressed as:

$$G(\phi, \alpha) = \frac{1}{T_{sc}} \int_0^{T_{sc}} (\sin(\omega t + d_1 k) + \sin(\omega t + d_2 k + \alpha))^2 dt =$$

$$\cos(d_1 k - d_2 k - \alpha) + 1 = \cos(k\Delta d + \alpha) + 1$$

Where:

$$\Delta = d_2 - d_1.$$

But:

$$(d_2 - d_1)^2 = (d_1^2 + d_2^2 - 2d_1 d_2) =$$

$$\frac{d_t^2}{2} + 2D^2 - \sqrt{\frac{d_t^4}{4} + 4D^4 + 2d_t^2 D^2 - 4d_t^2 D^2 \cos^2(\phi)} \approx \frac{d_t^2}{2} + 2D^2 -$$

-continued $$2D^2 - \frac{d_t^4/4 + 2d_t^2 D^2 - 4d_t^2 D^2 \cos^2(\phi)}{2D^2} = d_t^2 \cos^2(\phi) - \frac{d_t^4}{16D^2}$$

For $D \gg d_t^2$:

$$\Delta d \approx d_t \cos(\phi)$$

Therefore:

$$G(\phi, \alpha) = \cos(k\Delta d + \alpha) + 1 \approx \cos\left(\frac{2\pi}{\lambda} d_t \cos(\phi) + \alpha\right) + 1$$

Wideband MIMO Model

For a narrowband MIMO we had r=sH+n which can be expressed as:

$$r_m[j] = \sum_{n=1}^{N} h_{nm} s_n[j]$$

Where j is the discrete symbol timing.

Now a wideband channel will act as a filter so that the gains need be replaced by filters as:

$$r_m[j] = \sum_{n=1}^{N} \sum_{i=-L_t}^{L_t} h_{nm}[i,j] s_n[j-1] \Leftrightarrow r_m = \sum_{n=1}^{N} h_{nm} * s_n$$

Transmitting $L_B$ symbols (block length) the channel matrix can be expressed as:

$$\Psi_{nm} = \begin{bmatrix} h_{nm}[0] & \ldots & h_{nm}[L_t] & 0 & \ldots & 0 \\ h_{nm}[1] & h_{nm}[0] & \ldots & h_{nm}[-L_t] & \ddots & 0 \\ \vdots & \ddots & \ddots & \ddots & \ddots & \vdots \\ 0 & \ldots & 0 & h_{nm}[L_t] & \ldots & h_{nm}[0] \end{bmatrix}^T$$

Or $$= \begin{bmatrix} \Psi_{11} & \ldots & \Psi_{1M} \\ \vdots & \ddots & \vdots \\ \Psi_{N1} & \ldots & \Psi_{NM} \end{bmatrix}$$

Defining signal matrix as:

$$s = [s_1, \ldots, s_N]$$

$$s_n = [s_n[1], \ldots, s_n[L_B]]$$

Then the noise free received signal can be expressed as:

$$r = s\psi$$

For frequency selective channel, the capacity becomes frequency dependent. For a SISO channel, the capacity becomes:

$$C = \int_{-\infty}^{\infty} \log_2(1 + \gamma |H(f)|^2) df$$

And therefore for a MIMO channel the capacity becomes $$C = \sum_{i=1}^{\min(N,M)} \int_{-\infty}^{\infty} \log_2(1 + \gamma \lambda_i(f)) df$$

Line of Sight MIMO Channel

In LOS-MIMO there is one dominating path so that the incoming phases are dominated by the geometry of the channel and not scattering. Other than the LOS-path, there can be secondary paths caused by atmospheric scintillation or a reflection off the ground. This results in a frequency selective channel. The common model to use is a plane earth model with one reflection from ground. The two paths have some delay difference τ which is typically set to 6.3 nsec in Rummler's model. The impulse response of such a channel is:

$$h(t) = \delta(t) + b\delta(t-\tau)e^{j\phi} \Leftrightarrow H(s) = \mathcal{L}\{h(t)\} = 1 + be^{-\tau s + j\phi}$$

that is the channel introduces periodic notches in frequency spectrum. If one of the notches happen to be within the bandwidth, the channel will suffer from sever fading and ISI.

Dual Polarized MIMO

For a 4×4 Dual polarized MIMO, one can achieve four fold capacity compared to SISO. The narrowband channel matrix can be written as:

$$H = \begin{bmatrix} h_{1V,1V} & h_{1V,1H} & h_{1V,2V} & h_{1V,2H} \\ h_{1H,1V} & h_{1H,1H} & h_{1H,2V} & h_{1H,2H} \\ h_{2V,1V} & h_{2V,1H} & h_{2V,2V} & h_{2V,2H} \\ h_{2H,1V} & h_{2H,1H} & h_{2H,2V} & h_{2H,2H} \end{bmatrix} = \begin{bmatrix} H_{11} & H_{12} \\ H_{21} & H_{22} \end{bmatrix} =$$

$$\begin{bmatrix} \sqrt{1-\alpha}\, e^{jkd_{11}} & \sqrt{\alpha}\, e^{jkd_{11}} & \sqrt{1-\alpha}\, e^{jkd_{12}} & \sqrt{1-\alpha}\, e^{jkd_{12}} \\ \alpha e^{jkd_{11}} & \sqrt{1-\alpha}\, e^{jkd_{11}} & \sqrt{\alpha}\, e^{jkd_{12}} & \sqrt{1-\alpha}\, e^{jkd_{12}} \\ \sqrt{1-\alpha}\, e^{jkd_{21}} & \sqrt{\alpha}\, e^{jkd_{21}} & \sqrt{1-\alpha}\, e^{jkd_{22}} & \sqrt{\alpha}\, e^{jkd_{22}} \\ \alpha e^{jkd_{21}} & \sqrt{1-\alpha}\, e^{jkd_{21}} & \sqrt{\alpha}\, e^{jkd_{22}} & \sqrt{1-\alpha}\, e^{jkd_{22}} \end{bmatrix}$$

Where:

$$H = H_{LoS} \otimes W_{XPD} = \begin{bmatrix} e^{jkd_{11}} & e^{jkd_{12}} \\ e^{jkd_{21}} & e^{jkd_{22}} \end{bmatrix} \otimes \begin{bmatrix} \sqrt{1-\alpha} & \sqrt{\alpha} \\ \sqrt{\alpha} & \sqrt{1-\alpha} \end{bmatrix}$$

Here α measures the ratio of the power for one polarization that is transferred to the other polarization. Then:

$$\alpha = \frac{1}{XPD+1}$$

And condition numbers can be calculated as:

$$c_1 = (2 - f_a(a))[1 - \cos(\pi \eta_T^2/2)]$$

$$c_2 = (2 - f_a(a))[\cos(\pi \eta_T^2/2) + 1]$$

$$c_3 = (2 - f_a(a))[\cos(\pi \eta_T^2/2) + 1]$$

$$c_4 = (2 - f_a(a))[1 - \cos(\pi \eta_T^2/2)]$$

Where $$\kappa = \sqrt{\frac{\max(c_1, c_2, c_3, c_4)}{\min(c_1, c_2, c_3, c_4)}}$$

For SISO, assuming Gray coding and square QAM-M, the BER can be calculated as $$P_b = \left(1 - \frac{1}{\sqrt{M}}\right) Q\left(\sqrt{\frac{3k}{M-1}\frac{E_b}{N_0}}\right)$$

Therefore, the BER for a MIMO system using SVD can be expressed as:

$$P_b = \frac{1}{R_H}\sum_{i=1}^{R_H}\left(1 - \frac{1}{\sqrt{M}}\right) Q\left(\sqrt{\frac{3k}{M-1}\frac{E_b}{N_0}\sigma_i^2}\right)$$

MLO/QLO

Figure 27:
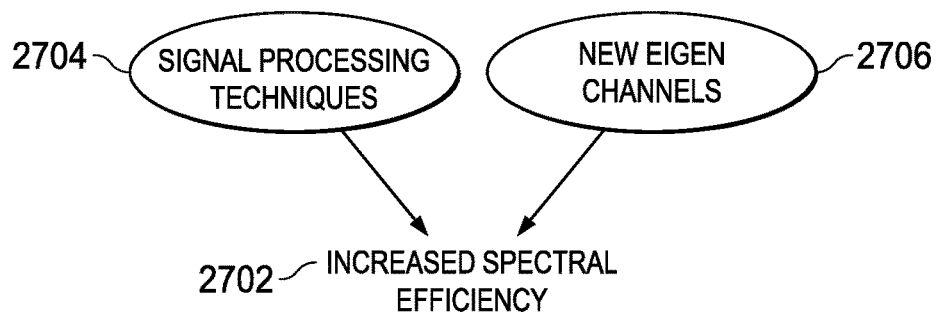
FIG. 27 illustrates various techniques for increasing spectral efficiency within a transmitted pilot signal.

Referring now to FIG. 27, wherein there is illustrated two manners for increasing spectral efficiency 2702 of a communications system. The increase may be brought about by signal processing techniques 2704 in the modulation scheme or using multiple access techniques. Additionally, the spectral efficiency can be increase by creating new Eigen channels 2706 within the electromagnetic propagation. These two techniques are completely independent of one another and innovations from one class can be added to innovations from the second class. Therefore, the combination of these techniques introduced a further innovation.

Spectral efficiency 2702 is the key driver of the business model of a communications system. The spectral efficiency is defined in units of bit/sec/hz and the higher the spectral efficiency, the better the business model. This is because spectral efficiency can translate to a greater number of users, higher throughput, higher quality or some of each within a communications system.

Regarding techniques using signal processing techniques or multiple access techniques. These techniques include innovations such as TDMA, FDMA, CDMA, EVDO, GSM, WCDMA, HSPA and the most recent OFDM techniques used in 4G WIMAX and LTE. Almost all of these techniques use decades-old modulation techniques based on sinusoidal Eigen functions called QAM modulation. Within the second class of techniques involving the creation of new Eigen channels 2706, the innovations include diversity techniques including space and polarization diversity as well as multiple input/multiple output (MIMO) where uncorrelated radio paths create independent Eigen channels and propagation of electromagnetic waves.

The present communication system configuration introduces techniques, one from the signal processing techniques 2704 category and one from the creation of new eigen channels 2706 category that are entirely independent from each other. Their combination provides a unique manner to disrupt the access part of an end to end communications system from twisted pair and cable to fiber optics, to free space optics, to RF used in cellular, backhaul and satellite, to RF satellite, to RF broadcast, to RF point-to point, to RF point-to-multipoint, to RF point-to-point (backhaul), to RF point-to-point (fronthaul to provide higher throughput CPRI interface for cloudification and virtualization of RAN and cloudified HetNet), to Internet of Things (IOT), to Wi-Fi, to Bluetooth, to a personal device cable replacement, to an RF and FSO hybrid system, to Radar, to electromagnetic tags and to all types of wireless access. One technique involves the use of a new signal processing technique using new orthogonal signals to upgrade QAM modulation using non sinusoidal functions. This is referred to as quantum level overlay (QLO). Application of the quantum level overlay (also called multiple layer overlay) techniques uniquely offers orders of magnitude higher spectral efficiency within communication systems in their combination.

With respect to the quantum level overlay technique, new eigen functions are introduced that when overlapped (on top of one another within a symbol) significantly increases the spectral efficiency of the system and limit cross channel interference. The quantum level overlay technique borrows from quantum mechanics, special orthogonal signals that reduce the time bandwidth product and thereby increase the spectral efficiency of the channel while also limiting interference between channels. Each orthogonal signal is overlaid within the symbol acts as an independent channel. These independent channels differentiate the technique from existing modulation techniques.

Multiple level overlay modulation techniques provide a new degree of freedom beyond the conventional 2 degrees of freedom, with time T and frequency F being independent variables in a two-dimensional notational space defining orthogonal axes in an information diagram. This comprises a more general approach rather than modeling signals as fixed in either the frequency or time domain. Previous modeling methods using fixed time or fixed frequency are considered to be more limiting cases of the general approach of using multiple level overlay modulation. Within the multiple level overlay modulation technique, signals may be differentiated in two-dimensional space rather than along a single axis. Thus, the information-carrying capacity of a communications channel may be determined by a number of signals which occupy different time and frequency coordinates and may be differentiated in a notational two-dimensional space to prevent channel interference.

Within the notational two-dimensional space, minimization of the time bandwidth product, i.e., the area occupied by a signal in that space, enables denser packing, and thus, the use of more signals, with higher resulting information-carrying capacity, within an allocated channel. Given the frequency channel delta ($\Delta f$), a given signal transmitted through it in minimum time $\Delta t$ will have an envelope described by certain time-bandwidth minimizing signals. The time-bandwidth products for these signals take the form:

$$\Delta t \Delta f = \tfrac{1}{2}(2n+1)$$

where n is an integer ranging from 0 to infinity, denoting the order of the signal.

These signals form an orthogonal set of infinite elements, where each has a finite amount of energy. They are finite in both the time domain and the frequency domain, and can be detected from a mix of other signals and noise through correlation, for example, by match filtering. Unlike other wavelets, these orthogonal signals have similar time and frequency forms.

MLO/QLO may be differentiated from CDMA or OFDM by the manner in which orthogonality among signals is achieved. MLO/QLO signals are mutually orthogonal in both time and frequency domains, and can be overlaid in the same symbol time bandwidth product. Orthogonality is attained by the correlation properties, for example, by least sum of squares, of the overlaid signals. In comparison, CDMA uses orthogonal interleaving or displacement of signals in the time domain, whereas OFDM uses orthogonal displacement of signals in the frequency domain.

Bandwidth efficiency may be increased for a channel by assigning the same channel to multiple users. This is feasible if individual user information is mapped to special orthogonal functions. CDMA systems overlap multiple user information and views time intersymbol orthogonal code sequences to distinguish pilot signals, and OFDM assigns unique signals to each pilot signal, but which are not overlaid, are only orthogonal in the frequency domain. Neither CDMA nor OFDM increases bandwidth efficiency. CDMA uses more bandwidth than is necessary to transmit data when the signal has a low signal to noise ratio (SNR). OFDM spreads data over many subcarriers to achieve superior performance in multipath radiofrequency environments. OFDM uses a cyclic prefix OFDM to mitigate multipath effects and a guard time to minimize intersymbol interference (ISI), and each channel is mechanistically made to behave as if the transmitted waveform is orthogonal. (Sync function for each subcarrier in frequency domain.)

In contrast, MLO uses a set of functions which effectively form an alphabet that provides more usable channels that do not interfere with each other in the same bandwidth, thereby enabling high bandwidth efficiency. Some embodiments of MLO do not require the use of cyclic prefixes or guard times, and therefore, outperforms OFDM in spectral efficiency, peak to average power ratio, power consumption, and requires fewer operations per bit. In addition, embodiments of MLO are more tolerant of amplifier nonlinearities than are CDMA and OFDM systems.

Figure 28:
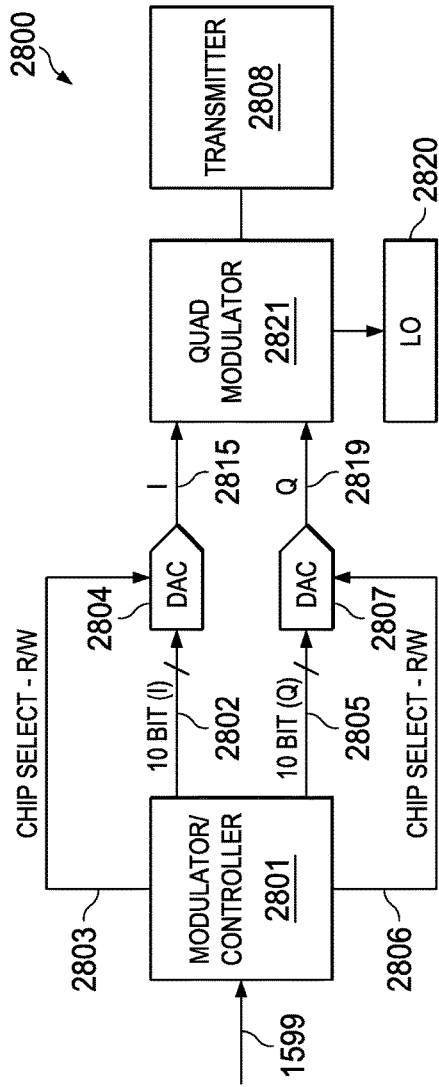
FIG. 28 illustrates a multiple level overlay transmitter system.
Figure 29:
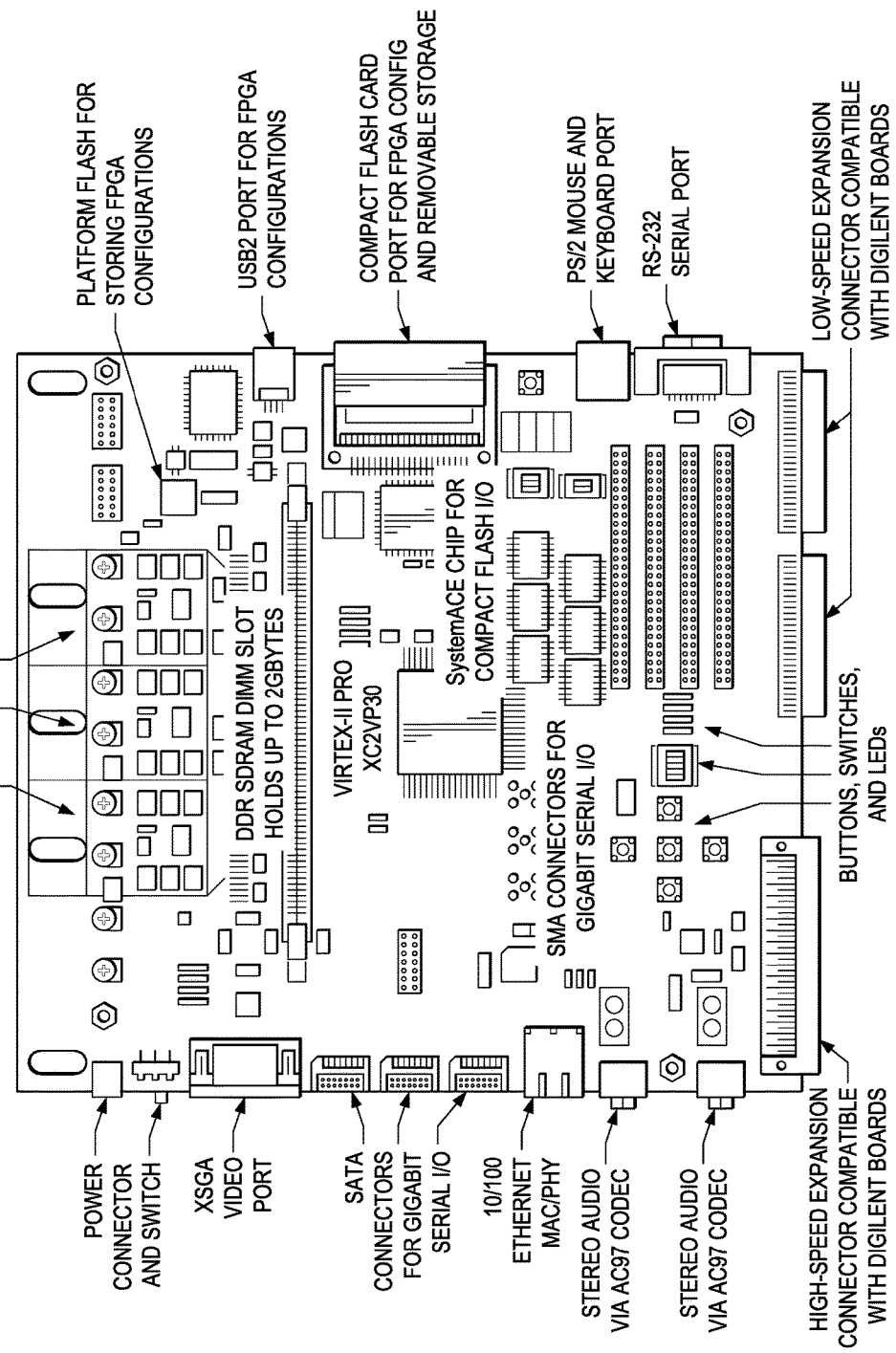
FIG. 29 illustrates an FPGA board.

FIG. 28 illustrates an embodiment of an MLO/QLO transmitter system 2800, which receives input data stream 2799. The input data stream 2799 comprises one or more pilot signals that are to be processed using the MLO/QLO techniques described herein to prevent pilot channel contamination. The transceiver is realized using basic building blocks. System 2800 represents a modulator/controller, which is implemented on a field programmable gate array (FPGA) implementing a modulator/controller 2801 that generates the MLO/QLO modulated pilot signals. In one embodiment, the FPGA 2801 may be implemented using a Xlinx XUP Virtex II Pro Development System. The Virtex II Pro Development System is a powerful, versatile, low cost system providing multi-gigabit transceivers, system RAM, a system ACE compact flash controller, a fast Ethernet interface and a USB programming interface. An example of an FPGA board is illustrated in FIG. 29. The FPGA 2801 implements most of the clock and data recovery as well as frequency estimations. The FPGA implementation requires consideration of system requirements, standards of consistency, usability, business objectives, minimization of late stage changes to product requirements and concepts, a reasonable design path to be followed and contributory factors to be considered.

On the transmitter side, the FPGA board 2801 will generate the QLO Pilot signals as well as the necessary control signals to enable the digital-to-analog (DAC) boards 2804 and 2807. The block diagrams are representative and do not include power amplifiers in the transmitter 2808. The frequency band could be at any band, but here is the block diagram for 2.4-2.5 GHz (ISM band) where MIMO is currently being used. However, it should be understood that modulator/controller 2801 may use any quantity of pilot signals. Modulator/controller 2801 may also comprise an application specific integrated circuit (ASIC), and/or other components, whether discrete circuit elements or integrated into a single integrated circuit (IC) chip.

Modulator/controller 2801 is coupled to DACs 2804 and 2807, communicating a 10 bit I signal 2802 and a 10 bit Q signal 2805, respectively. In some embodiments, I signal 2802 and Q signal 2805 correspond to pilot signals having QLO modulation applied thereto. It should be understood, however, that the 10 bit capacity of I signal 2802 and Q signal 2805 is merely representative of an embodiment. As illustrated, modulator/controller 2801 also controls DACs 2804 and 2807 using control signals 2803 and 2806, respectively. In some embodiments, DACs 2804 and 2807 each comprise an AD5433, complementary metal oxide semiconductor (CMOS) 10 bit current output DAC. In some embodiments, multiple control signals are sent to each of DACs 2804 and 2807.

DACs 2804 and 2807 output analogue signals 2815 and 2819 to quadrature modulator 2821, which is coupled to LO 2820. The quadrature modulator 2821 in one embodiment may comprise a direct conversion quad modulator (Analog AD8346) and the LO 2820 may comprise a Zcomm 2.4 GHz oscillator. The output of modulator 2820 is illustrated as coupled to a transmitter 2808 to transmit the pilot signals wirelessly. In various embodiments, transmitter 2808 may also be coupled to a fiber-optic modem, a twisted pair, a coaxial cable, or other suitable transmission media or transmission devices.

Figure 30:
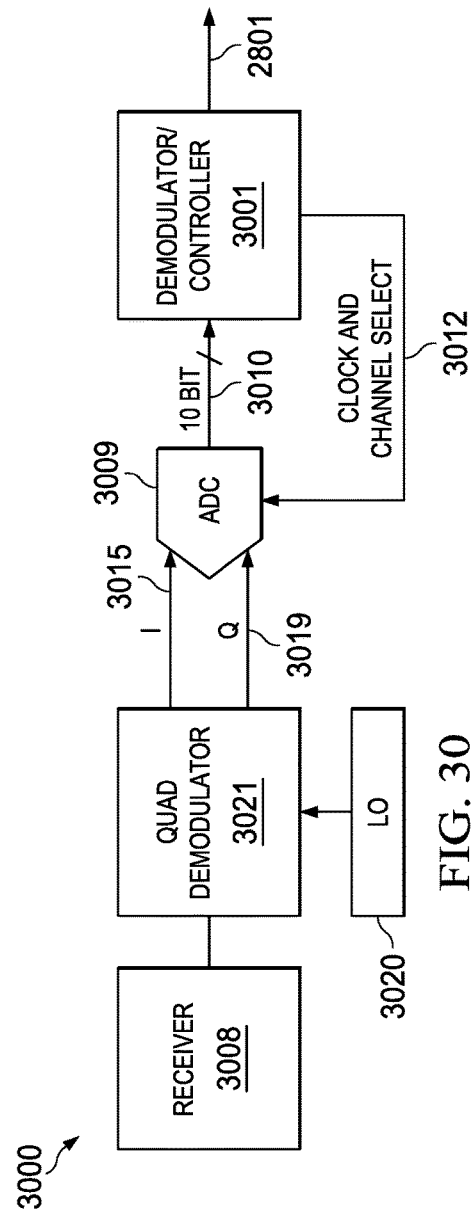
FIG. 30 illustrates a multiple level overlay receiver system.

FIG. 30 illustrates an embodiment of an MLO/QLO receiver system 3000 capable of receiving and demodulating pilot signals. System 3000 receives an input pilot signal from a receiver 3008 that may comprise input medium, such as RF, wired or optical. The modulator 3021 driven by LO 3020 converts the QLO/MLO modulated pilot signal input to baseband I signal 3015 and Q signal 3019. I signal 3015 and Q signal 3019 are input to analogue to digital converter (ADC) 3009.

ADC 3009 outputs 10 bit signal 3010 to demodulator/controller 3001 and receives a control signal 3012 from demodulator/controller 3001. Demodulator/controller 3001 may comprise a field programmable gate array (FPGA) similar to that discussed herein above. In alternative embodiments the demodulator/controller 3001 may also comprise an application specific integrated circuit (ASIC) and/or other components, whether discrete circuit elements or integrated into a single integrated circuit (IC) chip. Demodulator/controller 3001 correlates received pilot signals with locally generated replicas of the pilot signal set used, in order to perform demodulation and identify the pilot signals sent. Demodulator/controller 3001 also estimates frequency errors and recovers the data clock, which is used to read data from the ADC 3009. The clock timing is sent back to ADC 3009 using control signal 3012, enabling ADC 3009 to segment the digital I and Q signals 3017 and 3019 making up the transmitted pilot symbols. In some embodiments, multiple control signals are sent by demodulator/controller 3001 to ADC 3009. Demodulator/controller 3001 also outputs pilot signal 1301.

Hermite-Gaussian polynomials are a classical orthogonal polynomial sequence, which are the Eigenstates of a quantum harmonic oscillator. Signals based on Hermite-Gaussian polynomials possess the minimal time-bandwidth product property described above, and may be used for embodiments of MLO/QLO systems. However, it should be understood that other signals may also be used, for example orthogonal polynomials such as Jacobi polynomials, Gegenbauer polynomials, Legendre polynomials, Chebyshev polynomials, Laguerre-Gaussian polynomials, Hermite-Gaussian polynomials and Ince-Gaussian polynomials. Q-functions are another class of functions that can be employed as a basis for MLO signals.

In quantum mechanics, a coherent state is a state of a quantum harmonic oscillator whose dynamics most closely resemble the oscillating behavior of a classical harmonic oscillator system. A squeezed coherent state is any state of the quantum mechanical Hilbert space, such that the uncertainty principle is saturated. That is, the product of the corresponding two operators takes on its minimum value. In embodiments of an MLO/QLO system, operators correspond to time and frequency domains wherein the time-bandwidth product of the signals is minimized. The squeezing property of the signals allows scaling in time and frequency domain simultaneously, without losing mutual orthogonality among the signals in each layer. This property enables flexible implementations of MLO systems in various communications systems.

Because signals with different orders are mutually orthogonal, they can be overlaid to increase the spectral efficiency of a communication channel. For example, when n=0, the optimal baseband signal will have a time-bandwidth product of ½, which is the Nyquist Inter-Symbol Interference (ISI) criteria for avoiding ISI. However, signals with time-bandwidth products of 3/2, 5/2, 7/2, and higher, can be overlaid to increase spectral efficiency.

An embodiment of an MLO/QLO system uses functions based on modified Hermite polynomials. The MLO/QLO pilot signals to be implemented on the FPGA 2801 are implemented in one embodiment according to the following equations and are defined by:

$$\psi_n(t, \xi) = \frac{(\tanh \xi)^{n/2}}{2^{n/2}(n!\cosh \xi)^{1/2}} e^{\frac{1}{2}t^2[1-\tanh \xi]} H_n\left(\frac{t}{\sqrt{\cosh \xi \sinh \xi}}\right)$$

where t is time, and $\xi$ is a bandwidth utilization parameter comprising a constant (squeezing parameter to peg the signal bandwidth. Plots of $\Psi_n$ for n ranging from 0 to 9, along with their Fourier transforms (amplitude squared), are shown in FIGS. 31A-31K. The orthogonality of different orders of the functions may be verified by integrating:

$$\iint \psi_n(t,\xi)\psi_m(t,\xi)dt d\xi$$

The Hermite polynomial is defined by the contour integral:

$$H_n(z) = \frac{n!}{2\pi i} \oint e^{-t^2+2tz} t^{-n-1} dt$$

where the contour encloses the origin and is traversed in a counterclockwise direction. Hermite polynomials are described in Mathematical Methods for Physicists, by George Arfken, for example on page 416, the disclosure of which is incorporated by reference.

The first few Hermite polynomials are $$H_0(x) = 1$$
$$H_1(x) = 2x$$
$$H_2(x) = 4x^2 - 2$$
$$H_3(x) = 8x^3 - 12x$$
$$H_4(x) = 16x^4 - 48x^2 + 12$$
$$H_5(x) = 32x^5 - 160x^3 + 120x$$
$$H_6(x) = 64x^6 - 480x^4 + 720x^2 - 120$$
$$H_7(x) = 128x^7 - 1344x^5 + 3360x^3 - 1680x$$
$$H_8(x) = 256x^8 - 3584x^6 + 13440x^4 - 13440x^2 + 1680$$
$$H_9(x) = 512x^9 - 9216x^7 + 48384x^5 - 80640x^3 + 30240x$$
$$H_{10}(x) = 1024x^{10} - 23040x^8 + 161280x^6 - 403200x^4 + 302400x^2 - 30240.$$

-continued
$$H_{n+1}(x) = 2xH_n(x) - 2nH_{n-1}(x)$$

$$H_{2k}(x) = (-1)^k 2^k (2k-1)!! \times \left[1 + \sum_{j=1}^{k} \frac{(-4k)(-4k+4)\ldots(-4k+4j-4)}{(2j)!} x^{2j}\right].$$

$$H_{2k+1}(x) = (-1)^k 2^{k+1}(2k+1)!! \times \left[x + \sum_{j=1}^{k} \frac{(-4k)(-4k+4)\ldots(-4k+4j-4)}{(2j+1)!} x^2\right].$$

Figure 31A:
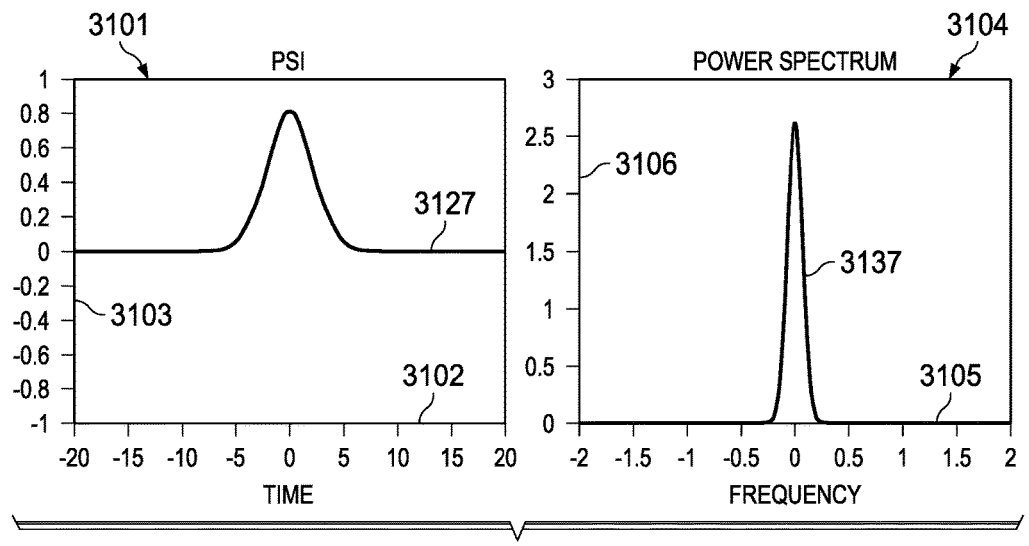
FIGS. 31A-31J illustrate representative multiple level overlay signals and their respective spectral power densities.
Figure 31B:
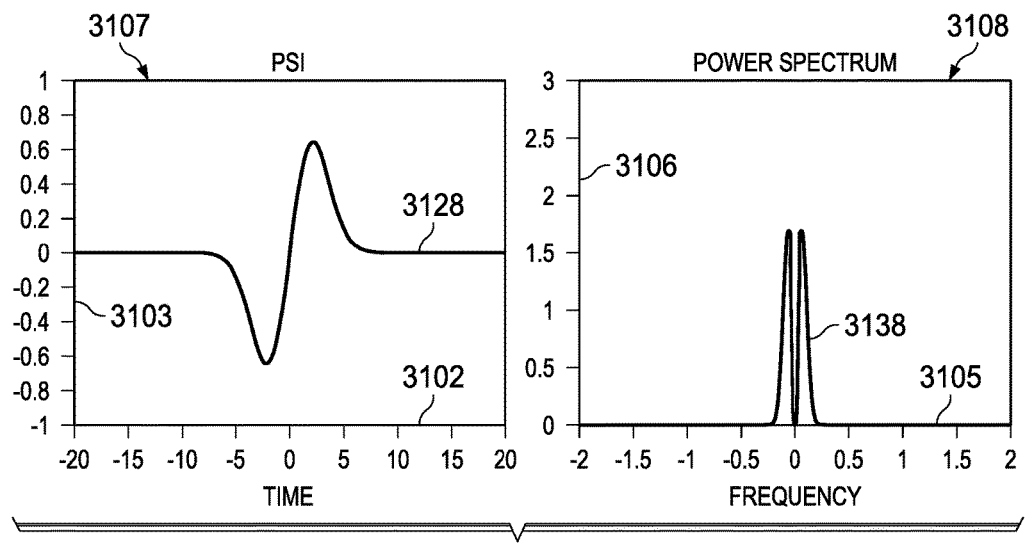
Figure 31C:
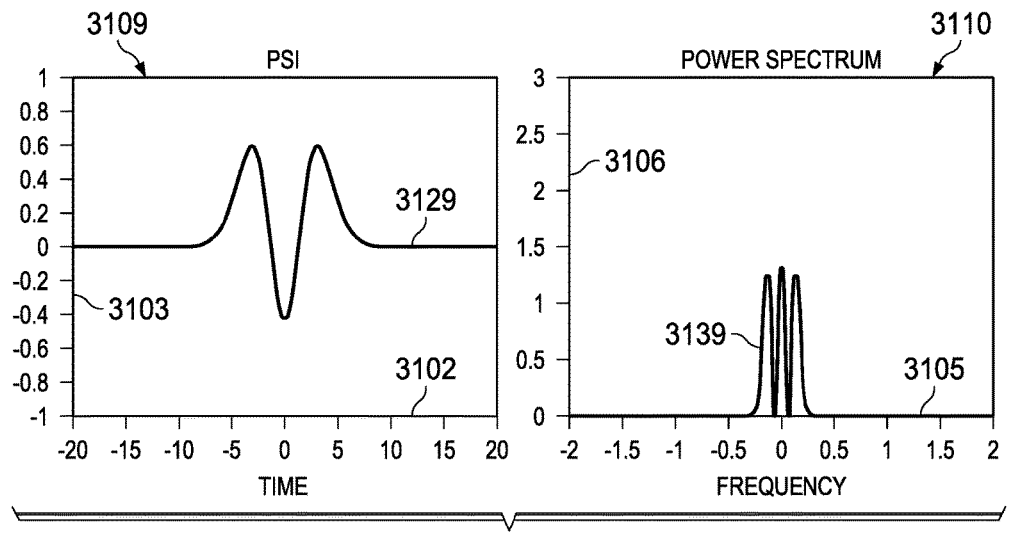
Figure 31D:
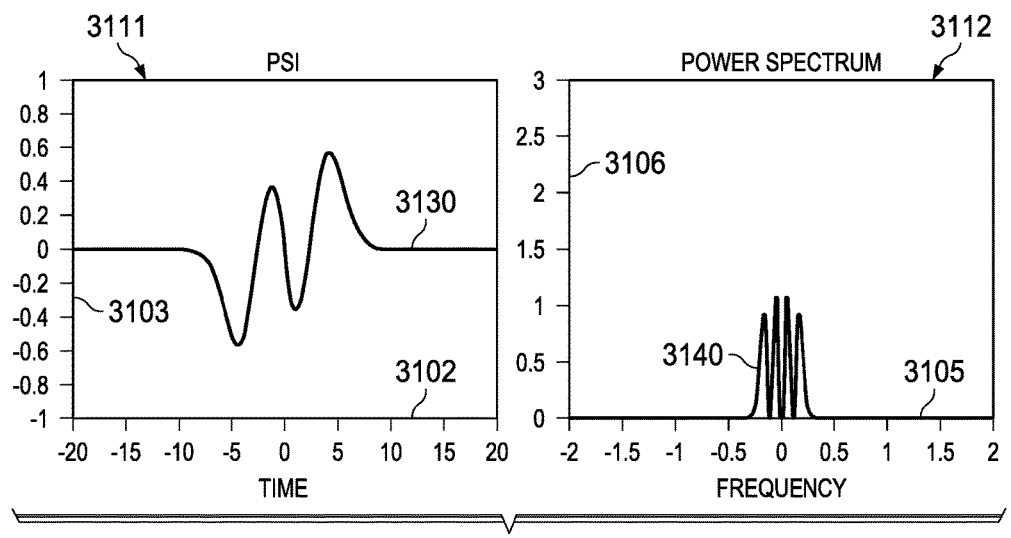
Figure 31E:
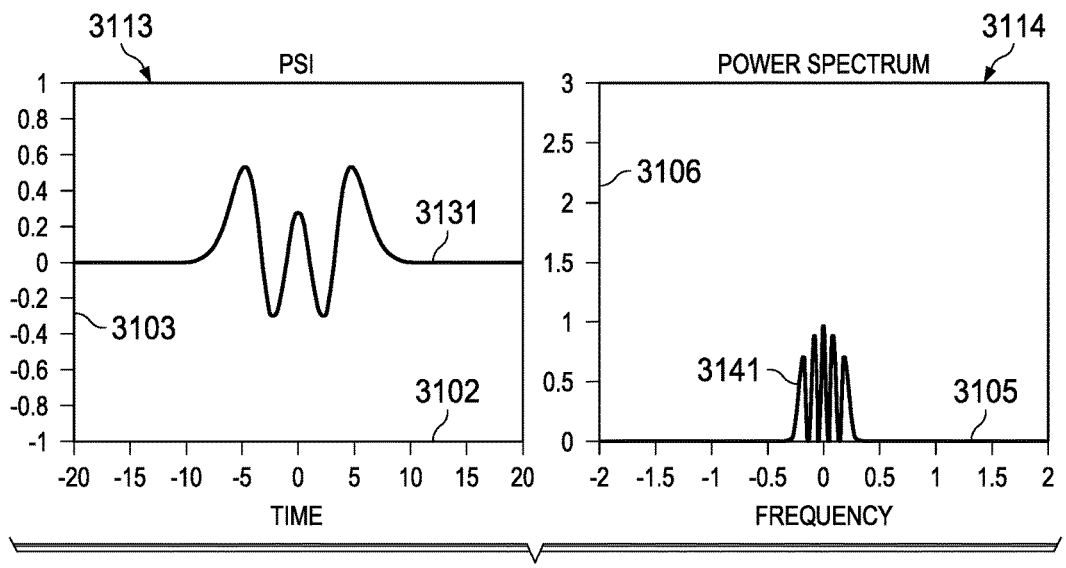
Figure 31F:
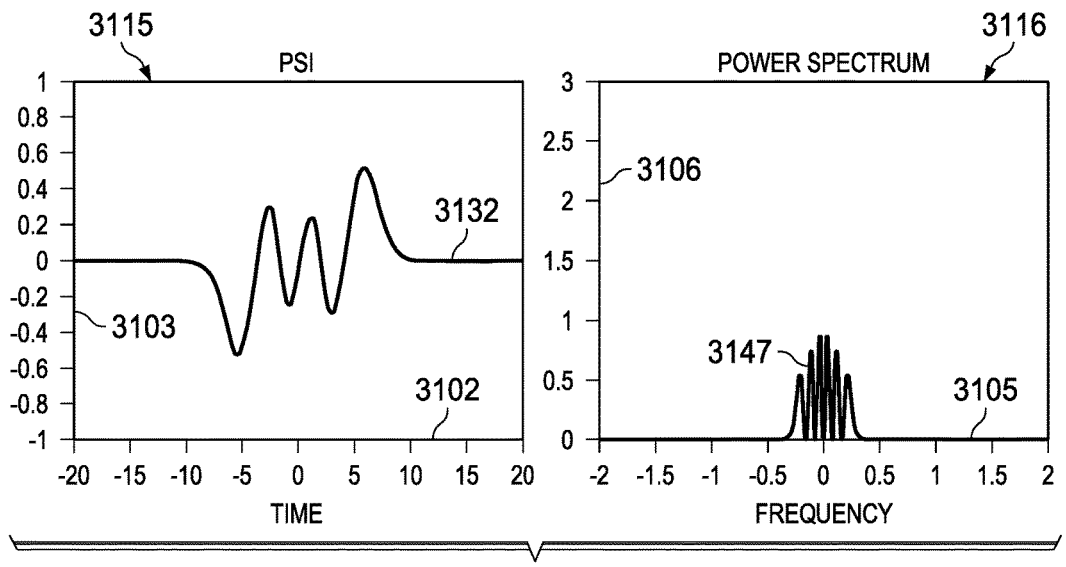
Figure 31G:
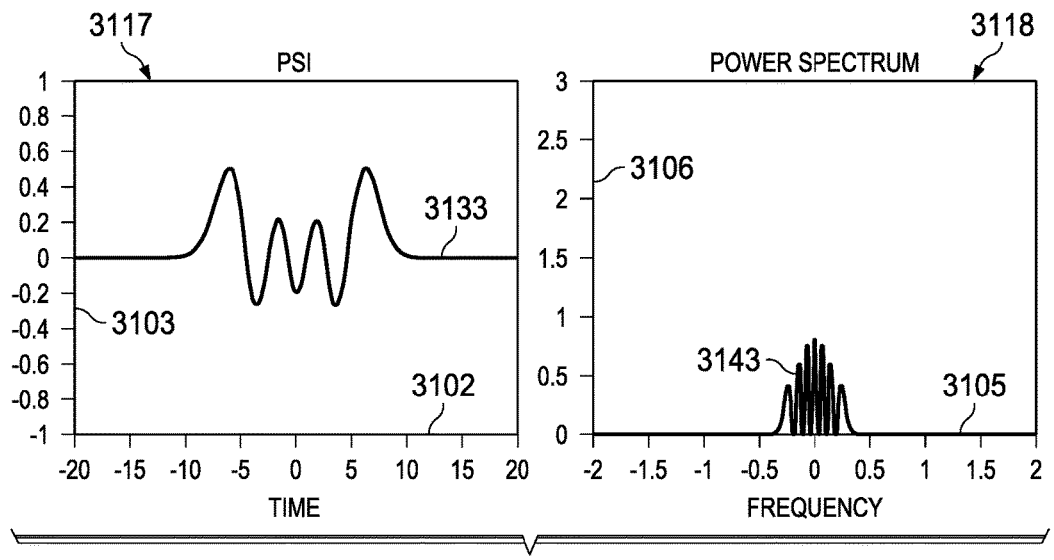
Figure 31H:
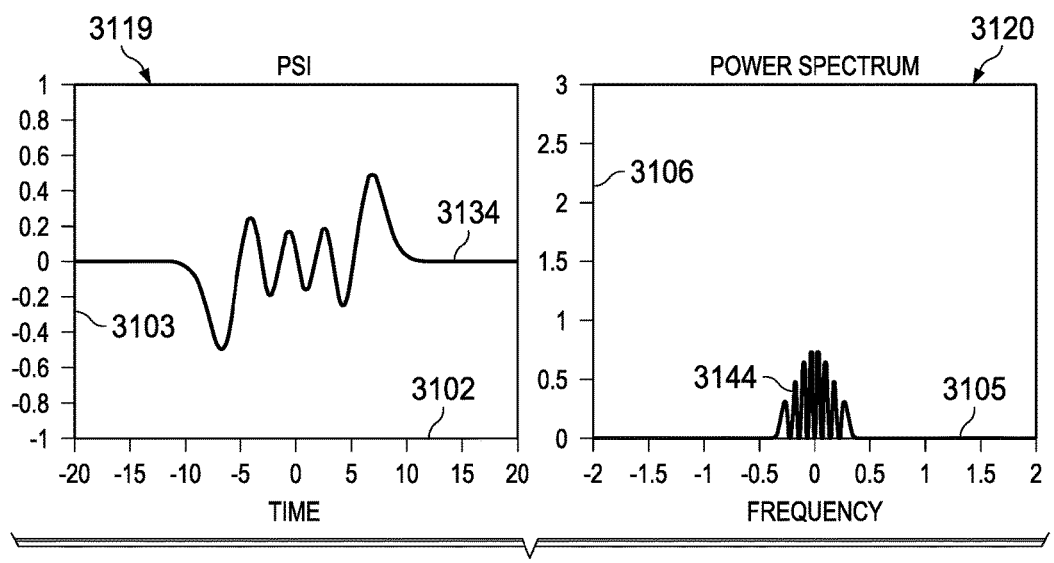
Figure 31I:
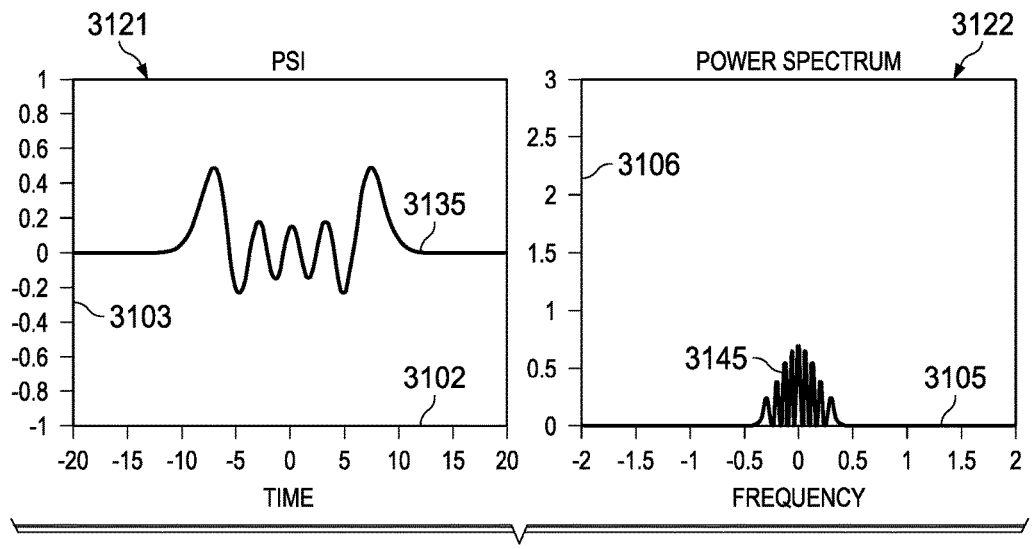
Figure 31J:
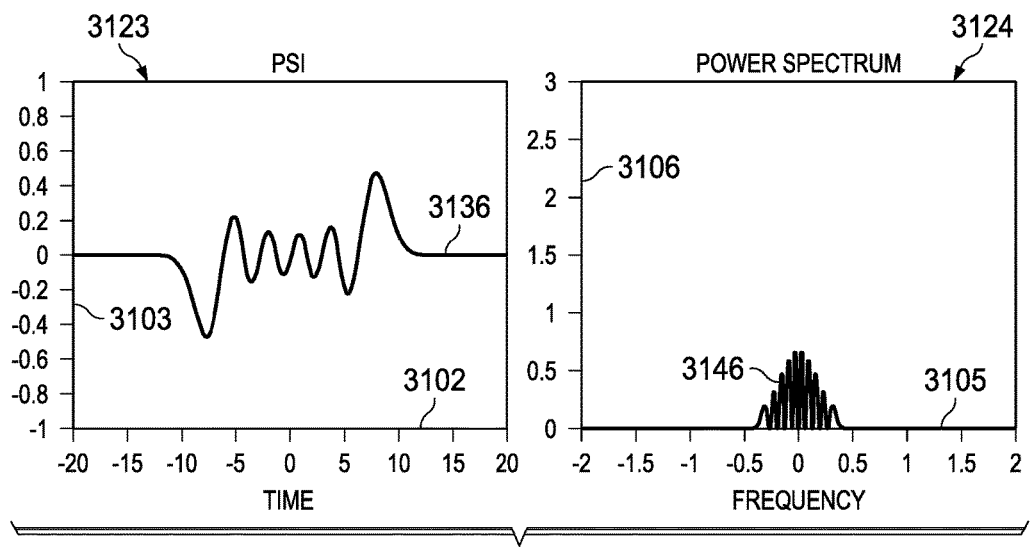

FIGS. 31A-31K illustrate representative MLO signals and their respective spectral power densities based on the modified Hermite polynomials $\Psi n$ for n ranging from 0 to 9. FIG. 31A shows plots 3101 and 3104. Plot 3101 comprises a curve 3127 representing TO plotted against a time axis 3102 and an amplitude axis 3103. As can be seen in plot 3101, curve 3127 approximates a Gaussian curve. Plot 3104 comprises a curve 3137 representing the power spectrum of $\psi$ 0 plotted against a frequency axis 3105 and a power axis 3106. As can be seen in plot 3104, curve 3137 also approximates a Gaussian curve. Frequency domain curve 3107 is generated using a Fourier transform of time domain curve 3127. The units of time and frequency on axis 3102 and 3105 are normalized for baseband analysis, although it should be understood that since the time and frequency units are related by the Fourier transform, a desired time or frequency span in one domain dictates the units of the corresponding curve in the other domain. For example, various embodiments of MLO/QLO systems may communicate using symbol rates in the megahertz (MHz) or gigahertz (GHz) ranges and the non-0 duration of a symbol represented by curve 3127, i.e., the time period at which curve 3127 is above 0 would be compressed to the appropriate length calculated using the inverse of the desired symbol rate. For an available bandwidth in the megahertz range, the non-0 duration of a time domain signal will be in the microsecond range.

FIGS. 31B-31J show plots 3107-3124, with time domain curves 3128-3136 representing $\Psi 1$ through $\Psi 9$, respectively, and their corresponding frequency domain curves 3138-3146. As can be seen in FIGS. 31A-31J, the number of peaks in the time domain plots, whether positive or negative, corresponds to the number of peaks in the corresponding frequency domain plot. For example, in plot 3123 of FIG. 31J, time domain curve 3136 has five positive and five negative peaks. In corresponding plot 3124 therefore, frequency domain curve 3146 has ten peaks.

FIG. 31K shows overlay plots 3125 and 3126, which overlay curves 3127-3136 and 3137-3146, respectively. As indicated in plot 3125, the various time domain curves have different durations. However, in some embodiments, the non-zero durations of the time domain curves are of similar lengths. For an MLO system, the number of signals used represents the number of overlays and the improvement in spectral efficiency. It should be understood that, while ten signals are disclosed in FIGS. 31A-31K, a greater or lesser quantity of signals may be used, and that further, a different set of signals, rather than the gin signals plotted, may be used.

MLO signals used in a modulation layer have minimum time-bandwidth products, which enable improvements in spectral efficiency, limit channel interference, and are quadratically integrable. This is accomplished by overlaying multiple demultiplexed parallel data streams, transmitting them simultaneously within the same bandwidth. The key to successful separation of the overlaid data streams at the receiver is that the signals used within each symbols period are mutually orthogonal. MLO overlays orthogonal signals within a single symbol period. This orthogonality prevents inter-symbol interference (ISI) and inter-carrier interference (ICI).

Because MLO works in the baseband layer of signal processing, and some embodiments use QAM architecture, conventional wireless techniques for optimizing air interface, or wireless segments, to other layers of the protocol stack will also work with MLO. Techniques such as channel diversity, equalization, error correction coding, spread spectrum, interleaving and space-time encoding are applicable to MLO. For example, time diversity using a multipath-mitigating rake receiver can also be used with MLO. MLO provides an alternative for higher order QAM, when channel conditions are only suitable for low order QAM, such as in fading channels. MLO can also be used with CDMA to extend the number of orthogonal channels by overcoming the Walsh code limitation of CDMA. MLO can also be applied to each tone in an OFDM signal to increase the spectral efficiency of the OFDM systems.

Embodiments of MLO systems amplitude modulate a symbol envelope to create sub-envelopes, rather than sub-carriers. For data encoding, each sub-envelope is independently modulated, resulting in each sub-envelope independently carrying information. Rather than spreading information over many sub-carriers, for MLO, each sub-envelope of the carrier carries separate information. This information can be recovered due to the orthogonality of the sub-envelopes defined with respect to the sum of squares over their duration and/or spectrum. Pulse train synchronization or temporal code synchronization, as needed for CDMA, is not an issue, because MLO is transparent beyond the symbol level. MLO addresses modification of the symbol, but since CDMA and TDMA are spreading techniques of multiple symbol sequences over time. MLO can be used along with CDMA and TDMA.

The orthogonality of PSI functions with different numbers n may be checked by evaluating the double integral:

$$\iint \psi_n(\beta,\xi)\psi_m(\beta,\xi)d\beta d\xi.$$

For computational purposes limits of integration should be taken to restrict area where $\psi_n(\beta,\xi)$ is not equal to zero. We know from theoretical speculations that these functions are orthogonal if n is even and m is odd or otherwise. Also overlap of two psi functions should be very small if their numbers n and m are distinct.

Since each of the layers within the MLO signal comprises a different channel, different pilot channels may share a same bandwidth by being assigned to different MLO layers within a same bandwidth. Thus, within a same bandwidth, pilot channel one may be assigned to a first MLO layer, pilot channel two may be assigned to a second MLO layer and so forth.

Figure 32:
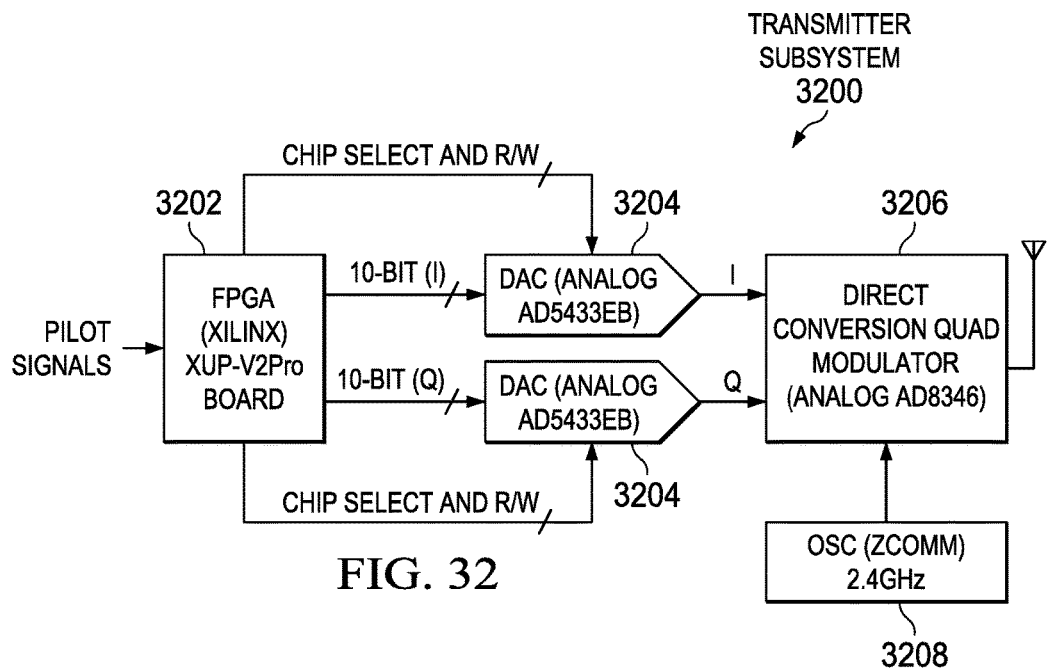
FIG. 32 is a block diagram of a transmitter subsystem for use with multiple level overlay.
Figure 33:
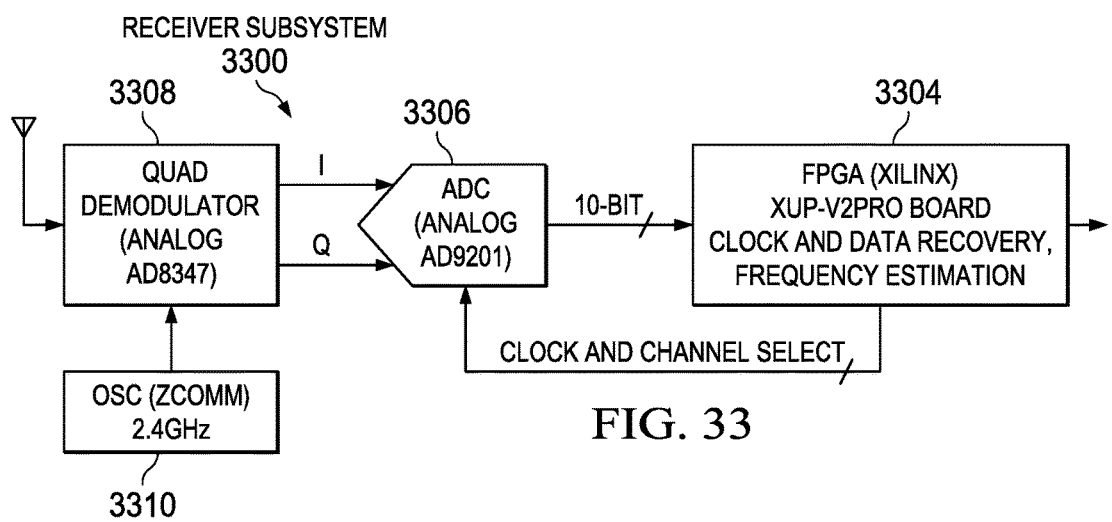
FIG. 33 is a block diagram of a receiver subsystem using multiple level overlay.

Referring now to FIGS. 32 and 33, there are more particularly illustrated the transmit subsystem (FIG. 32) and the receiver subsystem (FIG. 33). The transceiver is realized using basic building blocks available as Commercially-Off-The-Shelf products. Modulation, demodulation and Special Hermite correlation and de-correlation are implemented on a FPGA board. The FPGA board 3302 at the receiver 3300 estimated the frequency error and recovers the data clock (as well as data), which is used to read data from the analog-to-digital (ADC) board 3306. The FGBA board 3300 also segments the digital I and Q channels.

On the transmitter side 3200, the FPGA board 3202 realizes the special hermite correlated pilot signal as well as the necessary control signals to control the digital-to-analog (DAC) boards 3204 to produce analog I&Q baseband channels for the subsequent up conversion within the direct conversion quad modulator 3206. The direct conversion quad modulator 3206 receives an oscillator signal from oscillator 3208. The ADC 3306 receives the I&Q signals from the quad demodulator 3308 that receives an oscillator signal from 3310. A power amplifier in the transmitter and an LNA in the receiver may be used to amplify the communications pilot signal. The frequency band of 2.4-2.5 GHz (ISM band) is selected, but any frequency band of interest may be utilized.

MIMO uses diversity to achieve some incremental spectral efficiency. Each of the signals from the antennas acts as an independent orthogonal channel. With QLO, the gain in spectral efficiency comes from within the symbol and each QLO signal acts as independent channels as they are all orthogonal to one another in any permutation. However, since QLO is implemented at the bottom of the protocol stack (physical layer), any technologies at higher levels of the protocol (i.e. Transport) will work with QLO. Therefore one can use all the conventional techniques with QLO. This includes RAKE receivers and equalizers to combat fading, cyclical prefix insertion to combat time dispersion and all other techniques using beam forming and MIMO to increase spectral efficiency even further.

When considering spectral efficiency of a practical wireless communication system, due to possibly different practical bandwidth definitions (and also not strictly bandlimited nature of actual transmit signal), the following approach would be more appropriate.

Figure 34:
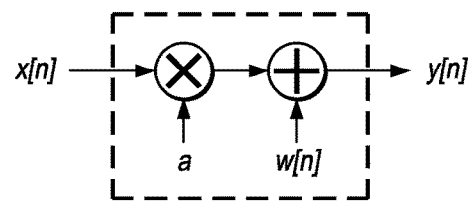
FIG. 34 illustrates an equivalent discreet time orthogonal channel of modified multiple level overlay.

Referring now to FIG. 34, consider the equivalent discrete time system, and obtain the Shannon capacity for that system (denoted by Cd). Regarding the discrete time system, for example, for conventional QAM systems in AWGN, the system will be:

$$y[n]=ax[n]+w[n]$$

where a is a scalar representing channel gain and amplitude scaling, x[n] is the input signal (pilot signal symbol) with unit average energy (scaling is embedded in a), y[n] is the demodulator (matched filter) output symbol, and index n is the discrete time index.

The corresponding Shannon capacity is:

$$Cd=\log 2(1+|a|2/\sigma 2)$$

where σ2 is the noise variance (in complex dimension) and |a|2/σ2 is the SNR of the discrete time system.

Second, compute the bandwidth W based on the adopted bandwidth definition (e.g., bandwidth defined by −40 dBc out of band power). If the symbol duration corresponding to a sample in discrete time (or the time required to transmit Cd bits) is T, then the spectral efficiency can be obtained as:

$$C/W=Cd/(TW)\text{bps/Hz}$$

In discrete time system in AWGN channels, using Turbo or similar codes will give performance quite close to Shannon limit Cd. This performance in discrete time domain will be the same regardless of the pulse shape used. For example, using either SRRC (square root raised cosine) pulse or a rectangle pulse gives the same Cd (or Cd/T). However, when we consider continuous time practical systems, the bandwidths of SRRC and the rectangle pulse will be different. For a typical practical bandwidth definition, the bandwidth for a SRRC pulse will be smaller than that for the rectangle pulse and hence SRRC will give better spectral efficiency. In other words, in discrete time system in AWGN channels, there is little room for improvement. However, in continuous time practical systems, there can be significant room for improvement in spectral efficiency.

Figure 35:
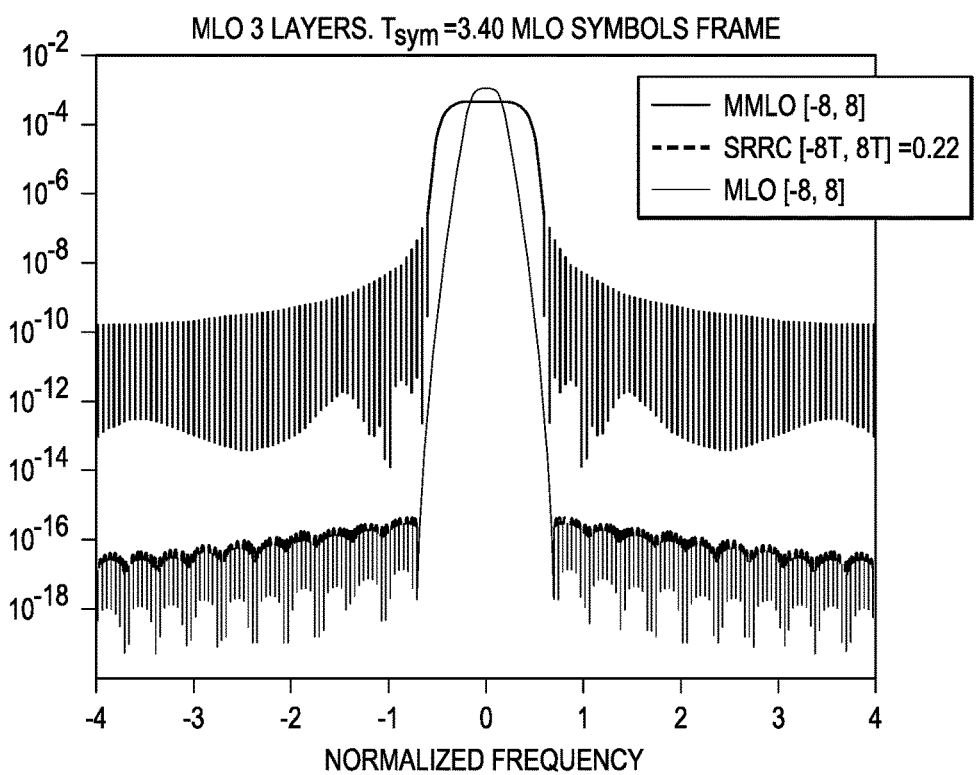
FIG. 35 illustrates the PSDs of multiple layer overlay, modified multiple layer overlay and square root raised cosine.

Referring now to FIG. 35, there is illustrated a PSD plot (BLANK) of MLO, modified MLO (MMLO) and square root raised cosine (SRRC). The illustration, demonstrates the better localization property of MLO. An advantage of MLO is the bandwidth. FIG. 35 also illustrates the interferences to adjacent channels will be much smaller for MLO. This will provide additional advantages in managing, allocating or packaging spectral resources of several channels and systems, and further improvement in overall spectral efficiency.

Figure 36:
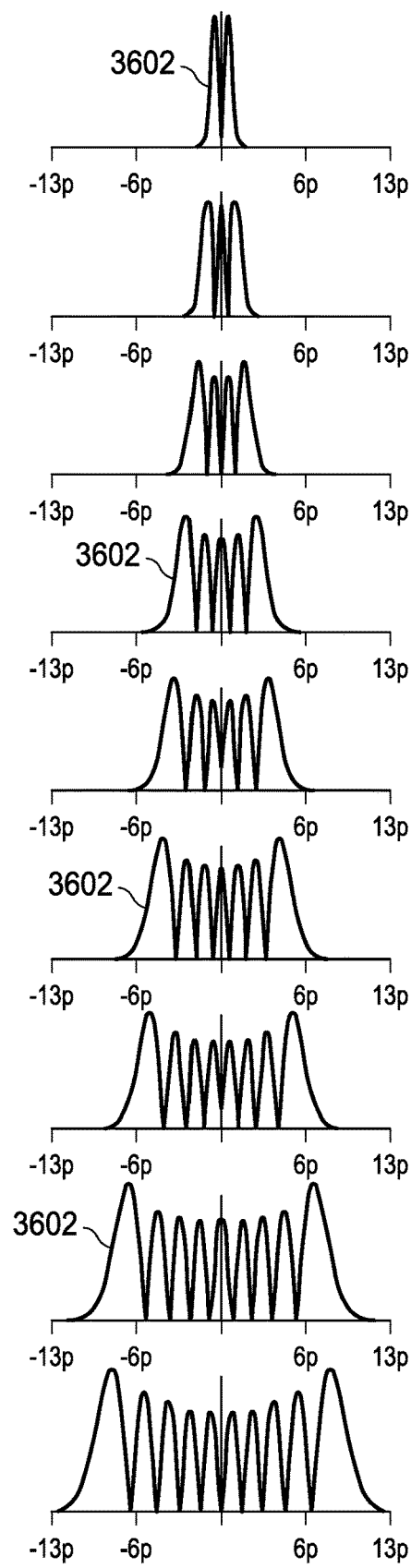
FIG. 36 illustrates the various signals that that may be transmitted over different pilot channels from a transmitter to a receiver.
Figure 37:
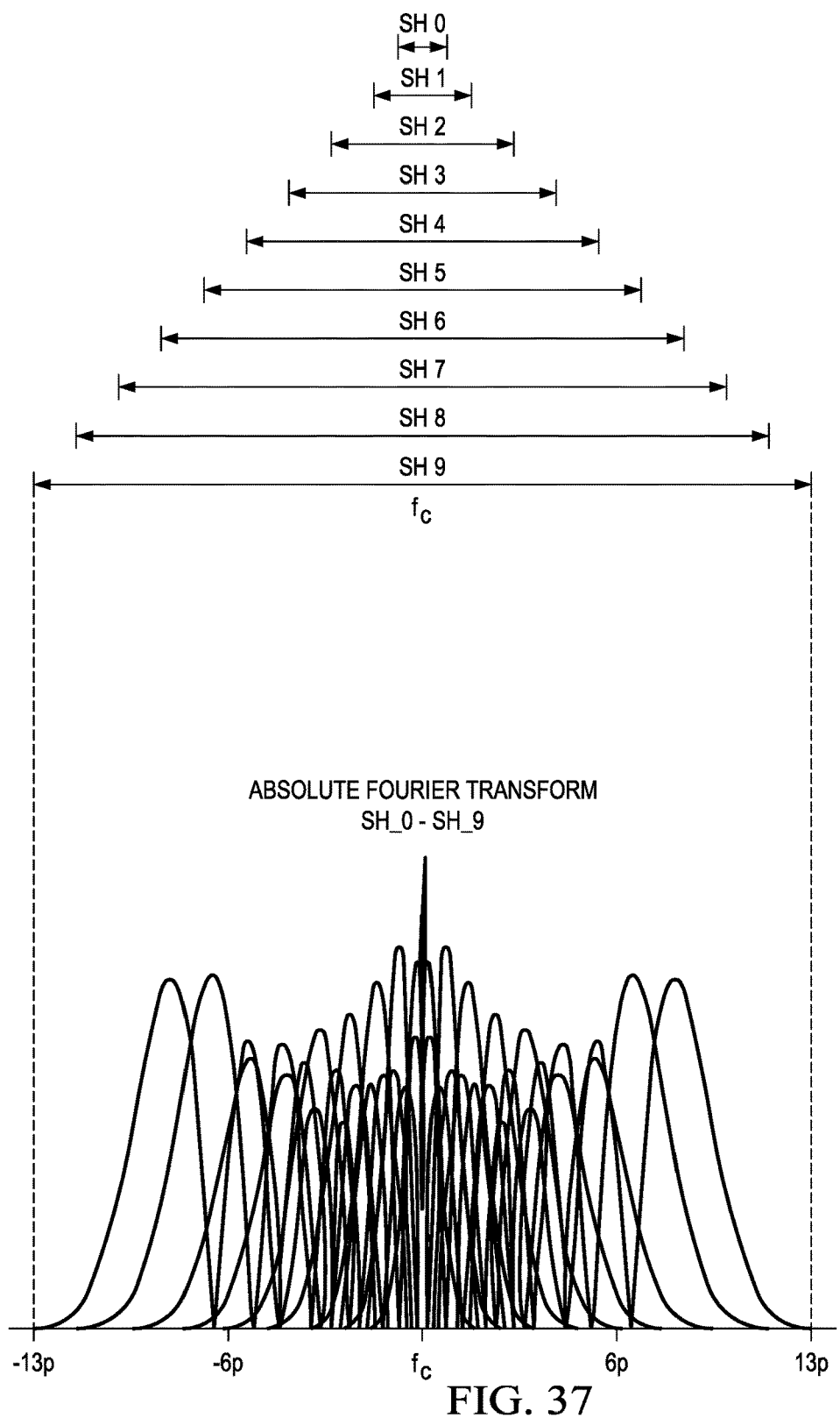
FIG. 37 illustrates the overlapped absolute Fourier transforms of several signals.

Referring now to FIG. 36 and FIG. 37, there is illustrated the manner in which pilot contamination is caused and may be improved by the described system. FIG. 36 illustrates the various signals that that may be transmitted over different pilot channels from a transmitter to a receiver. Each signal 3602 is individual shown from SH 0 down to SHO 8 that are centered on a center frequency $f_c$. FIG. 37 shows the overlapped absolute Fourier transforms for SH 0-SH 9. Due to MLO/QLO modulation, the signals will not interfere with each other due to the orthogonal functions applied thereto.

The application of MLO/QLO modulation within a multiuser MIMO system enables the creation of a number of orthogonal Eigen functions and basis sets. The system provides a number of benefits including satisfying Shannon, Nyquist and Gabor equations, providing finite energy and power, providing finite period in the time-domain, providing a finite spectrum in the frequency-domain. The application of MLO/QLO to pilot signals provides quadratically integrable signal. The upper limit on the number of pilot signals that may be transmitted using the technique depends on the stability of the oscillator that is used. MLO/QLO offers better spectral efficiency, peak-to-average power, power consumption and operations per bit.

Derivation of the Signals Used in Modulation

To do that, it would be convenient to express signal amplitude s(t) in a complex form close to quantum mechanical formalism. Therefore the complex signal can be represented as:

$$\psi(t) = s(t) + j\sigma(t)$$

where s(t) ≡ real signal $\sigma(t)$ = imaginary signal (quadrature)

$$\sigma(t) = \frac{1}{\pi}\int_{-\infty}^{\infty} s(\tau)\frac{d\tau}{\tau - t}$$

$$s(t) = -\frac{1}{\pi}\int_{-\infty}^{\infty} \sigma(t)\frac{d\tau}{\tau - t}$$

Where s(t) and σ(t) are Hilbert transforms of one another and since σ(t) is a quadrature of s(t), they have similar spectral components. That is if they were the amplitudes of sound waves, the ear could not distinguish one form from the other.

Let us also define the Fourier transform pairs as follows:

$$\psi(t) = \frac{1}{\pi}\int_{-\infty}^{\infty} \varphi(f)e^{j\omega t}df$$

-continued $$\varphi(f) = \frac{1}{\pi}\int_{-\infty}^{\infty} \psi(t)e^{-j\omega t}dt$$

$$\psi^*(t)\psi(t) = [s(t)]^2 + [\sigma(t)]^2 + \ldots \equiv signal\,power$$

Let's also normalize all moments to M0:

$$M_0 = \int_0^\tau s(t)dt$$

$$M_0 = \int_0^\tau \varphi^*\varphi\,df$$

Then the moments are as follows:

$$M_0 = \int_0^\tau s(t)dt$$

$$M_1 = \int_0^\tau ts(t)dt$$

$$M_2 = \int_0^\tau t^2 s(t)dt$$

$$M_{N-1} = \int_0^\tau t^{N-1} s(t)dt$$

In general, one can consider the signal s(t) be represented by a polynomial of order N, to fit closely to s(t) and use the coefficient of the polynomial as representation of data. This is equivalent to specifying the polynomial in such a way that its first N "moments" $M_j$ shall represent the data. That is, instead of the coefficient of the polynomial, we can use the moments. Another method is to expand the signal s(t) in terms of a set of N orthogonal functions φk(t), instead of powers of time. Here, we can consider the data to be the coefficients of the orthogonal expansion. One class of such orthogonal functions are sine and cosine functions (like in Fourier series).

Therefore we can now represent the above moments using the orthogonal function ψ with the following moments:

$$\bar{t} = \frac{\int \psi^*(t)t\psi(t)dt}{\int \psi^*(t)\psi(t)dt}$$

$$\overline{t^2} = \frac{\int \psi^*(t)t^2\psi(t)dt}{\int \psi^*(t)\psi(t)dt}$$

$$\overline{t^n} = \frac{\int \psi^*(t)t^n\psi(t)dt}{\int \psi^*(t)\psi(t)dt}$$

Similarly, $$\bar{f} = \frac{\int \varphi^*(f)f\varphi(f)df}{\int \varphi^*(f)\varphi(f)df}$$

-continued $$\overline{f^2} = \frac{\int \varphi^*(f) f^2 \varphi(f) df}{\int \varphi^*(f) \varphi(f) df}$$

$$\overline{f^n} = \frac{\int \varphi^*(f) f^n \varphi(f) df}{\int \varphi^*(f) \varphi(f) df}$$

If we did not use complex signal, then:

$$\overline{f}=0$$

To represent the mean values from time to frequency domains, replace:

$$\varphi(f) \to \psi(t)$$
$$f \to \frac{1}{2\pi} \frac{d}{dt}$$

These are equivalent to somewhat mysterious rule in quantum mechanics where classical momentum becomes an operator:

$$P_x \to \frac{h}{2\pi j} \frac{\partial}{\partial x}$$

Therefore using the above substitutions, we have:

$$\overline{f} = \frac{\int \varphi^*(f) f \varphi(f) df}{\int \varphi^*(f) \varphi(f) df} = \frac{\int \psi^*(t)\left(\frac{1}{2\pi j}\right)\frac{d\psi(t)}{dt} dt}{\int \psi^*(t)\psi(t) dt} = \left(\frac{1}{2\pi j}\right) \frac{\int \psi^* \frac{d\psi}{dt} dt}{\int \psi^* \psi dt}$$

And:

$$\overline{f^2} = \frac{\int \varphi^*(f) f^2 \varphi(f) df}{\int \varphi^*(f) \varphi(f) df} = \frac{\int \psi^*\left(\frac{1}{2\pi j}\right)^2 \frac{d^2}{dt^2}\psi dt}{\int \psi^* \psi dt} = -\left(\frac{1}{2\pi}\right)^2 \frac{\int \psi^* \frac{d^2}{dt^2}\psi dt}{\int \psi^* \psi dt}$$

$$\overline{t^2} = \frac{\int \psi^* t^2 \psi dt}{\int \psi^* \psi dt}$$

We can now define an effective duration and effective bandwidth as:

$$\Delta t = \sqrt{2\pi \overline{(t-\bar{t})^2}} = 2\pi \cdot \text{rms in time}$$

$$\Delta f = \sqrt{2\pi \overline{(f-\bar{f})^2}} = 2\pi \cdot \text{rms in frequency}$$

But we know that:

$$\overline{(t-\bar{t})^2} = \overline{t^2} - (\bar{t})^2$$

$$\overline{(f-\bar{f})^2} = \overline{f^2} - (\bar{f})^2$$

We can simplify if we make the following substitutions:

$$\tau = t - \bar{t}$$

$$\Psi(\tau) = \psi(t) e^{-j\bar{\omega}\tau}$$

$$\omega_0 = \bar{\omega} = 2\pi \bar{f} = 2\pi f_0$$

We also know that:

$$(\Delta t)^2 (\Delta f)^2 = (\Delta t \Delta f)^2$$

And therefore:

$$(\Delta t \Delta f)^2 = \frac{1}{4}\left[4 \frac{\int \Psi^*(\tau)\tau^2 \Psi(\tau) d\tau \int \frac{d\Psi^*}{d\tau} \frac{d\Psi}{d\tau} d\tau}{(\int \Psi^*(\tau)\psi(\tau) d\tau)^2}\right] \geq \left(\frac{1}{4}\right)$$

$$(\Delta t \Delta f) \geq \left(\frac{1}{2}\right)$$

Now instead of $(\Delta t \, \Delta f) \geq (\frac{1}{2})$ we are interested to force the equality $(\Delta t \, \Delta f) = (\frac{1}{2})$ and see what signals satisfy the equality. Given the fixed bandwidth $\Delta f$, the most efficient transmission is one that minimizes the time-bandwidth product $(\Delta t \, \Delta f) = (\frac{1}{2})$ For a given bandwidth $\Delta f$, the signal that minimizes the transmission in minimum time will be a Gaussian envelope. However, we are often given not the effective bandwidth, but always the total bandwidth $f_2 - f_1$. Now, what is the signal shape which can be transmitted through this channel in the shortest effective time and what is the effective duration?

$$\Delta t = = \frac{\frac{1}{(2\pi)^2} \int_{f_1}^{f_2} \frac{d\varphi^*}{df} \frac{d\varphi}{df}}{\int_{f_1}^{f_2} \varphi^* \varphi df} \to \min$$

Where $\varphi(f)$ is zero outside the range $f_2 - f_1$.

To do the minimization, we would use the calculus of variations (Lagrange's Multiplier technique). Note that the denominator is constant and therefore we only need to minimize the numerator as:

$$\Delta t \to \min \to \delta \int_{f_1}^{f_2} \left(\frac{d\varphi^*}{df} \frac{d\varphi}{df} + \Lambda \varphi^* \varphi\right) df = 0$$

First *Trem*

$$\delta \int_{f_1}^{f_2} \frac{d\varphi^*}{df} \frac{d\varphi}{df} df = \int \left(\frac{d\varphi^*}{df} \delta \frac{d\varphi}{df} + \frac{d\varphi}{df} \delta \frac{d\varphi^*}{df}\right) df$$

$$= \int \left(\frac{d\varphi^*}{df} \frac{d\delta\varphi}{df} + \frac{d\varphi}{df} \frac{d\delta\varphi^*}{df}\right) df$$

$$= \left[\frac{d\varphi^*}{df} \delta\varphi + \frac{d\varphi}{df} \delta\varphi^*\right]_{f_1}^{f_2} -$$

$$\int \left(\frac{d^2\varphi^*}{df^2} \delta\varphi + \frac{d^2\varphi}{df^2} \delta\varphi^*\right) df$$

$$= \int \left(\frac{d^2\varphi^*}{df^2} \delta\varphi + \frac{d^2\varphi}{df^2} \delta\varphi^*\right) df$$

-continued

Second Trem $$\delta \int_{f_1}^{f_2} (\Lambda \varphi^* \varphi) df = \Lambda \int_{f_1}^{f_2} (\varphi^* \delta \varphi + \varphi \delta \varphi^*) df$$

Both Trem $$= \int \left[ \left( \frac{d^2 \varphi^*}{df^2} + \Lambda \varphi^* \right) \delta \varphi + \left( \frac{d^2 \varphi}{df^2} + \Lambda \varphi \right) \delta \varphi^* \right] df = 0$$

This is only possible if and only if:

$$\left( \frac{d^2 \varphi}{df^2} + \Lambda \varphi \right) = 0$$

The solution to this is of the form $$\varphi(f) = \sin k\pi \left( \frac{f - f_1}{f_2 - f_1} \right)$$

Now if we require that the wave vanishes at infinity, but still satisfy the minimum time-bandwidth product:

$$(\Delta t \Delta f) = (\tfrac{1}{2})$$

Then we have the wave equation of a Harmonic Oscillator:

$$\frac{d^2 \Psi(\tau)}{d\tau^2} + (\lambda - \alpha^2 \tau^2) \Psi(\tau) = 0$$

which vanishes at infinity only if:

$$\lambda = \alpha(2n + 1)$$

$$\psi_n = e^{-\frac{1}{2}\omega^2 \tau^2} \frac{d^n}{d\tau^n} e^{-\alpha^2 \tau^2} \propto H_n(\tau)$$

Where Hn(τ) is the Hermite Gaussian functions and:

$$(\Delta t \Delta f) = \tfrac{1}{2}(2n+1)$$

So Hermit functions Hn(τ) occupy information blocks of ½, 3/2, 5/2, . . . with ½ as the minimum information quanta.

Thus, in this manner the effects of pilot channel contamination may be greatly limited by applying MLO/QLO modulation to the pilot signals being transmitted from user devices to a base station. The pilot signals will not cause contamination between pilot channels since the MLO modulation will cause the pilot signals to be overlapping and orthogonal to each other such that the pilot signals do not interfere with each other.

It will be appreciated by those skilled in the art having the benefit of this disclosure that this system and method for communication using orbital angular momentum with multiple layer overlay modulation provides improved bandwidth and data transmission capability. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for transmitting a pilot signal, comprising:
generating the pilot signal at a transmitting unit;
modulating the pilot signal using quantum level overlay modulation to apply at least one orthogonal function to the pilot signal, wherein the modulated pilot signal is mutually orthogonal in both time and frequency domains, further wherein the modulated pilot signal minimizes time-frequency resources;
transmitting the modulated pilot signal from the transmitting unit to a receiving unit over a pilot channel; and
wherein the at least one orthogonal function applied to the pilot signal substantially reduces pilot channel contamination on the pilot channel from other pilot channels.

2. The method 1 further including the steps of:
receiving the modulated pilot signal at the receiving unit over the pilot channel;
demodulating the modulated pilot signal using quantum level overlay demodulation to remove the at least one orthogonal function from the pilot signal; and
outputting the demodulated pilot signal.

3. The method of claim 2, wherein the step of receiving further comprises receiving the modulated pilot signal using one of a plurality of antennas of a MIMO transceiver.

4. The method of claim 2 further including the step of generating channel state information responsive to the demodulated pilot signal.

5. The method of claim 1, wherein the modulation of the pilot signal provides a new orthogonal basis set to the pilot signal.

6. The method of claim 1, wherein the at least one orthogonal function applied to the pilot signal substantially reduces pilot channel contamination caused by hardware impairment and non-reciprocal transceivers.

7. The method of claim 1, wherein the at least one orthogonal function applied to the pilot signal substantially reduces pilot channel contamination caused by frequency reuse between cells.

8. The method of claim 1, wherein the step of transmitting further includes transmitting the modulated pilot signal from the transmitting unit to the receiving unit over a pilot channel using coordinated beamforming.

9. The method of claim 1, wherein the pilot signal is generated responsive to at least one of a time-multiplexed pilot scheme and a superimposed pilot scheme, further wherein the pilot signal is transmitted in dedicated time slots in the time-multiplexed pilot scheme and the pilot signal is superimposed with data and transmitted in all time slots in the superimposed pilot scheme.

10. The method for transmitting pilot signals within a MIMO transmission system, comprising:
generating a plurality of pilot signals at a plurality of transmitting units;
modulating each of the plurality of pilot signals using quantum level overlay modulation to apply at least one orthogonal function to the plurality of pilot signals, wherein the modulated pilot signals are mutually orthogonal in both time and frequency domains, further wherein the modulated plurality of pilot signal minimizes time-frequency resources;
transmitting the modulated pilot signals from the plurality of transmitting units to a MIMO receiving unit including a plurality of receiving antennas over a plurality of pilot channels, each of the plurality of pilot channels interconnecting one of the plurality of transmitting units to one of the plurality of receiving antennas of the MIMO receiving unit; and
wherein the at least one orthogonal function applied to the plurality of pilot signals substantially reduces pilot channel contamination between the plurality of pilot channels.

11. The method 10 further including the steps of:
receiving the plurality of modulated pilot signals at the MIMO receiving unit over the plurality of pilot channels;
demodulating the modulated plurality of pilot signals using quantum level overlay demodulation to remove the at least one orthogonal function from each of the plurality of pilot signals; and
outputting the demodulated plurality of pilot signals.

12. The method of claim 11 further including the step of generating channel state information for each of the plurality of pilot channels responsive to the demodulated plurality of pilot signals.

13. The method of claim 10, wherein the modulation of the plurality of pilot signals provides a new orthogonal basis set to each of the plurality of pilot signals.

14. The method of claim 10, wherein the at least one orthogonal function applied to the plurality of pilot signals substantially reduces pilot channel contamination caused by hardware impairment and non-reciprocal transceivers.

15. The method of claim 10, wherein the at least one orthogonal function applied to the plurality of pilot signals substantially reduces pilot channel contamination caused by frequency reuse between cells.

16. The method of claim 10, wherein the step of transmitting further includes transmitting each of the plurality of modulated pilot signals from the plurality of transmitting units to the plurality of antennas and the MIMO receiving unit over the plurality of pilot channels using coordinated beamforming.

17. The method of claim 10, wherein the plurality of pilot signals are generated responsive to at least one of a time-multiplexed pilot scheme and a superimposed pilot scheme, further wherein the plurality of pilot signals are transmitted in dedicated time slots in the time-multiplexed pilot scheme and the plurality of pilot signals are superimposed with data and transmitted in all time slots in the superimposed pilot scheme.

18. The method of claim 10, wherein a minimum number of the plurality of pilot signals comprises a total number of the plurality of transmitting units.

19. A system for transmitting pilot signals, comprising:
first signal processing circuitry for generating a pilot signal at a transmitting unit;
QLO modulation circuitry for modulating the pilot signal using quantum level overlay modulation to apply at least one orthogonal function to the pilot signal, wherein the modulated pilot signal is mutually orthogonal in both time and frequency domains, further wherein the modulated pilot signal minimizes time-frequency resources;
a transceiver for transmitting the modulated pilot signal from the transmitting unit over a pilot channel; and
wherein the at least one orthogonal function applied to the pilot signal substantially reduces pilot channel contamination on the pilot channel from other pilot channels.

20. The system of claim 19 further including a receiving unit for receiving the modulated pilot signal over the pilot channel, demodulating the modulated pilot signal using the quantum level overlay modulation to remove the at least one orthogonal function from the pilot signal and outputting the demodulated pilot signal.

21. The system of claim 20, wherein the receiving unit further comprises a MIMO receiver including a plurality of antennas for receiving the modulated pilot signal.

22. The system of claim 20, wherein the receiving unit further generates channel state information responsive to the demodulated pilot signal.

23. The system of claim 19, wherein the modulation of the pilot signal provides a new orthogonal basis set to the pilot signal.

24. The system of claim 19, wherein the at least one orthogonal function applied to the pilot signal substantially reduces pilot channel contamination caused by hardware impairment and non-reciprocal transceivers.

25. The system of claim 19, wherein the at least one orthogonal function applied to the pilot signal substantially reduces pilot channel contamination caused by frequency reuse between cells.

26. The system of claim 19, wherein the transceiver further transmits the modulated pilot signal from the transceiver to the receiving unit over the pilot channel using coordinated beamforming.

27. The system of claim 19, wherein the first signal processing circuitry generates the pilot signal responsive to at least one of a time-multiplexed pilot scheme and a superimposed pilot scheme, further wherein the pilot signal is transmitted in dedicated time slots in the time-multiplexed pilot scheme and the pilot signal is superimposed with data and transmitted in all time slots in the superimposed pilot scheme.

* * * * *